US012063487B2

(12) United States Patent
Petit et al.

(10) Patent No.: US 12,063,487 B2
(45) Date of Patent: Aug. 13, 2024

(54) ACOUSTIC VOICE ACTIVITY DETECTION (AVAD) FOR ELECTRONIC SYSTEMS

(71) Applicant: Jawbone Innovations, LLC, Marshall, TX (US)

(72) Inventors: Nicolas Petit, San Francisco, CA (US); Gregory Burnett, Dodge Center, MN (US); Zhinian Jing, San Francisco, CA (US)

(73) Assignee: Jawbone Innovations, LLC, Marshall, TX (US)

( * ) Notice: Subject to any disclaimer, the term of this patent is extended or adjusted under 35 U.S.C. 154(b) by 0 days.

(21) Appl. No.: 18/130,654

(22) Filed: Apr. 4, 2023

(65) Prior Publication Data

US 2023/0379621 A1 Nov. 23, 2023

Related U.S. Application Data

(63) Continuation of application No. 13/669,375, filed on Nov. 5, 2012, now Pat. No. 11,627,413, which is a continuation of application No. 12/606,146, filed on Oct. 26, 2009, now Pat. No. 8,321,213.

(60) Provisional application No. 61/108,426, filed on Oct. 24, 2008.

(51) Int. Cl.

| | |
|---|---|
| ***H04R 3/00*** | (2006.01) |
| ***G10L 25/78*** | (2013.01) |
| *G10L 21/0216* | (2013.01) |
| *G10L 25/93* | (2013.01) |

(52) U.S. Cl.
CPC .............. *H04R 3/005* (2013.01); *G10L 25/78* (2013.01); *G10L 2021/02165* (2013.01); *G10L 2025/783* (2013.01); *G10L 2025/937* (2013.01)

(58) Field of Classification Search
CPC .................... H04R 3/005; H04R 1/406; G10L 2021/02165; G10L 25/93; G10L 2025/783; G10L 25/84; G10L 25/78
USPC .................................................... 381/92, 122
See application file for complete search history.

(56) References Cited

U.S. PATENT DOCUMENTS

2010/0128894 A1* 5/2010 Petit ........................ G10L 25/93 381/92
2011/0026722 A1* 2/2011 Jing ........................ G10L 25/84 381/71.1

* cited by examiner

*Primary Examiner* — George C Monikang
(74) *Attorney, Agent, or Firm* — Nutter McClennen & Fish LLP

(57) ABSTRACT

Acoustic Voice Activity Detection (AVAD) methods and systems are described. The AVAD methods and systems, including corresponding algorithms or programs, use microphones to generate virtual directional microphones which have very similar noise responses and very dissimilar speech responses. The ratio of the energies of the virtual microphones is then calculated over a given window size and the ratio can then be used with a variety of methods to generate a VAD signal. The virtual microphones can be constructed using either an adaptive or a fixed filter.

6 Claims, 35 Drawing Sheets

Linear response of V2 to a speech source at 0.10 meters

Linear response of V2 to a noise source at 1 meters

Linear response of V1 to a speech source at 0.10 meters

Linear response of V1 to a noise source at 1 meters

Linear response of V1 to a speech source at 0.1 meters

ACOUSTIC VOICE ACTIVITY DETECTION (AVAD) FOR ELECTRONIC SYSTEMS

CROSS-REFERENCE TO RELATED APPLICATIONS

This application is a continuation of U.S. patent application Ser. No. 13/669,375 entitled ACOUSTIC VOICE ACTIVITY DETECTION (AVAD) FOR ELECTRONIC SYSTEMS filed Nov. 5, 2012, which is a continuation of U.S. patent application Ser. No. 12/606,146, filed Oct. 26, 2009 (now U.S. Pat. No. 8,321,213 issued Nov. 27, 2012, which claims the benefit of U.S. Provisional Application No. 61/108,426, filed Oct. 24, 2008, all of which are herein incorporated by reference for all purposes. The following related U.S. patent applications are also herein incorporated by reference for all purposes:

- U.S. patent application Ser. No. 11/805,987, filed May 25, 2007;
- U.S. patent application Ser. No. 10/159,770, filed May 30, 2002, now U.S. Pat. No. 7,246,058;
- U.S. Provisional Application No. 60/368,209, filed Mar. 27, 2002;
- U.S. patent application Ser. No. 12/139,333, filed Jun. 13, 2008, now U.S. Pat. No. 8,503,691; and
- U.S. Provisional Application No. 61/045,377, filed Apr. 16, 2008.

TECHNICAL FIELD

The disclosure herein related generally to noise suppression. In particular, this disclosure relates to noise suppression systems, devices, and methods for use in acoustic applications.

BACKGROUND

The ability to correctly identify voiced and unvoiced speech is critical to many speech applications including speech recognition, speaker verification, noise suppression, and many others. In a typical acoustic application, speech from a human speaker is captured and transmitted to a receiver in a different location. In the speaker's environment there may exist one or more noise sources that pollute the speech signal, the signal of interest, with unwanted acoustic noise. This makes it difficult or impossible for the receiver, whether human or machine, to understand the user's speech.

Typical methods for classifying voices and unvoiced speech have relied mainly on the acoustic content of single microphone data, which is plagued by problems with noise and the corresponding uncertainties in signal content. This is especially problematic with the proliferation of portable communication devices like mobile telephones. There are methods known in the art for suppressing the noise present in the speech signals, but these normally requires a robust method of determining when speech is being produced. Non-acoustic methods have been employed successfully in commercial products such as the Jawbone headset produced by AliphCom, Inc., San Francisco, California (Aliph), but an acoustic-only solution is desired in some cases (e.g., for reduced cost, as a supplement to the non-acoustic sensor, etc.)

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 16A plots the received GEMS signal and the Mic 1 signal and the threshold T1 used for voiced speech detection, under an embodiment.

FIG. 16B plots the received GEMS signal for this utterance along with the standard deviation of the GEMS signal and the threshold T2 used for voiced speech detection, under an embodiment.

FIG. 17 plots voiced speech detected from the acoustic or audio signal, along with the GEMS signal and the acoustic noise; no unvoiced speech is detected in this example because of the heavy background babble noise, under an embodiment.

DETAILED DESCRIPTION

Acoustic Voice Activity Detection (AVAD) methods and systems are described herein. The AVAD methods and systems, which include algorithms or programs, use microphones to generate virtual directional microphones which have very similar noise responses and very dissimilar speech responses. The ratio of the energies of the virtual microphones is then calculated over a given window size and the ratio can then be used with a variety of methods to generate a VAD signal. The virtual microphones can be constructed using either a fixed or an adaptive filter. The adaptive filter generally results in a more accurate and noise-robust VAD signal but requires training. In addition, restrictions can be placed on the filter to ensure that it is training only on speech and not on environmental noise.

In the following description, numerous specific details are introduced to provide a thorough understanding of, and enabling description for, embodiments. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
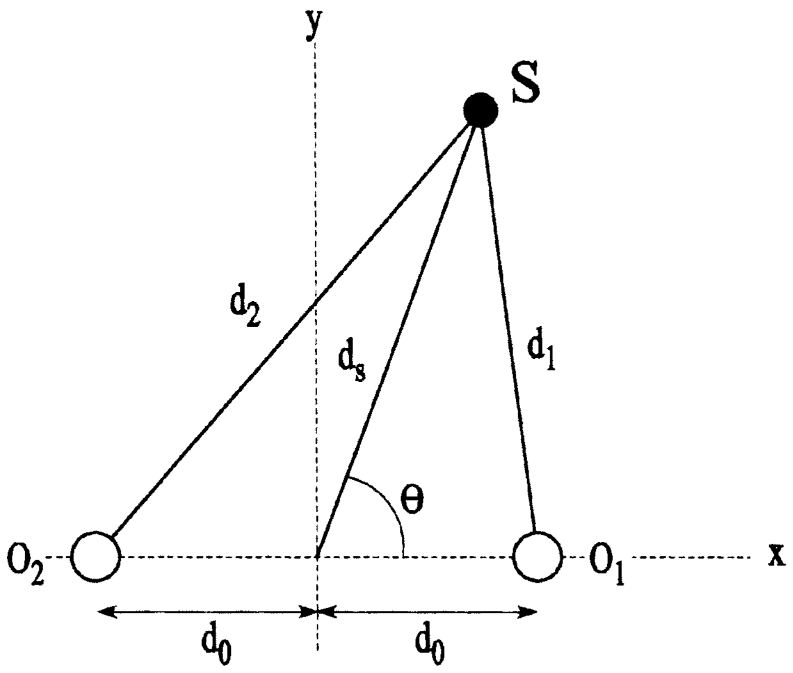
FIG. 1 is a configuration of a two-microphone array with speech source S, under an embodiment.

FIG. 1 is a configuration of a two-microphone array of the AVAD with speech source S, under an embodiment. The AVAD of an embodiment uses two physical microphones ($O_1$ and $O_2$) to form two virtual microphones ($V_1$ and $V_2$). The virtual microphones of an embodiment are directional microphones, but the embodiment is not so limited. The physical microphones of an embodiment include omnidirectional microphones, but the embodiments described herein are not limited to omnidirectional microphones. The virtual microphone (VM) $V_2$ is configured in such a way that it has minimal response to the speech of the user, while $V_1$ is configured so that it does respond to the user's speech but has a very similar noise magnitude response to $V_2$, as described in detail herein. The PSAD VAD methods can then be used to determine when speech is taking place. A further refinement is the use of an adaptive filter to further minimize the speech response of $V_2$, thereby increasing the speech energy ratio used in PSAD and resulting in better overall performance of the AVAD.

The PSAD algorithm as described herein calculates the ratio of the energies of two directional microphones $M_1$ and $M_2$:

$$\sum_i \sqrt{\frac{M_1(z_i)^2}{M_2(z_i)^2}}$$

where the "z" indicates the discrete frequency domain and "i" ranges from the beginning of the window of interest to the end, but the same relationship holds in the time domain. The summation can occur over a window of any length; 200 samples at a sampling rate of 8 kHz has been used to good effect. Microphone $M_1$ is assumed to have a greater speech response than microphone $M_2$. The ratio R depends on the relative strength of the acoustic signal of interest as detected by the microphones.

For matched omnidirectional microphones (i.e. they have the same response to acoustic signals for all spatial orientations and frequencies), the size of R can be calculated for speech and noise by approximating the propagation of speech and noise waves as spherically symmetric sources. For these the energy of the propagating wave decreases as $1/r^2$:

$$R=\sum_i\sqrt{\frac{M_1(z_i)^2}{M_2(z_i)^2}}=\frac{d_2}{d_1}=\frac{d_1+d}{d_1}$$

The distance $d_1$ is the distance from the acoustic source to $M_1$. $d_2$ is the distance from the acoustic source to $M_2$ and $d=d_2-d_1$ (see FIG. 1). It is assumed that $O_1$ is closer to the speech source (the user's mouth) so that d is always positive. If the microphones and the user's mouth are all on a line, then $d=2\ d_0$, the distance between the microphones. For matched omnidirectional microphones, the magnitude of R, depends only on the relative distance between the microphones and the acoustic source. For noise sources, the distances are typically a meter or more, and for speech sources, the distances are on the order of 10 cm, but the distances are not so limited. Therefore for a 2 cm array typical values of R are:

$$R_S=\frac{d_2}{d_1}\approx\frac{12\text{ cm}}{10\text{ cm}}=1.2$$

$$R_N=\frac{d_2}{d_1}\approx\frac{102\text{ cm}}{100\text{ cm}}=1.02$$

where the "S" subscript denotes the ratio for speech sources and "N" the ratio for noise sources. There is not a significant amount of separation between noise and speech sources in this case, and therefore it would be difficult to implement a robust solution using simple omnidirectional microphones.

A better implementation is to use directional microphones where the second microphone has minimal speech response. As described herein, such microphones can be constructed using omnidirectional microphones $O_1$ and $O_2$:

$$V_1(z)=-\beta(z)\alpha(z)O_2(z)+O_1(z)z^{-\gamma}$$

$$V_2(z)=\alpha(z)O_2(z)-\beta(z)O_1(z)z^{-\gamma}$$

where $\alpha(z)$ is a calibration filter used to compensate $O_2$'s response so that it is the same as $O_1$, $\beta(z)$ is a filter that describes the relationship between $O_1$ and calibrated $O_2$ for speech, and $\gamma$ is a fixed delay that depends on the size of the array. There is no loss of generality in defining $\alpha(z)$ as above, as either microphone may be compensated to match the other. For this configuration $V_1$ and $V_2$ have very similar noise response magnitudes and very dissimilar speech response magnitudes if $$\gamma=\frac{d}{c}$$

where again $d=2\ d_0$ and c is the speed of sound in air, which is temperature dependent and approximately $$c=331.3\sqrt{1+\frac{T}{273.15}}\ \frac{m}{\text{sec}}$$

where T is the temperature of the air in Celsius.

Figure 2:
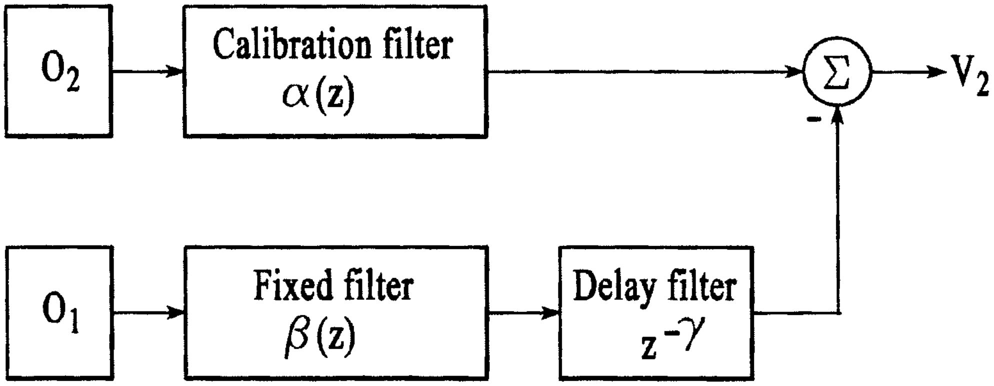
FIG. 2 is a block diagram of $V_2$ construction using a fixed $\beta(z)$, under an embodiment.

The filter $\beta(z)$ can be calculated using wave theory to be $$\beta(z)=\frac{d_1}{d_2}=\frac{d_1}{d_1+d}\qquad[2]$$

where again $d_k$ is the distance from the user's mouth to $O_k$. FIG. 2 is a block diagram of $V_2$ construction using a fixed $\beta(z)$, under an embodiment. This fixed (or static) $\beta$ works sufficiently well if the calibration filter $\alpha(z)$ is accurate and $d_1$ and $d_2$ are accurate for the user. This fixed-$\beta$ algorithm, however, neglects important effects such as reflection, diffraction, poor array orientation (i.e. the microphones and the mouth of the user are not all on a line), and the possibility of different $d_1$ and $d_2$ values for different users.

Figure 3:
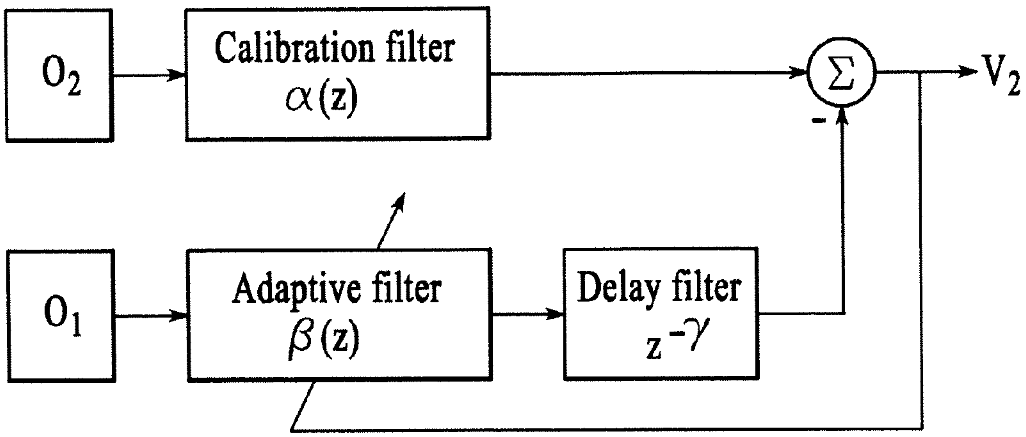
FIG. 3 is a block diagram of $V_2$ constructions using an adaptive $\beta(z)$, under an embodiment.

The filter $\beta(z)$ can also be determined experimentally using an adaptive filter. FIG. 3 is a block diagram of $V_2$ construction using an adaptive $\beta(z)$, under an embodiment, where:

$$\tilde{\beta}(z)=\frac{\alpha(z)O_2(z)}{z^{-\gamma}O_1(z)}$$

The adaptive process varies $\tilde{\beta}(z)$ to minimize the output of $V_2$ when only speech is being received by $O_1$ and $O_2$. A small amount of noise may be tolerated with little ill effect, but it is preferred that only speech is being received when the coefficients of $\tilde{\beta}(z)$ are calculated. Any adaptive process may be used; a normalized least-mean squares (NLMS) algorithm was used in the examples below.

Figure 4:
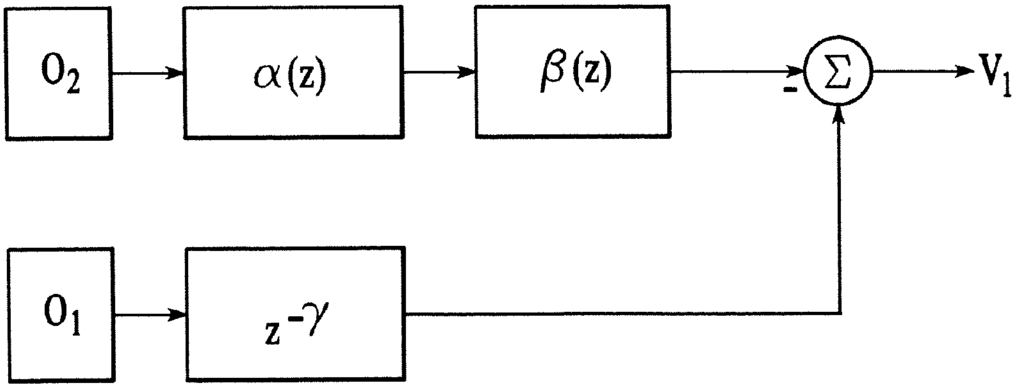
FIG. 4 is a block diagram of $V_1$ construction, under an embodiment.

The $V_1$ can be constructed using the current value for $\tilde{\beta}(z)$ or the fixed filter $\beta(z)$ can be used for simplicity. FIG. 4 is a block diagram of $V_1$ construction, under an embodiment.

Now the ratio R is $$R=\frac{\|V_1(z)\|}{\|V_2(z)\|}=\sqrt{\frac{\left(-\tilde{\beta}(z)\alpha(z)O_2(z)+O_1(z)z^{-\gamma}\right)^2}{\left(\alpha(z)O_2(z)-\tilde{\beta}(z)O_1(z)z^{-\gamma}\right)^2}}$$

where double bar indicates norm and again any size window may be used. If $\tilde{\beta}(z)$ has been accurately calculated, the ratio for speech should be relatively high (e.g., greater than approximately 2) and the ratio for noise should be relatively low (e.g., less than approximately 1.1). The ratio calculated will depend on both the relative energies of the speech and noise as well as the orientation of the noise and the reverberance of the environment. In practice, either the adapted filter $\tilde{\beta}(z)$ or the static filter b(z) may be used for V1(*z*) with little effect on R—but it is important to use the adapted filter $\tilde{\beta}(z)$ in $V_2(z)$ for best performance. Many techniques known to those skilled in the art (e.g., smoothing, etc.) can be used to make R more amenable to use in generating a VAD and the embodiments herein are not so limited.

The ratio R can be calculated for the entire frequency band of interest, or can be calculated in frequency subbands. One effective subband discovered was 250 Hz to 1250 Hz, another was 200 Hz to 3000 Hz, but many others are possible and useful.

Once generated, the vector of the ratio R versus time (or the matrix of R versus time if multiple subbands are used) can be used with any detection system (such as one that uses fixed and/or adaptive thresholds) to determine when speech is occurring. While many detection systems and methods are known to exist by those skilled in the art and may be used, the method described herein for generating an R so that the speech is easily discernable is novel. It is important to note that the R does not depend on the type of noise or its orientation or frequency content; R simply depends on the $V_1$ and $V_2$ spatial response similarity for noise and spatial response dissimilarity for speech. In this way it is very robust and can operate smoothly in a variety of noisy acoustic environments.

Figure 5:
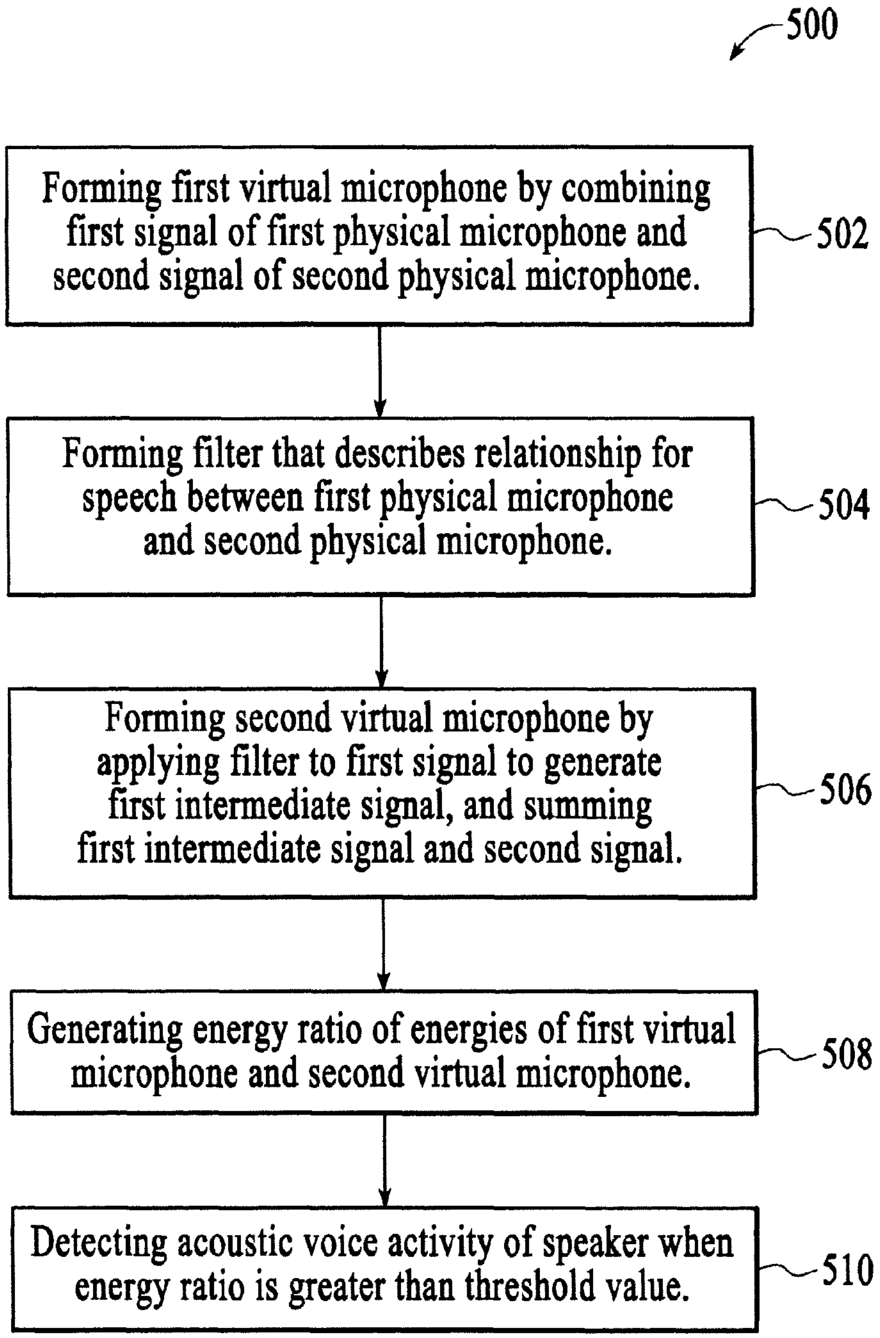
FIG. 5 is a flow diagram of acoustic voice activity detection, under an embodiment.

FIG. 5 is a flow diagram of acoustic voice activity detection 500, under an embodiment. The detection comprises forming a first virtual microphone by combining a first signal of a first physical microphone and a second signal of a second physical microphone 502. The detection comprises forming a filter that describes a relationship for speech between the first physical microphone and the second physical microphone 504. The detection comprises forming a second virtual microphone by applying the filter to the first signal to generate a first intermediate signal, and summing the first intermediate signal and the second signal 506. The detection comprises generating an energy ratio of energies of the first virtual microphone and the second virtual microphone 508. The detection comprises detecting acoustic voice activity of a speaker when the energy ratio is greater than a threshold value 510.

The accuracy of the adaptation to the β(z) of the system is a factor in determining the effectiveness of the AVAD. A more accurate adaptation to the actual β(z) of the system leads to lower energy of the speech response in $V_2$, and a higher ratio R. The noise (far-field) magnitude response is largely unchanged by the adaptation process, so the ratio R will be near unity for accurately adapted beta. For purposes of accuracy, the system can be trained on speech alone, or the noise should be low enough in energy so as not to affect or to have a minimal affect the training.

To make the training as accurate as possible, the coefficients of the filter β(z) of an embodiment are generally updated under the following conditions, but the embodiment is not so limited: speech is being produced (requires a relatively high SNR or other method of detection such as an Aliph Skin Surface Microphone (SSM) as described in U.S. patent application Ser. No. 10/769,302, filed Jan. 30, 2004, which is incorporated by reference herein in its entirety); no wind is detected (wind can be detected using many different methods known in the art, such as examining the microphones for uncorrelated low-frequency noise); and the current value of R is much larger than a smoothed history of R values (this ensures that training occurs only when strong speech is present). These procedures are flexible and others may be used without significantly affecting the performance of the system. These restrictions can make the system relatively more robust.

Even with these precautions, it is possible that the system accidentally trains on noise (e.g., there may be a higher likelihood of this without use of a non-acoustic VAD device such as the SSM used in the Jawbone headset produced by Aliph, San Francisco, Calif.). Thus, an embodiment includes a further failsafe system to preclude accidental training from significantly disrupting the system. The adaptive β is limited to certain values expected for speech. For example, values for $d_1$ for an ear-mounted headset will normally fall between 9 and 14 centimeters, so using an array length of 2 $d_0$=2.0 cm and Equation 2 above, $$|\beta(z)| = \frac{d_1}{d_2} \approx \frac{d_1}{d_1 + 2d_0}$$

which means that $$0.82<|\beta(z)|<0.88.$$

The magnitude of the β filter can therefore be limited to between approximately 0.82 and 0.88 to preclude problems if noise is present during training. Looser limits can be used to compensate for inaccurate calibrations (the response of omnidirectional microphones is usually calibrated to one another so that their frequency response is the same to the same acoustic source—if the calibration is not completely accurate the virtual microphones may not form properly).

Similarly, the phase of the β filter can be limited to be what is expected from a speech source within +−30 degrees from the axis of the array. As described herein, and with reference to FIG. 1, $$\gamma = \frac{d_2 - d_1}{c}\text{(seconds)}$$
$$d_1 = \sqrt{d_s^2 - 2d_s d_0 \cos(\theta) + d_0^2}$$
$$d_2 = \sqrt{d_s^2 + 2d_s d_0 \cos(\theta) + d_0^2}$$

where $d_s$ is the distance from the midpoint of the array to the speech source. Varying $d_s$ from 10 to 15 cm and allowing θ to vary between 0 and +−30 degrees, the maximum difference in γ results from the difference of γ at 0 degrees (58.8 μsec) and γ at +−30 degrees for $d_s$=10 cm (50.8 μsec). This means that the maximum expected phase difference is 58.8−50.8=8.0 μsec, or 0.064 samples at an 8 kHz sampling rate. Since $$\varphi(f)=2\pi ft=2\pi f(08.0\times10^{-6})\text{ rad}$$

the maximum phase difference realized at 4 kHz is only 0.2 rad or about 11.4 degrees, a small amount, but not a negligible one. Therefore the β filter should almost linear phase, but some allowance made for differences in position and angle. In practice a slightly larger amount was used (0.071 samples at 8 kHz) in order to compensate for poor calibration and diffraction effects, and this worked well. The limit on the phase in the example below was implemented as the ratio of the central tap energy to the combined energy of the other taps:

$$\text{phase limit ratio} = \frac{(\text{center tap})^2}{\|\beta\|}$$

where β is the current estimate. This limits the phase by restricting the effects of the non-center taps. Other ways of limiting the phase of the beta filter are known to those skilled in the art and the algorithm presented here is not so limited.

Embodiments are presented herein that use both a fixed β(z) and an adaptive β(z), as described in detail above. In both cases, R was calculated using frequencies between 250 and 3000 Hz using a window size of 200 samples at 8 kHz. The results for $V_1$ (top plot), $V_2$ (middle plot), R (bottom plot, solid line, windowed using a 200 sample rectangular window at 8 kHz) and the VAD (bottom plot, dashed line) are shown in FIGS. 6-11. FIGS. 6-11 demonstrate the use of a fixed beta filter β(z) in conditions of only noise (street and bus noise, approximately 70 dB SPL at the ear), only speech (normalized to 94 dB SPL at the mouth reference point (MRP)), and mixed noise and speech, respectively. A Bruel & Kjaer Head and Torso Simulator (HATS) was used for the tests and the omnidirectional microphones mounted on HATS' ear with the midline of the array approximately 11 cm from the MRP. The fixed beta filter used was $\beta_F(z)=0.82$, where the "F" subscript indicates a fixed filter. The VAD was calculated using a fixed threshold of 1.5.

Figure 6:
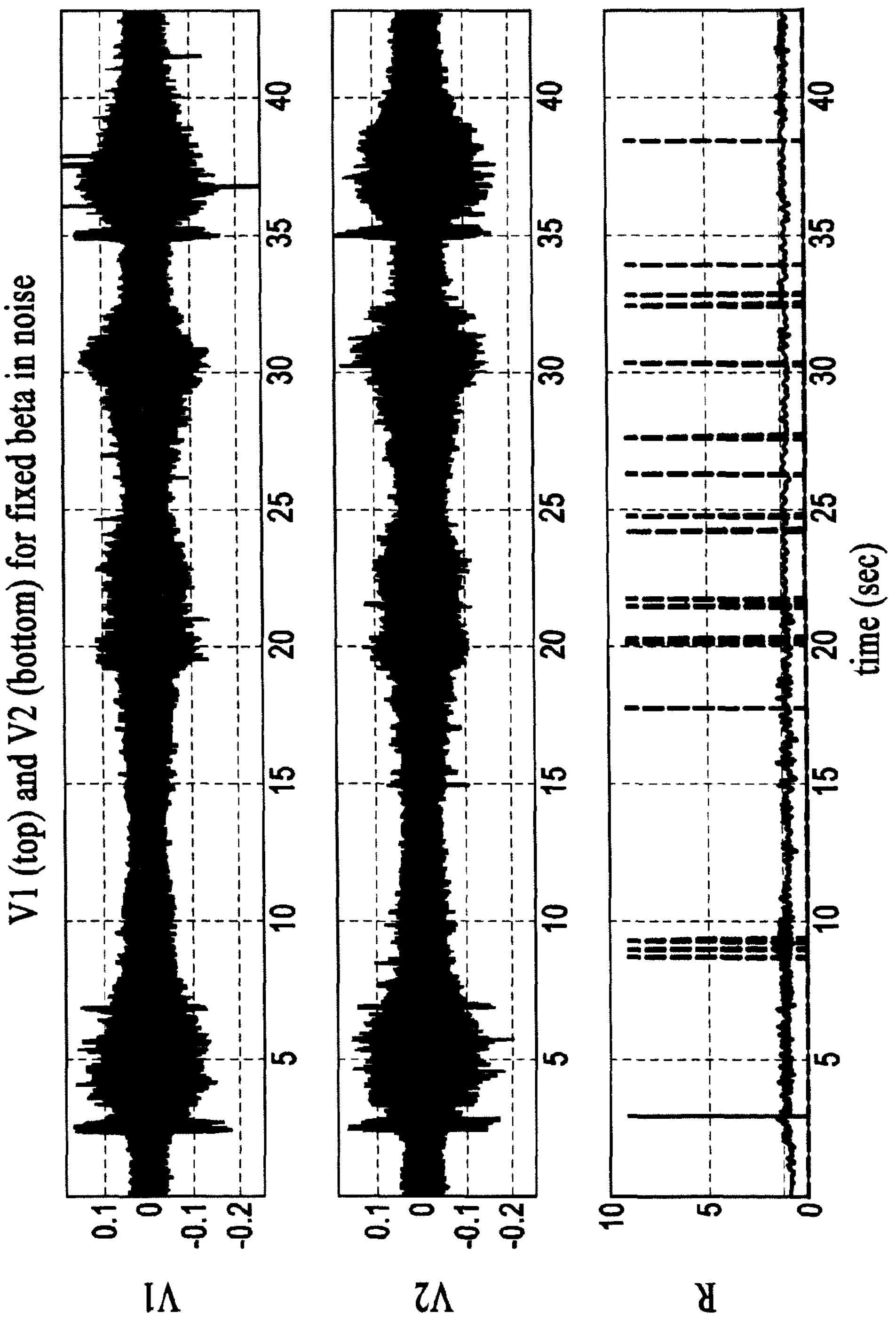
FIG. 6 shows experimental results of the algorithm using a fixed beta when only noise is present, under an embodiment.

FIG. 6 shows experimental results of the algorithm using a fixed beta when only noise is present, under an embodiment. The top plot is $V_1$, the middle plot is $V_2$, and the bottom plot is R (solid line) and the VAD result (dashed line) versus time. Examining FIG. 6, the response of both $V_1$ and $V_2$ are very similar, and the ratio R is very near unity for the entire sample. The VAD response has occasional false positives denoted by spikes in the R plot (windows that are identified by the algorithm as containing speech when they do not), but these are easily removed using standard pulse removal algorithms and/or smoothing of the R results.

Figure 7:
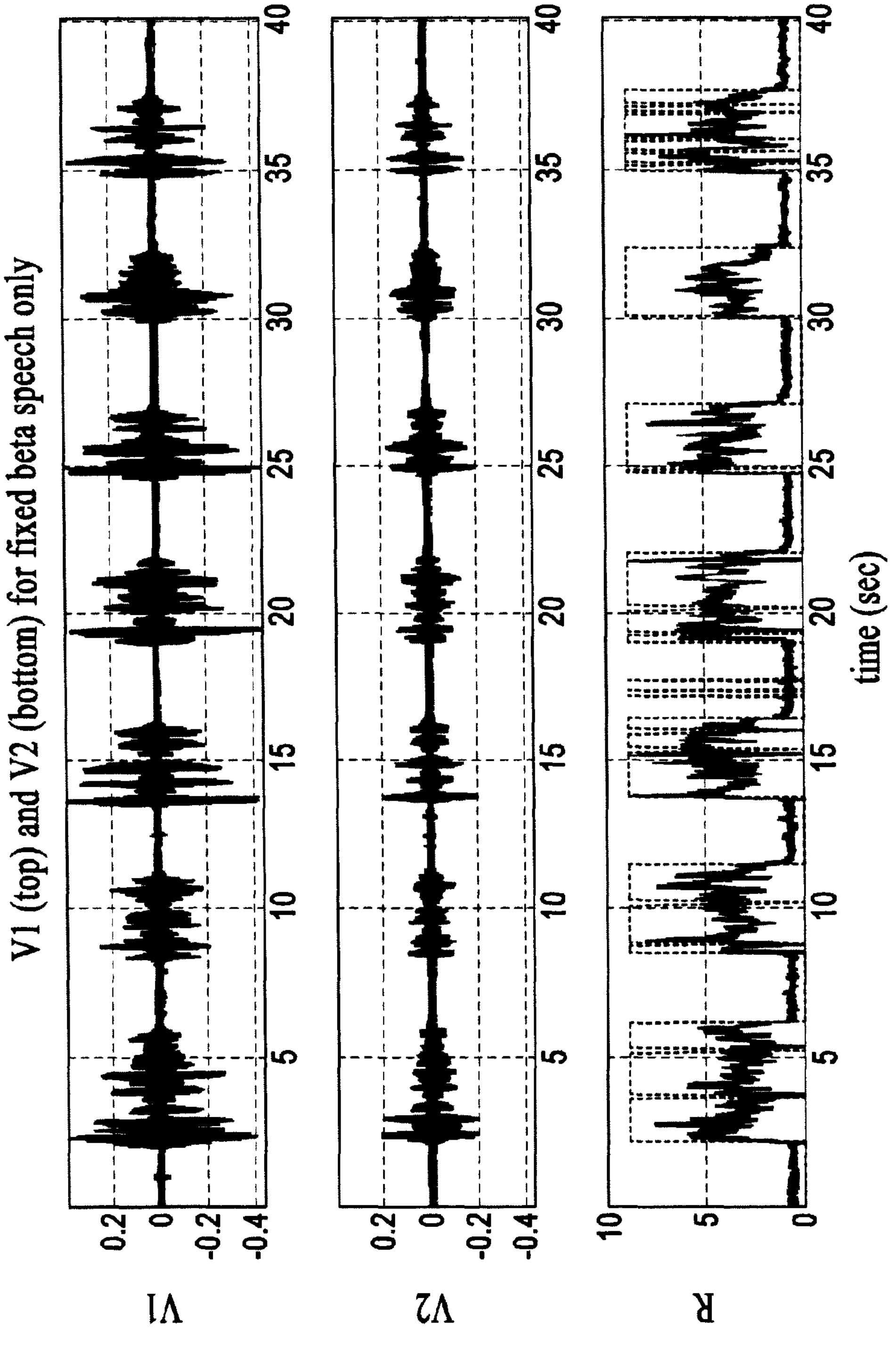
FIG. 7 shows experimental results of the algorithm using a fixed beta when only speech is present, under an embodiment.

FIG. 7 shows experimental results of the algorithm using a fixed beta when only speech is present, under an embodiment. The top plot is $V_1$, the middle plot is $V_2$, and the bottom plot is R (solid line) and the VAD result (dashed line) versus time. The R ratio is between approximately 2 and approximately 7 on average, and the speech is easily discernable using the fixed threshold. These results show that the response of the two virtual microphones to speech are very different, and indeed that ratio R varies from 2-7 during speech. There are very few false positives and very few false negatives (windows that contain speech but are not identified as speech windows). The speech is easily and accurately detected.

Figure 8:
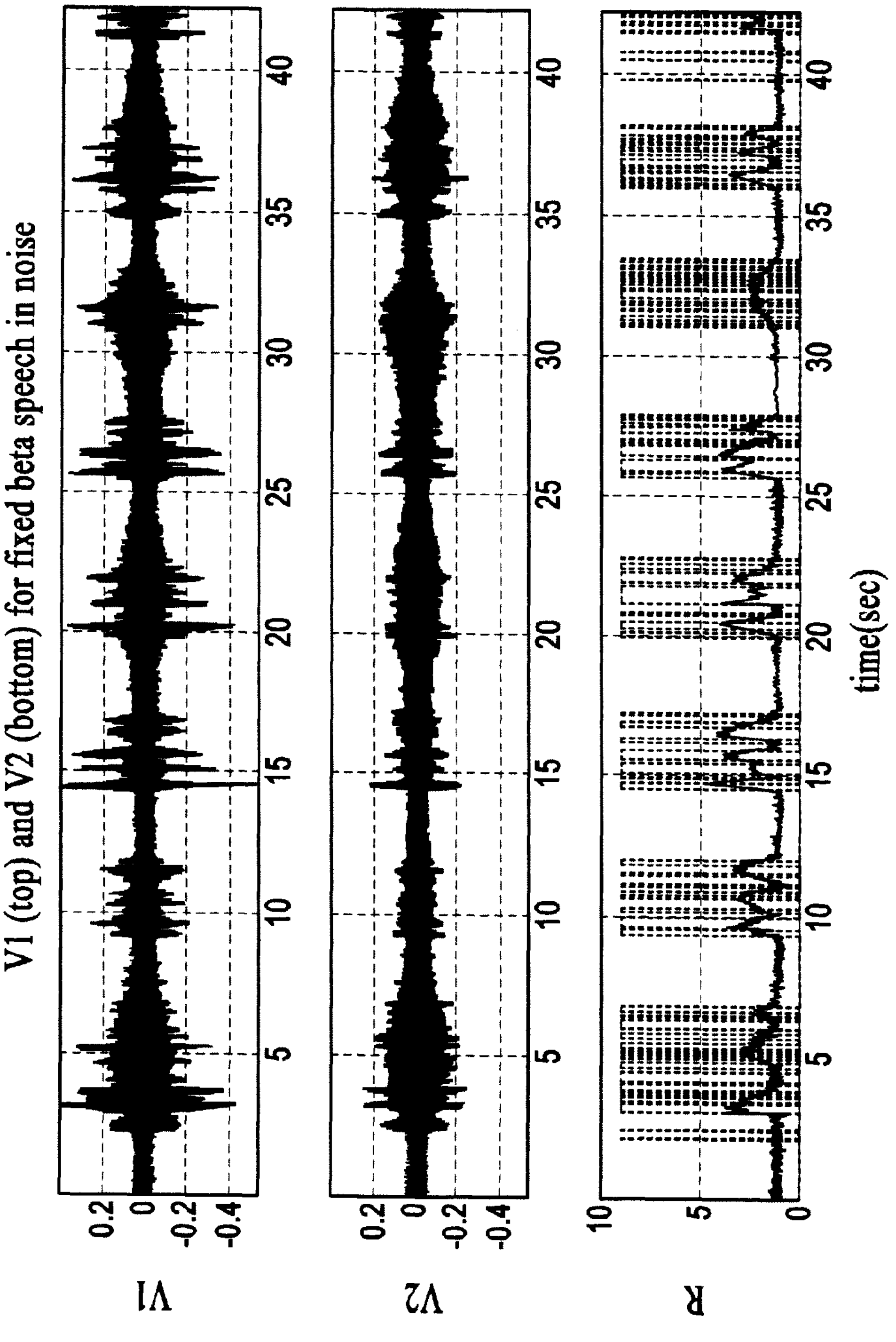
FIG. 8 shows experimental results of the algorithm using a fixed beta when speech and noise is present, under an embodiment.

FIG. 8 shows experimental results of the algorithm using a fixed beta when speech and noise is present, under an embodiment. The top plot is $V_1$, the middle plot is $V_2$, and the bottom plot is R (solid line) and the VAD result (dashed line) versus time. The R ratio is lower than when no noise is present, but the VAD remains accurate with only a few false positives. There are more false negatives than with no noise, but the speech remains easily detectable using standard thresholding algorithms. Even in a moderately loud noise environment (FIG. 8) the R ratio remains significantly above unity, and the VAD once again returns few false positives. More false negatives are observed, but these may be reduced using standard methods such as smoothing of R and allowing the VAD to continue reporting voiced windows for a few windows after R is under the threshold.

Figure 9:
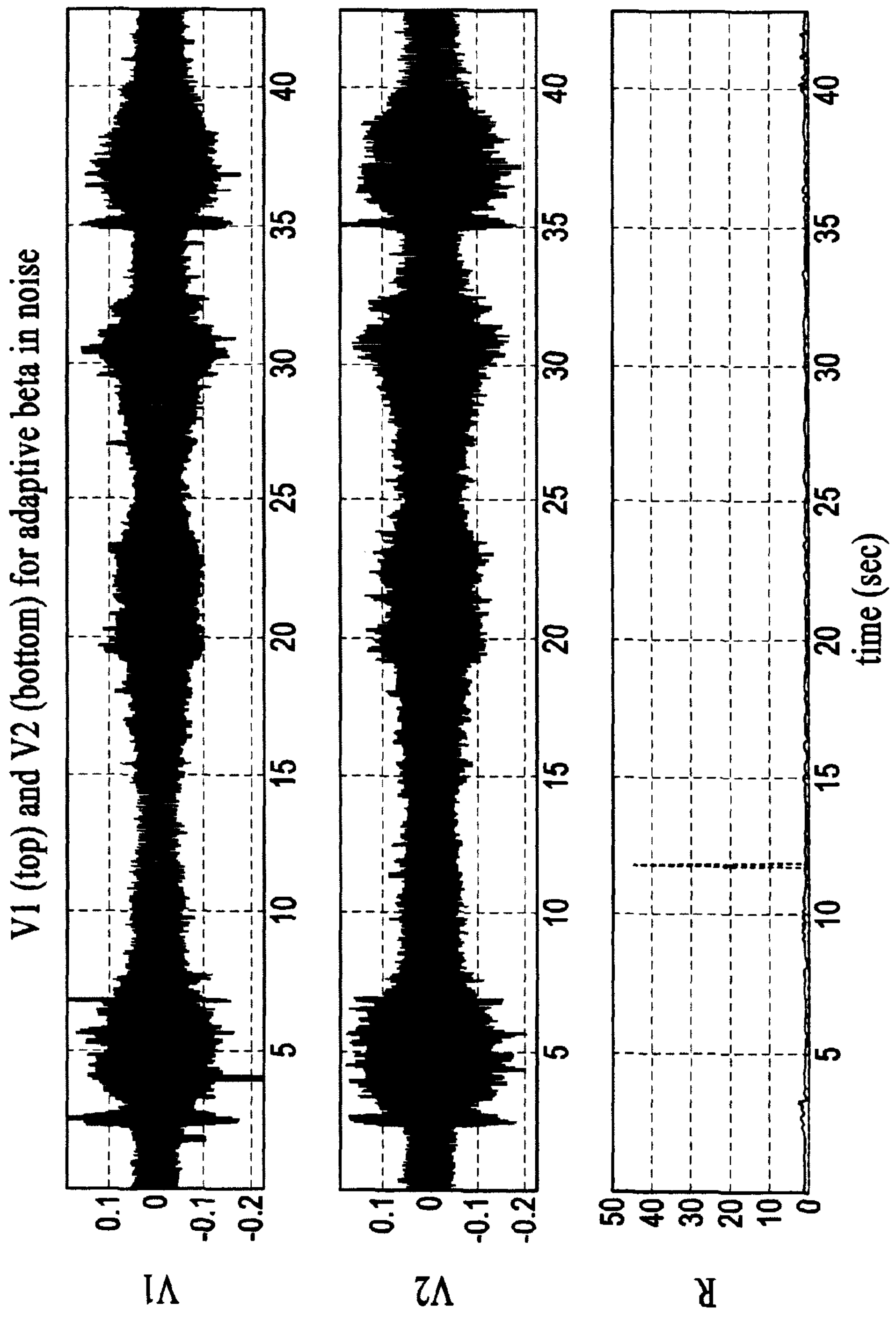
FIG. 9 shows experimental results of the algorithm using an adaptive beta when only noise is present, under an embodiment.
Figure 10:
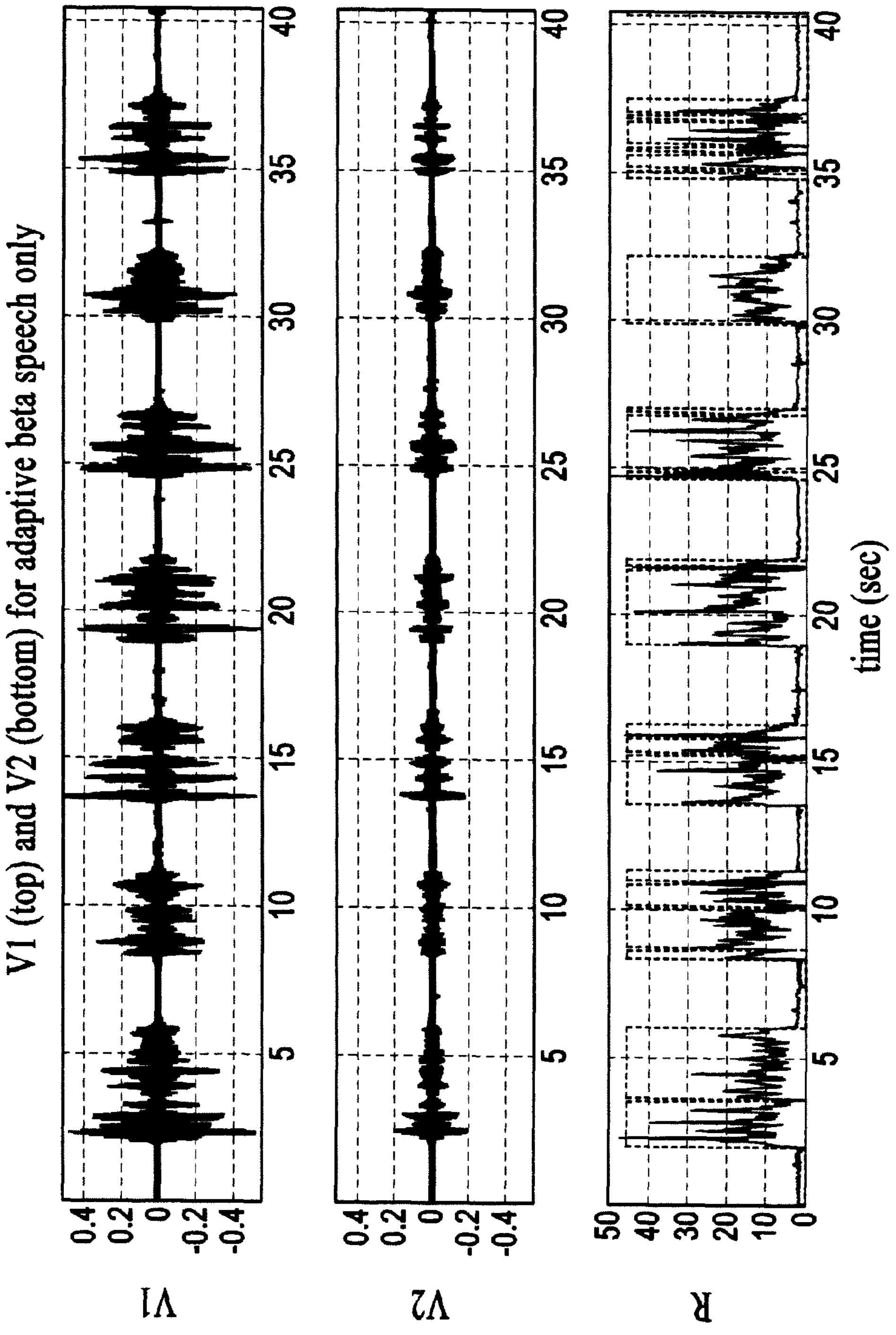
FIG. 10 shows experimental results of the algorithm using an adaptive beta when only speech is present, under an embodiment.
Figure 11:
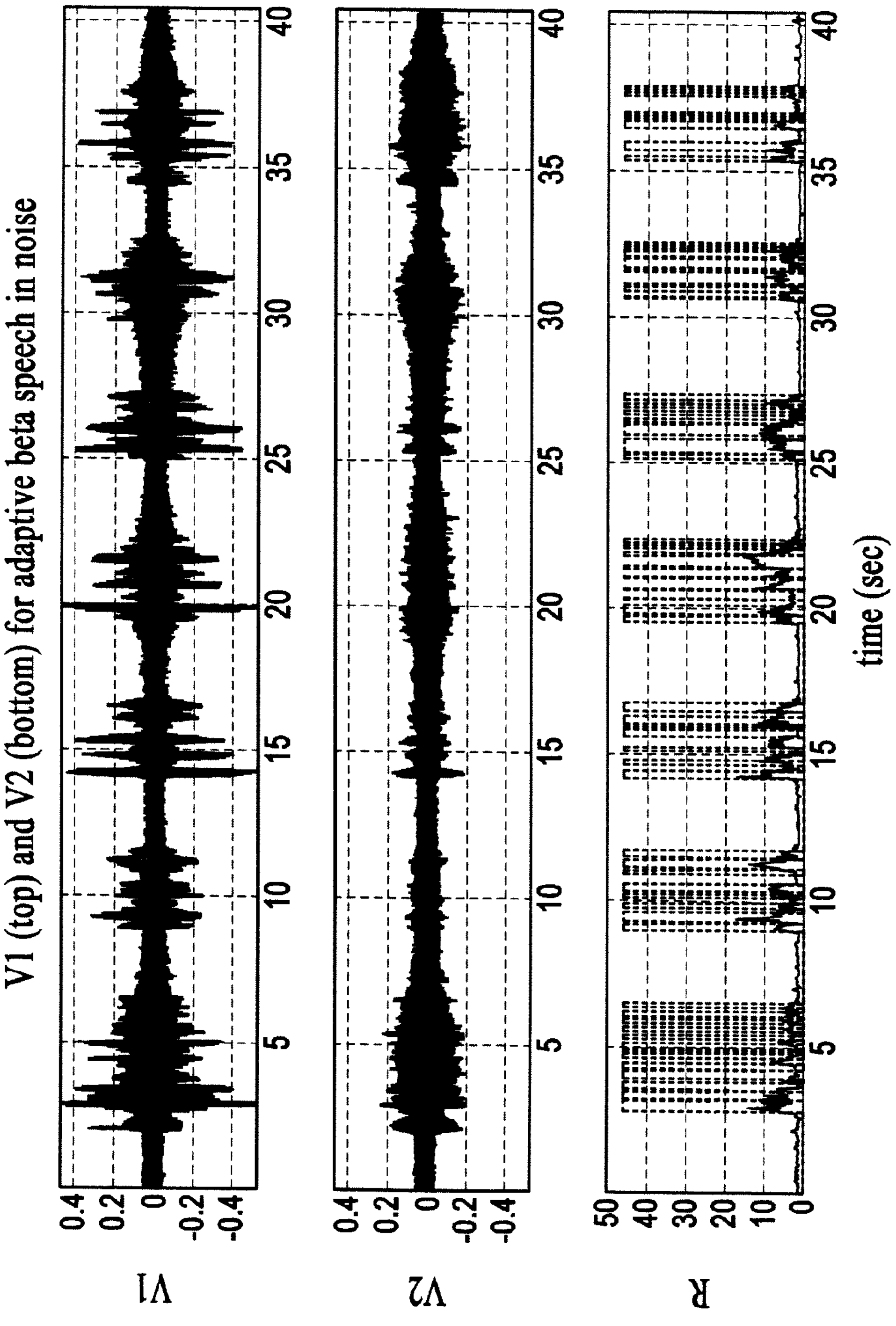
FIG. 11 shows experimental results of the algorithm using an adaptive beta when speech and noise is present, under an embodiment.

Results using the adaptive beta filter are shown in FIGS. 9-11. The adaptive filter used was a five-tap NLMS FIR filter using the frequency band from 100 Hz to 3500 Hz. A fixed filter of $z^{-0.43}$ is used to filter $O_1$ so that $O_1$ and $O_2$ are aligned for speech before the adaptive filter is calculated. The adaptive filter was constrained using the methods above using a low $\beta$ limit of 0.73, a high $\beta$ limit of 0.98, and a phase limit ratio of 0.98. Again a fixed threshold was used to generate the VAD result from the ratio R, but in this case a threshold value of 2.5 was used since the R values using the adaptive beta filter are normally greater than when the fixed filter is used. This allows for a reduction of false positives without significantly increasing false negatives.

FIG. 9 shows experimental results of the algorithm using an adaptive beta when only noise is present, under an embodiment. The top plot is $V_1$, the middle plot is $V_2$, and the bottom plot is R (solid line) and the VAD result (dashed line) versus time, with the y-axis expanded to 0-50. Again, $V_1$ and $V_2$ are very close in energy and the R ratio is near unity. Only a single false positive was generated.

FIG. 10 shows experimental results of the algorithm using an adaptive beta when only speech is present, under an embodiment. The top plot is $V_1$, the middle plot is $V_2$, and the bottom plot is (solid line) and the VAD result (dashed line) versus time, expanded to 0-50. The $V_2$ response is greatly reduced using the adaptive beta, and the R ratio has increased from the range of approximately 2-7 to the range of approximately 5-30 on average, making the speech even simpler to detect using standard thresholding algorithms. There are almost no false positives or false negatives. Therefore, the response of $V_2$ to speech is minimal, R is very high, and all of the speech is easily detected with almost no false positives.

FIG. 11 shows experimental results of the algorithm using an adaptive beta when speech and noise is present, under an embodiment. The top plot is $V_1$, the middle plot is $V_2$, and the bottom plot is R (solid line) and the VAD result (dashed line) versus time, with the y-axis expanded to 0-50. The R ratio is again lower than when no noise is present, but this R with significant noise present results in a VAD signal that is about the same as the case using the fixed beta with no noise present. This shows that use of the adaptive beta allows the system to perform well in higher noise environments than the fixed beta. Therefore, with mixed noise and speech, there are again very few false positives and fewer false negatives than in the results of FIG. 8, demonstrating that the adaptive filter can outperform the fixed filter in the same noise environment. In practice, the adaptive filter has proven to be significantly more sensitive to speech and less sensitive to noise.

Detecting Voiced and Unvoiced Speech Using Both Acoustic and Nonacoustic Sensors Systems and methods for discriminating voiced and unvoiced speech from background noise are now described including a Pathfinder Speech Activity Detection (PSAD) system, referenced above, and a Non-Acoustic Sensor Voiced Speech Activity Detection (NAVSAD) system. The noise removal and reduction methods provided herein, while allowing for the separation and classification of unvoiced and voiced human speech from background noise, address the shortcomings of typical systems known in the art by cleaning acoustic signals of interest without distortion.

Figure 12:
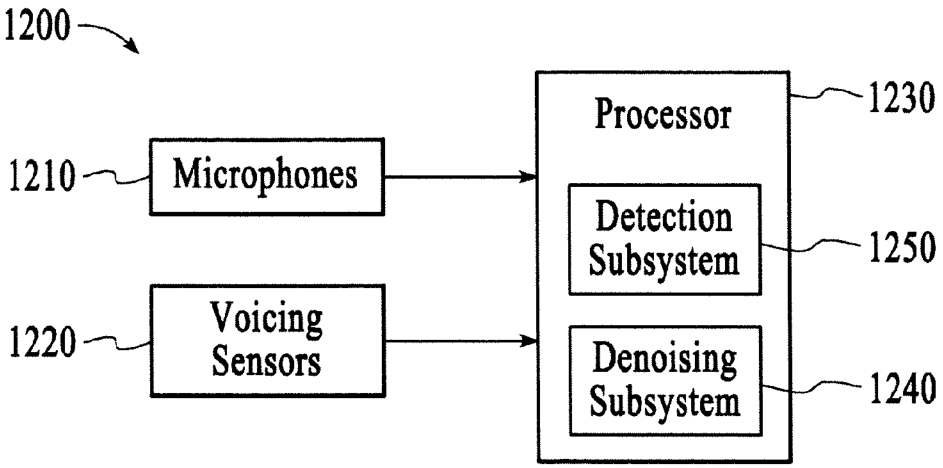
FIG. 12 is a block diagram of a NAVSAD system, under an embodiment.
Figure 13:
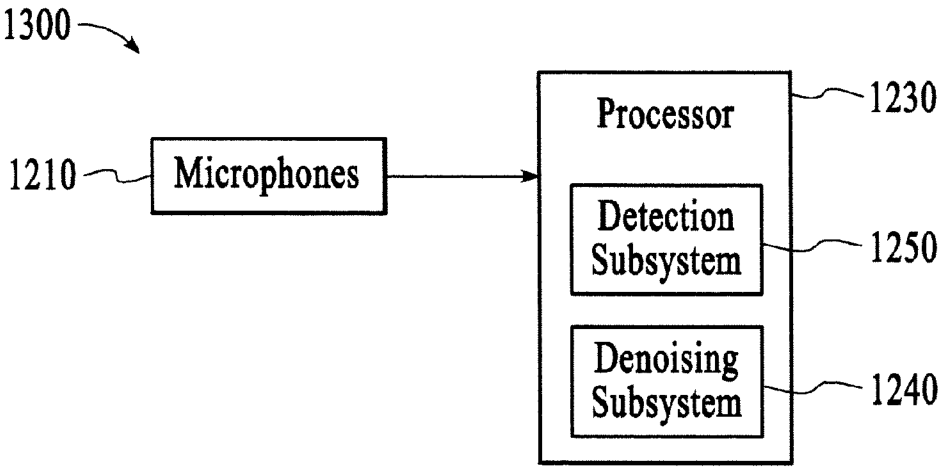
FIG. 13 is a block diagram of a PSAD system, under an embodiment.

FIG. 12 is a block diagram of a NAVSAD system 1200, under an embodiment. The NAVSAD system couples microphones 1210 and sensors 1220 to at least one processor 1230. The sensors 1220 of an embodiment include voicing activity detectors or non-acoustic sensors. The processor 1230 controls subsystems including a detection subsystem 1250, referred to herein as a detection algorithm, and a denoising subsystem 1240. Operation of the denoising subsystem 1240 is described in detail in the Related Applications. The NAVSAD system works extremely well in any background acoustic noise environment FIG. 13 is a block diagram of a PSAD system 1300, under an embodiment. The PSAD system couples microphones 1210 to at least one processor 1230. The processor 1230 includes a detection subsystem 1250, referred to herein as a detection algorithm, and a denoising subsystem 1240. The PSAD system is highly sensitive in low acoustic noise environments and relatively insensitive in high acoustic noise environments. The PSAD can operate independently or as a backup to the NAVSAD, detecting voiced speech if the NAVSAD fails.

Note that the detection subsystems 1250 and denoising subsystems 1240 of both the NAVSAD and PSAD systems of an embodiment are algorithms controlled by the processor 1230, but are not so limited. Alternative embodiments of the NAVSAD and PSAD systems can include detection subsystems 1250 and/or denoising subsystems 1240 that comprise additional hardware, firmware, software, and/or combinations of hardware, firmware, and software. Furthermore, functions of the detection subsystems 1250 and denoising subsystems 1240 may be distributed across numerous components of the NAVSAD and PSAD systems.

Figure 14:
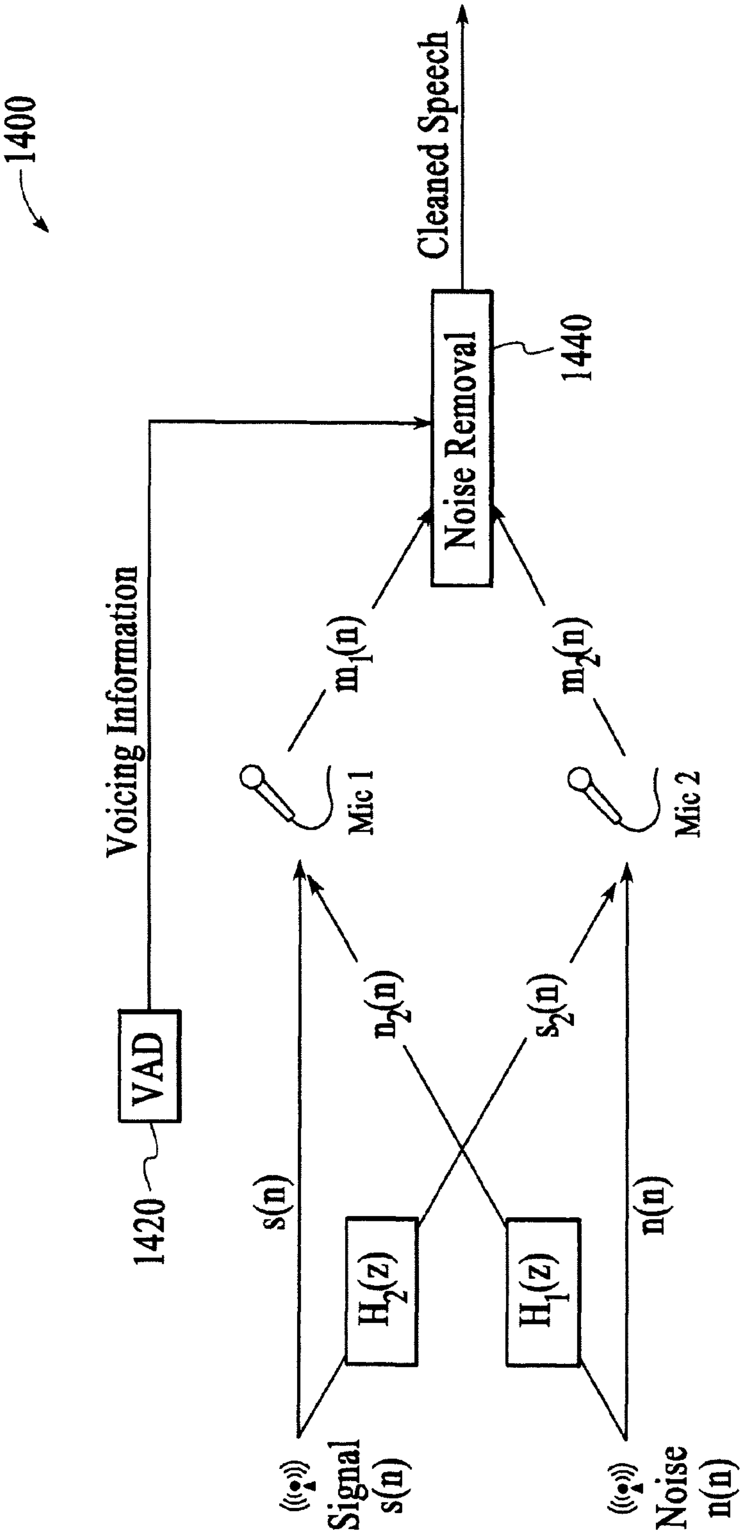
FIG. 14 is a block diagram of a denoising subsystem, referred to herein as the Pathfinder system, under an embodiment.

FIG. 14 is a block diagram of a denoising subsystem 1400, referred to herein as the Pathfinder system, under an embodiment. The Pathfinder system is briefly described below, and is described in detail in the Related Applications. Two microphones Mic 1 and Mic 2 are used in the Pathfinder system, and Mic 1 is considered the "signal" microphone. With reference to FIG. 12, the Pathfinder system 1400 is equivalent to the NAVSAD system 1200 when the voicing activity detector (VAD) 1420 is a non-acoustic voicing sensor 1220 and the noise removal subsystem 1440 includes the detection subsystem 1250 and the denoising subsystem 1240. With reference to FIG. 13, the Pathfinder system 1400 is equivalent to the PSAD system 1300 in the absence of the VAD 1420, and when the noise removal subsystem 1440 includes the detection subsystem 1250 and the denoising subsystem 1240.

The NAVSAD and PSAD systems support a two-level commercial approach in which (i) a relatively less expensive PSAD system supports an acoustic approach that functions in most low- to medium-noise environments, and (ii) a NAVSAD system adds a non-acoustic sensor to enable detection of voiced speech in any environment. Unvoiced speech is normally not detected using the sensor, as it normally does not sufficiently vibrate human tissue. However, in high noise situations detecting the unvoiced speech is not as important, as it is normally very low in energy and easily washed out by the noise Therefore in high noise environments the unvoiced speech is unlikely to affect the voiced speech denoising. Unvoiced speech information is most important in the presence of little to no noise and, therefore, the unvoiced detection should be highly sensitive in low noise situations, and insensitive in high noise situations. This is not easily accomplished, and comparable acoustic unvoiced detectors known in the art are incapable of operating under these environmental constraints.

The NAVSAD and PSAD systems include an array algorithm for speech detection that uses the difference in frequency content between two microphones to calculate a relationship between the signals of the two microphones. This is in contrast to conventional arrays that attempt to use the time/phase difference of each microphone to remove the noise outside of an "area of sensitivity". The methods described herein provide a significant advantage, as they do not require a specific orientation of the array with respect to the signal.

Further, the systems described herein are sensitive to noise of every type and every orientation, unlike conventional arrays that depend on specific noise orientations. Consequently, the frequency-based arrays presented herein are unique as they depend only on the relative orientation of the two microphones themselves with no dependence on the orientation of the noise and signal with respect to the microphones. This results in a robust signal processing system with respect to the type of noise, microphones, and orientation between the noise/signal source and the microphones.

The systems described herein use the information derived from the Pathfinder noise suppression system and/or a non-acoustic sensor described in the Related Applications to determine the voicing state of an input signal, as described in detail below. The voicing state includes silent, voiced, and unvoiced states. The NAVSAD system, for example, includes a non-acoustic sensor to detect the vibration of human tissue associated with speech. The non-acoustic sensor of an embodiment is a General Electromagnetic Movement Sensor (GEMS) as described briefly below and in detail in the Related Applications, but is not so limited Alternative embodiments, however, may use any sensor that is able to detect human tissue motion associated with speech and is unaffected by environmental acoustic noise.

The GEMS is a radio frequency device (2.4 GHz) that allows the detection of moving human tissue dielectric interfaces The GEMS includes an RF interferometer that uses homodyne mixing to detect small phase shifts associated with target motion. In essence, the sensor sends out weak electromagnetic waves (less than 1 milliwatt) that reflect off of whatever is around the sensor. The reflected waves are mixed with the original transmitted waves and the results analyzed for any change in position of the targets. Anything that moves near the sensor will cause a change in phase of the reflected wave that will be amplified and displayed as a change in voltage output from the sensor. A similar sensor is described by Gregory C Burnett (1999) in "The physiological basis of glottal electromagnetic micropower sensors (GEMS) and their use in defining an excitation function for the human vocal tract"; Ph.D. Thesis, University of California at Davis.

Figure 15:
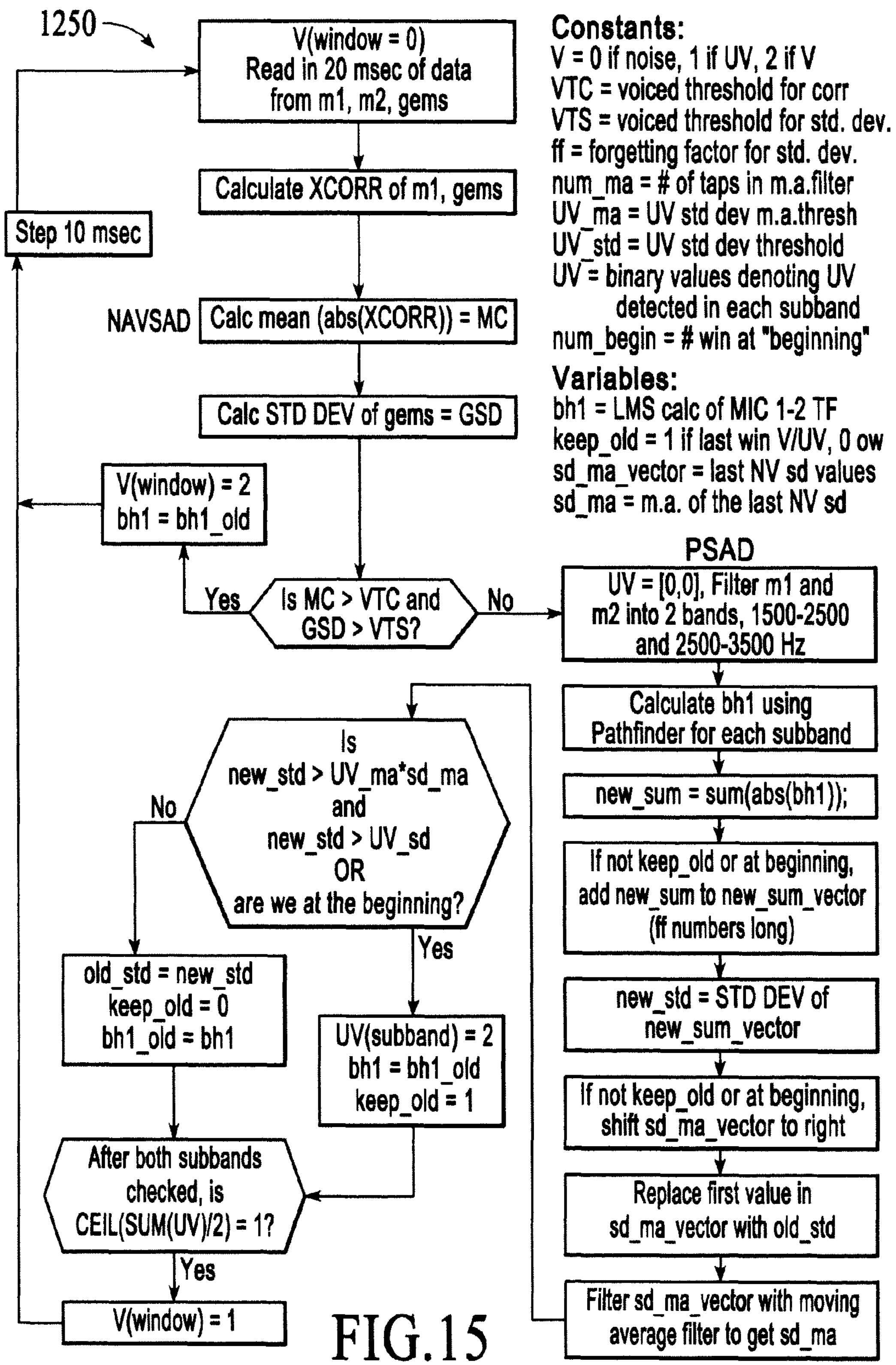
FIG. 15 is a flow diagram of a detection algorithm for use in detecting voice and unvoiced speech, under an embodiment.

FIG. 15 is a flow diagram of a detection algorithm 1250 for use in detecting voiced and unvoiced speech, under an embodiment. With reference to FIGS. 12 and 13, both the NAVSAD and PSAD systems of an embodiment include the detection algorithm 1250 as the detection subsystem 1250. This detection algorithm 1250 operates in real-time and, in an embodiment, operates on 20 millisecond windows and steps 10 milliseconds at a time, but is not so limited. The voice activity determination is recorded for the first 10 milliseconds, and the second 10 milliseconds functions as a "look-ahead" buffer. While an embodiment uses the 20/10 windows, alternative embodiments may use numerous other combinations of window values.

Consideration was given to a number of multi-dimensional factors in developing the detection algorithm 1250. The biggest consideration was to maintaining the effectiveness of the Pathfinder denoising technique, described in detail in the Related Applications and reviewed herein. Pathfinder performance can be compromised if the adaptive filter training is conducted on speech rather than on noise. It is therefore important not to exclude any significant amount of speech from the VAD to keep such disturbances to a minimum.

Consideration was also given to the accuracy of the characterization between voiced and unvoiced speech signals, and distinguishing each of these speech signals from noise signals. This type of characterization can be useful in such applications as speech recognition and speaker verification.

Furthermore, the systems using the detection algorithm of an embodiment function in environments containing varying amounts of background acoustic noise. If the non-acoustic sensor is available, this external noise is not a problem for voiced speech. However, for unvoiced speech (and voiced if the non-acoustic sensor is not available or has malfunctioned) reliance is placed on acoustic data alone to separate noise from unvoiced speech. An advantage inheres in the use of two microphones in an embodiment of the Pathfinder noise suppression system, and the spatial relationship between the microphones is exploited to assist in the detection of unvoiced speech. However, there may occasionally be noise levels high enough that the speech will be nearly undetectable and the acoustic-only method will fail. In these situations, the non-acoustic sensor (or hereafter just the sensor) will be required to ensure good performance.

In the two-microphone system, the speech source should be relatively louder in one designated microphone when compared to the other microphone. Tests have shown that this requirement is easily met with conventional microphones when the microphones are placed on the head, as any noise should result in an $H_1$ with a gain near unity.

Regarding the NAVSAD system, and with reference to FIG. 12 and FIG. 14, the NAVSAD relies on two parameters to detect voiced speech. These two parameters include the energy of the sensor in the window of interest, determined in an embodiment by the standard deviation (SD), and optionally the cross-correlation (XCORR) between the acoustic signal from microphone 1 and the sensor data. The energy of the sensor can be determined in any one of a number of ways, and the SD is just one convenient way to determine the energy.

For the sensor, the SD is akin to the energy of the signal, which normally corresponds quite accurately to the voicing state, but may be susceptible to movement noise (relative motion of the sensor with respect to the human user) and/or electromagnetic noise. To further differentiate sensor noise from tissue motion, the XCORR can be used. The XCORR is only calculated to 15 delays, which corresponds to just under 2 milliseconds at 8000 Hz.

The XCORR can also be useful when the sensor signal is distorted or modulated in some fashion. For example, there are sensor locations (such as the jaw or back of the neck) where speech production can be detected but where the signal may have incorrect or distorted time-based information. That is, they may not have well defined features in time that will match with the acoustic waveform. However, XCORR is more susceptible to errors from acoustic noise, and in high (<0 dB SNR) environments is almost useless. Therefore it should not be the sole source of voicing information.

The sensor detects human tissue motion associated with the closure of the vocal folds, so the acoustic signal produced by the closure of the folds is highly correlated with the closures. Therefore, sensor data that correlates highly with the acoustic signal is declared as speech, and sensor data that does not correlate well is termed noise. The acoustic data is expected to lag behind the sensor data by about 0.1 to 0.8 milliseconds (or about 1-7 samples) as a result of the delay time due to the relatively slower speed of sound (around 330 m/s). However, an embodiment uses a 15-sample correlation, as the acoustic wave shape varies significantly depending on the sound produced, and a larger correlation width is needed to ensure detection.

The SD and XCORR signals are related, but are sufficiently different so that the voiced speech detection is more reliable. For simplicity, though, either parameter may be used. The values for the SD and XCORR are compared to empirical thresholds, and if both are above their threshold, voiced speech is declared. Example data is presented and described below.

Figure 16A:
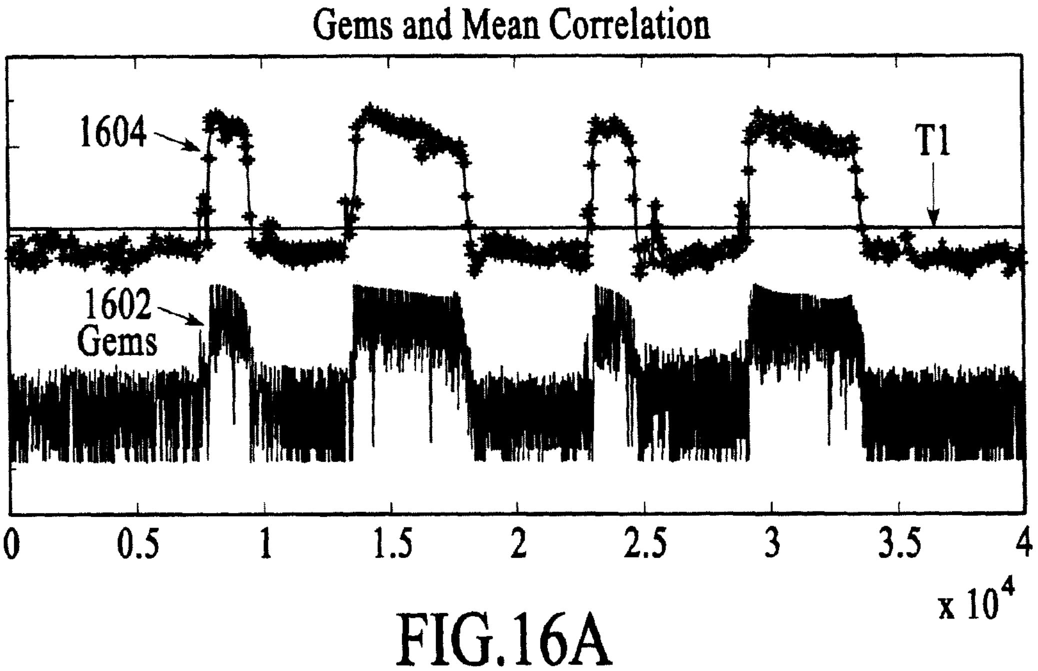
FIGS. 16A, 16B, and 17 show data plots for an example in which a subject twice speaks the phrase "pop pan", under an embodiment.
Figure 16B:
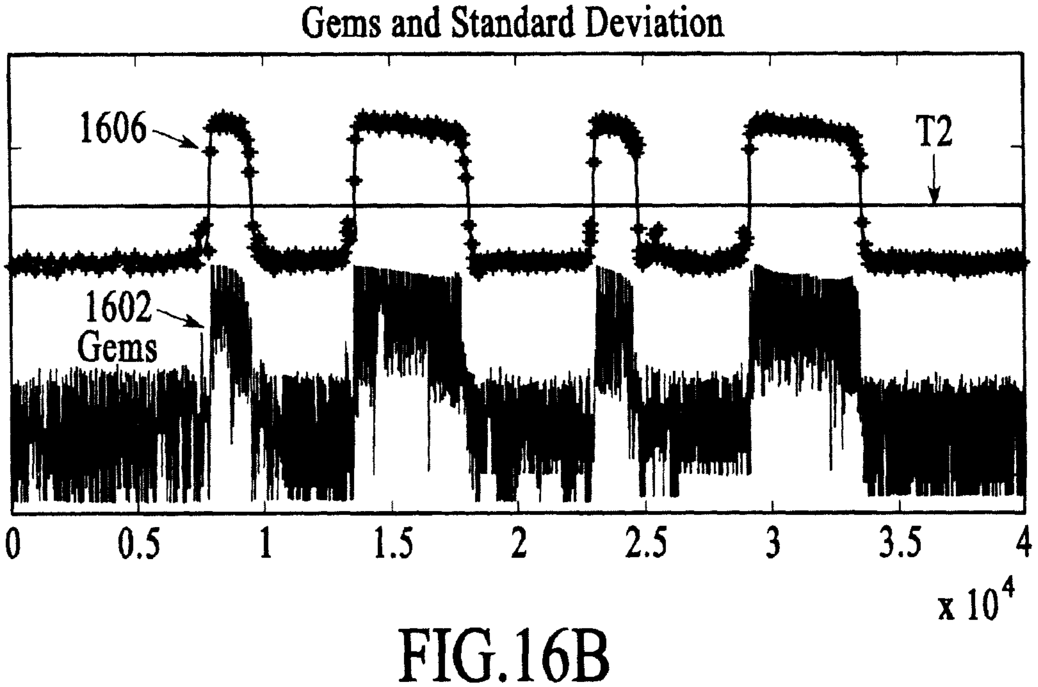
Figure 17:
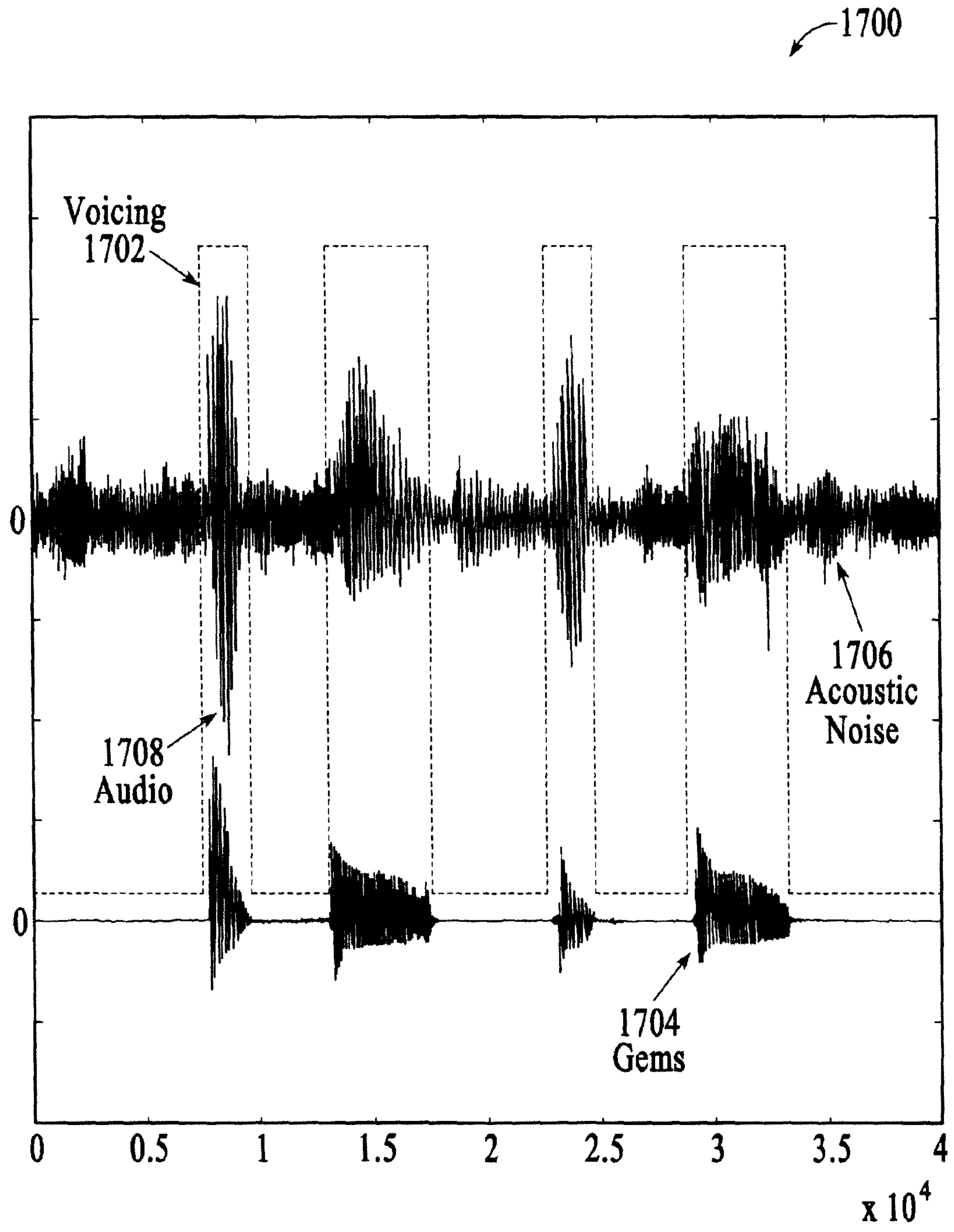

FIGS. 16A, 16B, and 17 show data plots for an example in which a subject twice speaks the phrase "pop pan", under an embodiment. FIG. 16A plots the received GEMS signal 1602 for this utterance along with the mean correlation 1604 between the GEMS signal and the Mic 1 signal and the threshold T1 used for voiced speech detection. FIG. 16B plots the received GEMS signal 1602 for this utterance along with the standard deviation 1606 of the GEMS signal and the threshold T2 used for voiced speech detection. FIG. 17 plots voiced speech 1702 detected from the acoustic or audio signal 1708, along with the GEMS signal 1704 and the acoustic noise 1706, no unvoiced speech is detected in this example because of the heavy background babble noise 1706. The thresholds have been set so that there are virtually no false negatives, and only occasional false positives. A voiced speech activity detection accuracy of greater than 99% has been attained under any acoustic background noise conditions.

The NAVSAD can determine when voiced speech is occurring with high degrees of accuracy due to the non-acoustic sensor data. However, the sensor offers little assistance in separating unvoiced speech from noise, as unvoiced speech normally causes no detectable signal in most non-acoustic sensors. If there is a detectable signal, the NAVSAD can be used, although use of the SD method is dictated as unvoiced speech is normally poorly correlated. In the absence of a detectable signal use is made of the system and methods of the Pathfinder noise removal algorithm in determining when unvoiced speech is occurring. A brief review of the Pathfinder algorithm is described below, while a detailed description is provided in the Related Applications.

With reference to FIG. 14, the acoustic information coming into Microphone 1 is denoted by $m_1(n)$, the information coming into Microphone 2 is similarly labeled $m_2(n)$, and the GEMS sensor is assumed available to determine voiced speech areas. In the z (digital frequency) domain, these signals are represented as $M_1(z)$ and $M_2(z)$. Then $$M_1(z)=S(z)+N_2(z)$$

$$M_2(z)=N(z)+S_2(z)$$

with $$N_2(z)=N(z)H_1(z)$$

$$S_2(z)=S(z)H_2(z)$$

so that $$M_1(z)=S(z)+N_2(z)H_1(z)$$

$$M_2(z)=N(z)+S_2(z)H_2(z)$$

This is the general case for all two microphone systems. There is always going to be some leakage of noise into Mic 1, and some leakage of signal into Mic 2 Equation 1 has four unknowns and only two relationships and cannot be solved explicitly.

However, there is another way to solve for some of the unknowns in Equation 1. Examine the case where the signal is not being generated—that is, where the GEMS signal indicates voicing is not occurring. In this case, s(n)=S(z)=0, and Equation 1 reduces to $$M_{1n}(z)=N(z)H_1(z)$$

$$M_{2n}(z)=N(z)$$

where the n subscript on the M variables indicate that only noise is being received. This leads to $$M_{1n}(z)=M_{2n}(z)H_1(z)$$

$$H_1(z)=\frac{M_{1n}(z)}{M_{2n}(z)}$$

$H_1(z)$ can be calculated using any of the available system identification algorithms and the microphone outputs when only noise is being received. The calculation can be done adaptively, so that if the noise changes significantly $H_1(z)$ can be recalculated quickly.

With a solution for one of the unknowns in Equation 1, solutions can be found for another, $H_2(z)$, by using the amplitude of the GEMS or similar device along with the amplitude of the two microphones. When the GEMS indicates voicing, but the recent (less than 1 second) history of the microphones indicate low levels of noise, assume that n(s)=N(z)~0. Then Equation 1 reduces to $$M_{1s}(z)=S(z)$$

$$M_{2s}(z)=S(z)H_2(z)$$

which in turn leads to $$M_{2S}(z)=M_{1S}(z)H_2(z)$$

$$H_2(z)=\frac{M_{2S}(z)}{M_{1S}(z)}$$

which is the inverse of the $H_1(z)$ calculation, but note that different inputs are being used.

After calculating $H_1(z)$ and $H_2(z)$ above, they are used to remove the noise from the signal. Rewrite Equation 1 as $$S(z)=M_1(z)-N(z)H_1(z)$$

$$N(z)=M_2(z)-S(z)H_2(z)$$

$$S(z)=M_1(z)-[M_2(z)-S(z)H_2(z)]H_1(z),$$

$$S(z)[1-H_2(z)H_1(z)]=M_1(z)-M_2(z)H_1(z)$$

and solve for $S(z)$ as:

$$S(z)=\frac{M_1(z)-M_2(z)H_1(z)}{1-H_2(z)H_1(z)}$$

In practice $H_2(z)$ is usually quite small, so that $H_2(z)H_1(z) \ll 1$, and $$S(z)\approx M_1(z)-M_2(z)H_1(z),$$

obviating the need for the $H_2(z)$ calculation.

With reference to FIG. 13 and FIG. 14, the PSAD system is described. As sound waves propagate, they normally lose energy as they travel due to diffraction and dispersion. Assuming the sound waves originate from a point source and radiate isotropically, their amplitude will decrease as a function of 1/r, where r is the distance from the originating point. This function of 1/r proportional to amplitude is the worst case, if confined to a smaller area the reduction will be less. However it is an adequate model for the configurations of interest, specifically the propagation of noise and speech to microphones located somewhere on the user's head.

Figure 18:
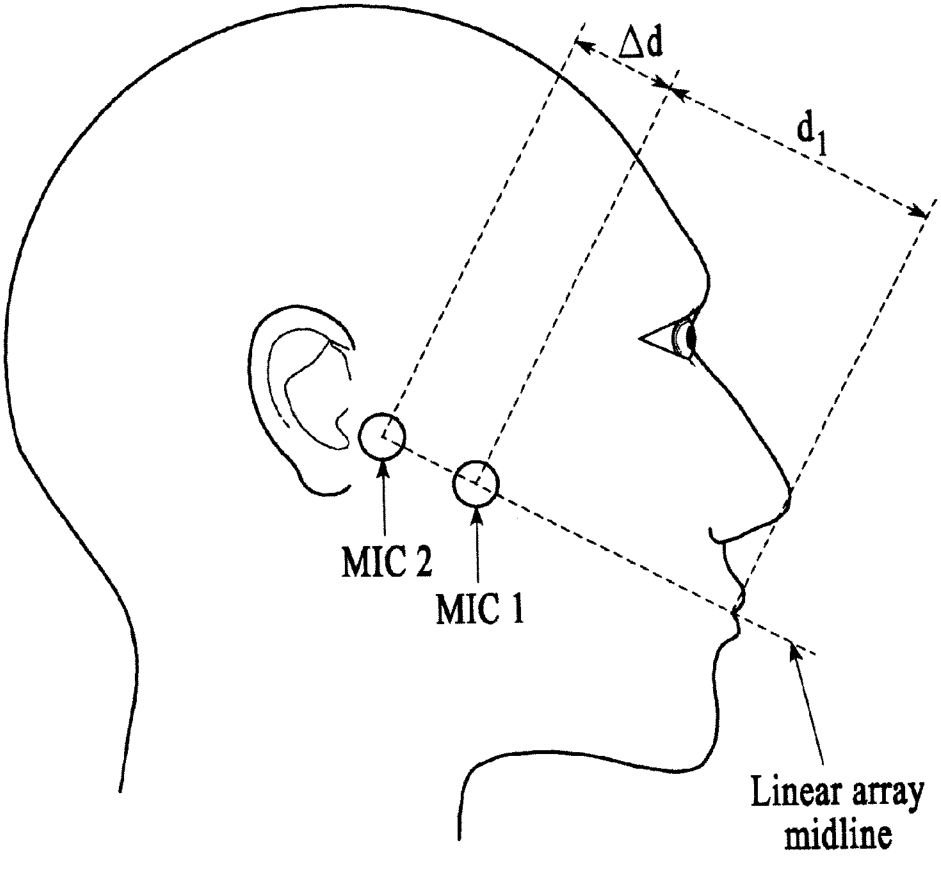
FIG. 18 is a microphone array for use under and embodiment of the PSAD system.

FIG. 18 is a microphone array for use under an embodiment of the PSAD system. Placing the microphones Mic 1 and Mic 2 in a linear array with the mouth on the array midline, the difference in signal strength in Mic 1 and Mic 2 (assuming the microphones have identical frequency responses) will be proportional to both $d_1$ and $\Delta d$. Assuring a 1/r (or in this case 1/d) relationship, it is seen that $$\Delta M=\frac{|Mic1|}{|Mic2|}=\Delta H_1(z)\propto\frac{d_1+\Delta d}{d_1},$$

where ΔM is the difference in gain between Mic 1 and Mic 2 and therefore $H_1(z)$, as above in Equation 2. The variable $d_1$ is the distance from Mic 1 to the speech or noise source.

Figure 19:
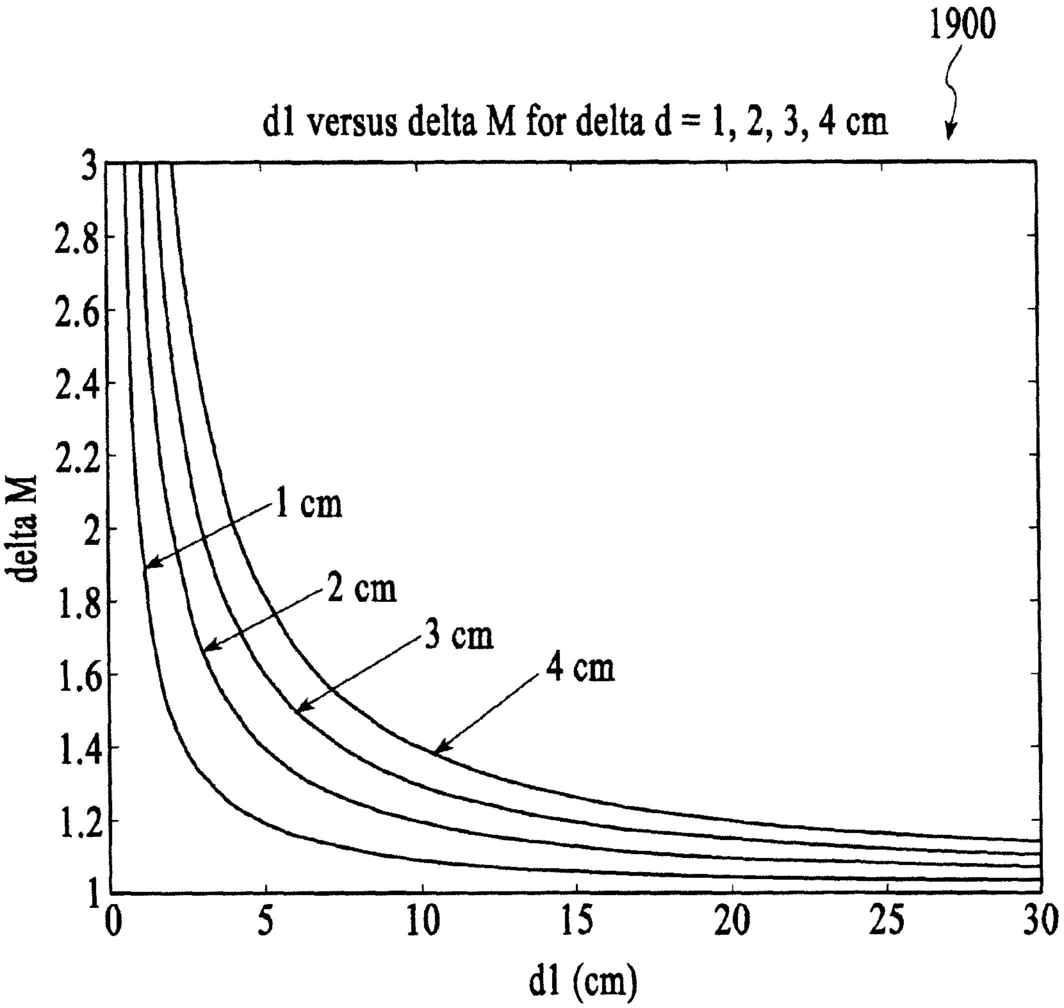
FIG. 19 is a plot of $\Delta M$ versus $d_1$ for server $\Delta d$ values, under an embodiment.

FIG. 19 is a plot 1900 of ΔM versus $d_1$ for several Δd values, under an embodiment. It is clear that as Δd becomes larger and the noise source is closer. ΔM becomes larger. The variable Δd will change depending on the orientation to the speech/noise source, from the maximum value on the array midline to zero perpendicular to the array midline From the plot 1900 it is clear that for small Δd and for distances over approximately 30 centimeters (cm), ΔM is close to unity. Since most noise sources are farther away than 30 cm and are unlikely to be on the midline on the array, it is probable that when calculating $H_1(z)$ as above in Equation 2, ΔM (or equivalently the gain of $H_1(z)$) will be close to unity. Conversely, for noise sources that are close (within a few centimeters), there could be a substantial difference in gain depending on which microphone is closer to the noise.

If the "noise" is the user speaking, and Mic 1 is closer to the mouth than Mic 2, the gain increases. Since environmental noise normally originates much farther away from the user's head than speech, noise will be found during the time when the gain of $H_1(z)$ is near unity or some fixed value, and speech can be found after a sharp rise in gain. The speech can be unvoiced or voiced, as long as it is of sufficient volume compared to the surrounding noise. The gain will stay somewhat high during the speech portions, then descend quickly after speech ceases. The rapid increase and decrease in the gain of $H_1(z)$ should be sufficient to allow the detection of speech under almost any circumstances. The gain in this example is calculated by the sum of the absolute value of the filter coefficients. This sum is not equivalent to the gain, but the two are related in that a rise in the sum of the absolute value reflects a rise in the gain.

Figure 20:
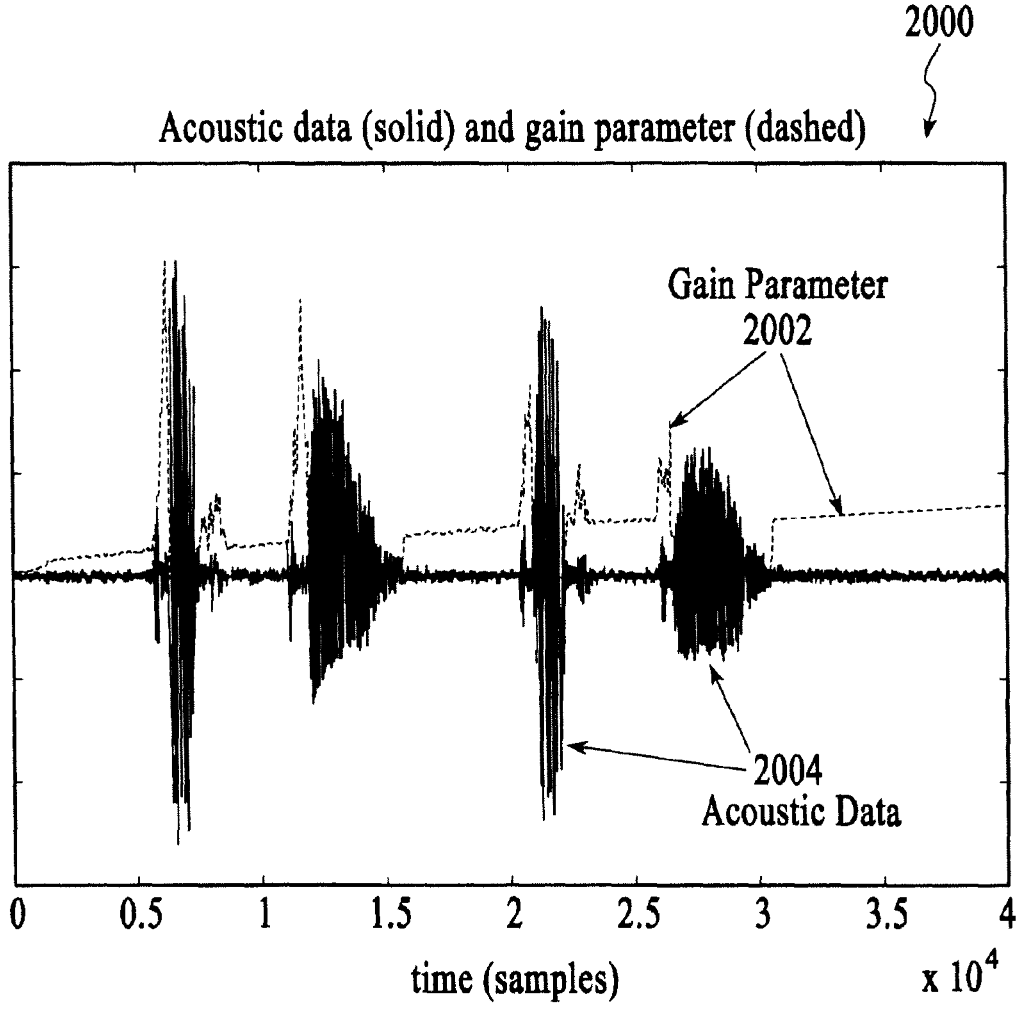
FIG. 20 shows a plot of the gain parameter as the sum of the absolute values of $H_1(z)$ and the acoustic data or audio from microphone 1, under an embodiment.

As an example of this behavior, FIG. 20 shows a plot 2000 of the gain parameter 2002 as the sum of the absolute values of $H_1(z)$ and the acoustic data 2004 or audio from microphone 1. The speech signal was an utterance of the phrase "pop pan", repeated twice. The evaluated bandwidth included the frequency range from 2500 Hz to 3500 Hz, although 1500 Hz to 2500 Hz was additionally used in practice. Note the rapid increase in the gain when the unvoiced speech is first encountered, then the rapid return to normal when the speech ends. The large changes in gain that result from transitions between noise and speech can be detected by any standard signal processing techniques. The standard deviation of the last few gain calculations is used, with thresholds being defined by a running average of the standard deviations and the standard deviation noise floor. The later changes in gain for the voiced speech are suppressed in this plot 2000 for clarity.

Figure 21:
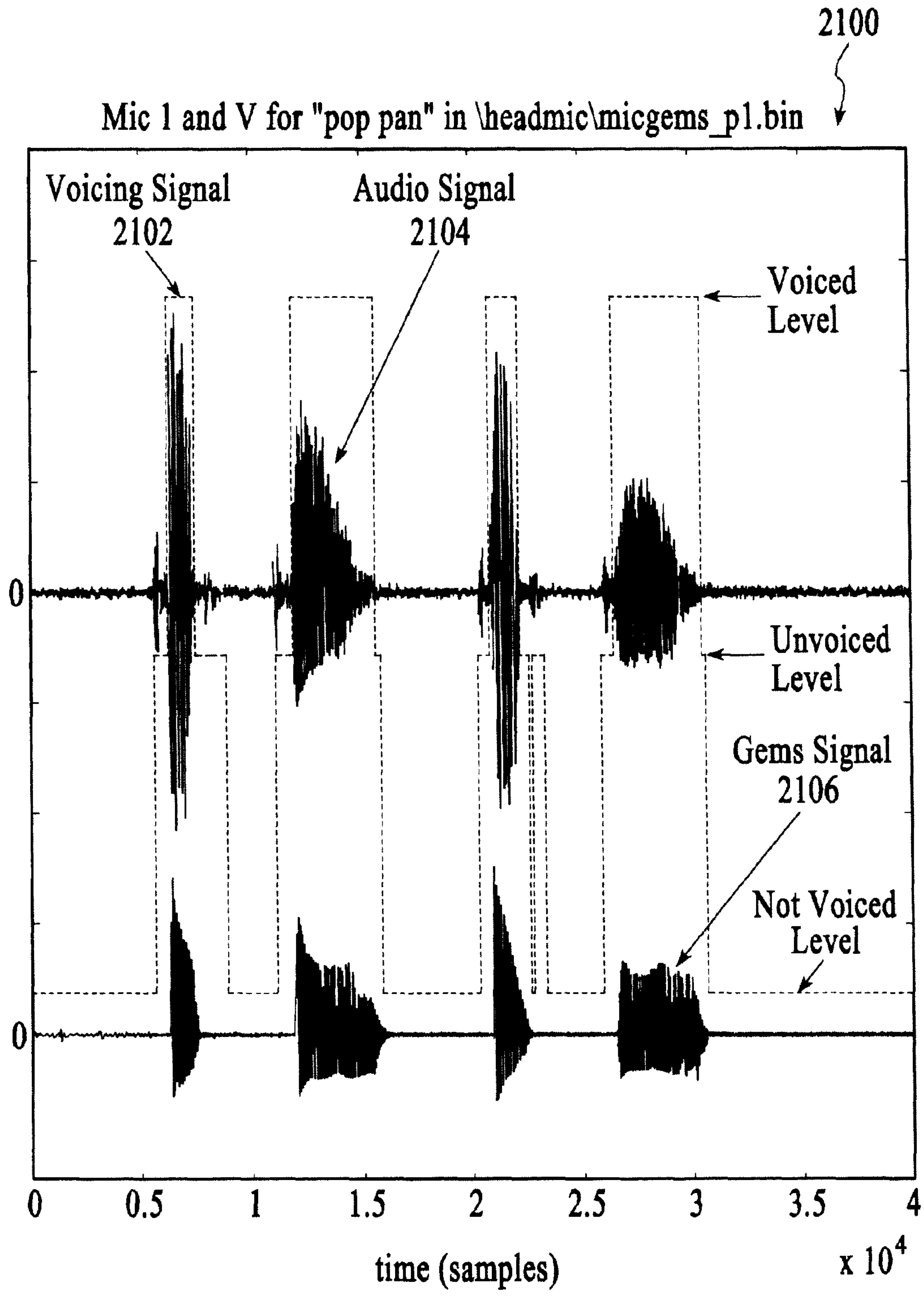
FIG. 21 is an alternative plot of acoustic data presented in FIG. 20, under an embodiment.

FIG. 21 is an alternative plot 2100 of acoustic data presented in FIG. 20. The data used to form plot 2000 is presented again in this plot 2100, along with audio data 2104 and GEMS data 2106 without noise to make the unvoiced speech apparent. The voiced signal 2102 has three possible values: 0 for noise, 1 for unvoiced, and 2 for voiced. Denoising is only accomplished when V=0. It is clear that the unvoiced speech is captured very well, aside from two single dropouts in the unvoiced detection near the end of each "pop". However, these single-window dropouts are not common and do not significantly affect the denoising algorithm. They can easily be removed using standard smoothing techniques.

What is not clear from this plot 2100 is that the PSAD system functions as an automatic backup to the NAVSAD. This is because the voiced speech (since it has the same spatial relationship to the mics as the unvoiced) will be detected as unvoiced if the sensor or NAVSAD system fail for any reason. The voiced speech will be misclassified as unvoiced, but the denoising will still not take place, preserving the quality of the speech signal.

However, this automatic backup of the NAVSAD system functions best in an environment with low noise (approximately 10+dB SNR), as high amounts (10 dB of SNR or less) of acoustic noise can quickly overwhelm any acoustic-only unvoiced detector, including the PSAD. This is evident in the difference in the voiced signal data 1702 and 2102 shown in plots 1700 and 1200 of FIGS. 17 and 21, respectively, where the same utterance is spoken, but the data of plot 1700 shows no unvoiced speech because the unvoiced speech is undetectable. This is the desired behavior when performing denoising, since if the unvoiced speech is not detectable then it will not significantly affect the denoising process. Using the Pathfinder system to detect unvoiced speech ensures detection of any unvoiced speech loud enough to distort the denoising.

Regarding hardware considerations, and with reference to FIG. 18, the configuration of the microphones can have an effect on the change in gain associated with speech and the thresholds needed to detect speech. In general, each configuration will require testing to determine the proper thresholds, but tests with two very different microphone configurations showed the same thresholds and other parameters to work well. The first microphone set had the signal microphone near the mouth and the noise microphone several centimeters away at the ear, while the second configuration placed the noise and signal microphones back-to-back within a few centimeters of the mouth. The results presented herein were derived using the first microphone configuration, but the results using the other set are virtually identical, so the detection algorithm is relatively robust with respect to microphone placement.

A number of configurations are possible using the NAVSAD and PSAD systems to detect voiced and unvoiced speech. One configuration uses the NAVSAD system (non-acoustic only) to detect voiced speech along with the PSAD system to detect unvoiced speech; the PSAD also functions as a backup to the NAVSAD system for detecting voiced speech. An alternative configuration uses the NAVSAD system (non-acoustic correlated with acoustic) to detect voiced speech along with the PSAD system to detect unvoiced speech; the PSAD also functions as a backup to the NAVSAD system for detecting voiced speech. Another alternative configuration uses the PSAD system to detect both voiced and unvoiced speech.

While the systems described above have been described with reference to separating voiced and unvoiced speech from background acoustic noise, there are no reasons more complex classifications cannot be made. For more in-depth characterization of speech, the system can bandpass the information from Mic 1 and Mic 2 so that it is possible to see which bands in the Mic 1 data are more heavily composed of noise and which are more weighted with speech. Using this knowledge, it is possible to group the utterances by their spectral characteristics similar to conventional acoustic methods; this method would work better in noisy environments.

As an example, the “k” in “kick” has significant frequency content form 500 Hz to 4000 Hz, but a “sh” in “she” only contains significant energy from 1700-4000 Hz. Voiced speech could be classified in a similar manner. For instance, an /i/(“ee”) has significant energy around 300 Hz and 2500 Hz, and an /a/(“ah”) has energy at around 900 Hz and 1200 Hz. This ability to discriminate unvoiced and voiced speech in the presence of noise is, thus, very useful.

Dual Omnidirectional Microphone Array (DOMA)

A dual omnidirectional microphone array (DOMA) that provides improved noise suppression is now described. Compared to conventional arrays and algorithms, which seek to reduce noise by nulling out noise sources, the array of an embodiment is used to form two distinct virtual directional microphones, as described in detail above. The two virtual microphones are configured to have very similar noise responses and very dissimilar speech responses. The only null formed by the DOMA is one used to remove the speech of the user from $V_2$. The two virtual microphones of an embodiment can be paired with an adaptive filter algorithm and/or VAD algorithm, as described in detail above, to significantly reduce the noise without distorting the speech, significantly improving the SNR of the desired speech over conventional noise suppression systems. The embodiments described herein are stable in operation, flexible with respect to virtual microphone pattern choice, and have proven to be robust with respect to speech source-to-array distance and orientation as well as temperature and calibration techniques.

Unless otherwise specified, the following terms used in describing the DOMA of an embodiment have the corresponding meanings in addition to any meaning or understanding they may convey to one skilled in the art.

The term “bleedthrough” means the undesired presence of noise during speech.

The term “denoising” means removing unwanted noise from Mid, and also refers to the amount of reduction of noise energy in a signal in decibels (dB).

The term “devoicing” means removing/distorting the desired speech from Mic1

The term “directional microphone (DM)” means a physical directional microphone that is vented on both sides of the sensing diaphragm.

The term “Mic1 (M1)” means a general designation for an adaptive noise suppression system microphone that usually contains more speech than noise.

The term “Mic2 (M2)” means a general designation for an adaptive noise suppression system microphone that usually contains more noise than speech.

The term “noise” means unwanted environmental acoustic noise.

The term “null” means a zero or minima in the spatial response of a physical or virtual directional microphone.

The term “$O_1$” means a first physical omnidirectional microphone used to form a microphone array.

The term “$O_2$” means a second physical omnidirectional microphone used to form a microphone array.

The term “speech” means desired speech of the user.

The term “Skin Surface Microphone (SSM)” is a microphone used in an earpiece (e.g., the Jawbone earpiece available from Aliph of San Francisco, Calif.) to detect speech vibrations on the user’s skin.

The term “$V_1$” means the virtual directional “speech” microphone, which has no nulls.

The term "$V_2$" means the virtual directional "noise" microphone, which has a null for the user's speech.

The term "Voice Activity Detection (VAD) signal" means a signal indicating when user speech is detected.

The term "virtual microphones (VM)" or "virtual directional microphones" means a microphone constructed using two or more omnidirectional microphones and associated signal processing.

Figure 22:
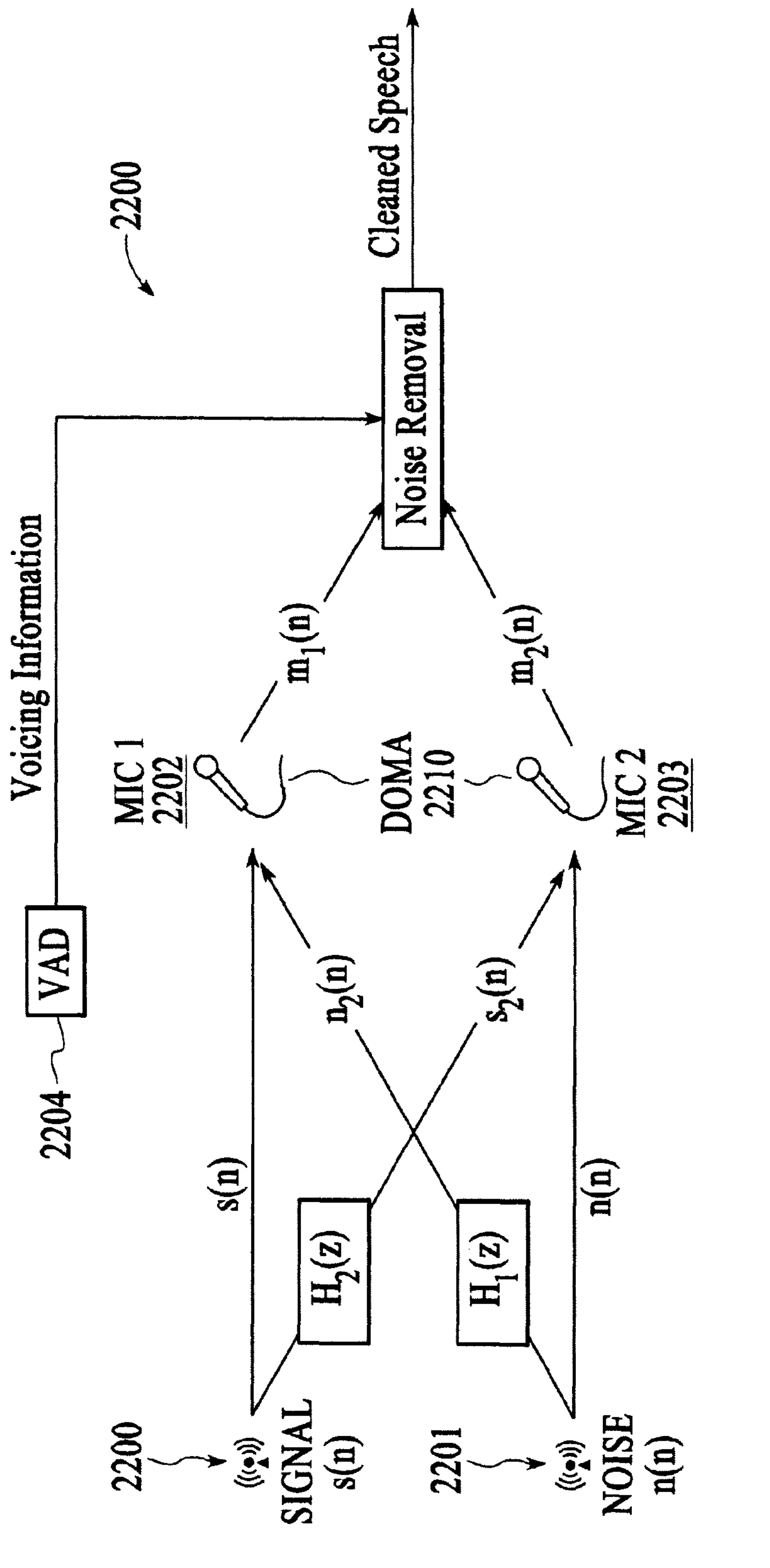
FIG. 22 is a two-microphone adaptive noise suppression system, under an embodiment.

FIG. 22 is a two-microphone adaptive noise suppression system 2200, under an embodiment. The two-microphone system 2200 including the combination of physical microphones MIC 1 and MIC 2 along with the processing or circuitry components to which the microphones couple (described in detail below, but not shown in this figure) is referred to herein as the dual omnidirectional microphone array (DOMA) 2210, but the embodiment is not so limited. Referring to FIG. 22, in analyzing the single noise source 2201 and the direct path to the microphones, the total acoustic information coming into MIC 1 (2202, which can be an physical or virtual microphone) is denoted by $m_1(n)$. The total acoustic information coming into MIC 2 (2203, which can also be an physical or virtual microphone) is similarly labeled $m_2(n)$. In the z (digital frequency) domain, these are represented as $M_1(z)$ and $M_2(z)$. Then, $$M_1(z)=S(z)+N_2(z)$$

$$M_2(z)=N(z)+S_2(z)$$

with $$N_2(z)=N(z)H_1(z)$$

$$S_2(z)=S(z)H_2(z),$$

so that $$M_1(z)=S(z)+N_2(z)H_1(z)$$

$$M_2(z)=N(z)+S_2(z)H_2(z) \quad \text{Eq. 1}$$

This is the general case for all two microphone systems. Equation 1 has four unknowns and only two known relationships and therefore cannot be solved explicitly.

However, there is another way to solve for some of the unknowns in Equation 1. The analysis starts with an examination of the case where the speech is not being generated, that is, where a signal from the VAD subsystem 2204 (optional) equals zero. In this case, s(n)=S(z)=0, and Equation 1 reduces to $$M_{1N}(z)=N(z)H_1(z)$$

$$M_{2N}(z)=N(z)$$

where the N subscript on the M variables indicate that only noise is being received. This leads to $$M_{1N}(z)=M_{2N}(z)H_1(z) \quad \text{Eq. 2}$$

$$H_1(z)=\frac{M_{1N}(z)}{M_{2N}(z)}$$

The function $H_1(z)$ can be calculated using any of the available system identification algorithms and the microphone outputs when the system is certain that only noise is being received. The calculation can be done adaptively, so that the system can react to changes in the noise.

A solution is now available for $H_1(z)$, one of the unknowns in Equation 1. The final unknown, $H_2(z)$, can be determined by using the instances where speech is being produced and the VAD equals one. When this is occurring, but the recent (perhaps less than 1 second) history of the microphones indicate low levels of noise, it can be assumed that n(s)=N(z).about.0. Then Equation 1 reduces to $$M_{1S}(z)=S(z)$$

$$M_{2S}(z)=S(z)H_2(z)$$

which in turn leads to $$M_{2S}(z)=M_{1S}(z)H_2(z)$$

$$H_2(z)=\frac{M_{2S}(z)}{M_{1S}(z)}$$

which is the inverse of the $H_1(z)$ calculation. However, it is noted that different inputs are being used (now only the speech is occurring whereas before only the noise was occurring). While calculating $H_2(z)$, the values calculated for $H_1(z)$ are held constant (and vice versa) and it is assumed that the noise level is not high enough to cause errors in the $H_2(z)$ calculation.

After calculating $H_1(z)$ and $H_2(z)$, they are used to remove the noise from the signal. If Equation 1 is rewritten as $$S(z)=M_1(z)-N(z)H_1(z)$$

$$N(z)=M_2(z)-S(z)H_2(z)$$

$$S(z)=M_1(z)-[M_2(z)-S(z)H_2(z)]H_1(z)$$

$$S(z)[1-H_2(z)H_1(z)]=M_1(z)-M_2(z)H_1(z),$$

then N(z) may be substituted as shown to solve for S(z) as $$S(z)=\frac{M_1(z)-M_2(z)H_1(z)}{1-H_1(z)H_2(z)}. \quad \text{Eq. 3}$$

If the transfer functions $H_1(z)$ and $H_2(z)$ can be described with sufficient accuracy, then the noise can be completely removed and the original signal recovered. This remains true without respect to the amplitude or spectral characteristics of the noise. If there is very little or no leakage from the speech source into $M_2$, then $H_2(z)\approx 0$ and Equation 3 reduces to $$S(z)\approx M_1(z)-M_2(z)H_1(z) \quad \text{Eq. 4}$$

Equation 4 is much simpler to implement and is very stable, assuming $H_1(z)$ is stable. However, if significant speech energy is in $M_2(z)$, devoicing can occur. In order to construct a well-performing system and use Equation 4, consideration is given to the following conditions:

R1. Availability of a perfect (or at least very good) VAD in noisy conditions.

R2. Sufficiently accurate $H_1(z)$.

R3. Very small (ideally zero) $H_2(z)$.

R4. During speech production, $H_1(z)$ cannot change substantially.

R5. During noise, $H_2(z)$ cannot change substantially.

Condition R1 is easy to satisfy if the SNR of the desired speech to the unwanted noise is high enough. "Enough" means different things depending on the method of VAD generation. If a VAD vibration sensor is used, as in Burnett U.S. Pat. No. 7,256,048, accurate VAD in very low SNRs (−10 dB or less) is possible. Acoustic-only methods using information from $O_1$ and $O_2$ can also return accurate VADs, but are limited to SNRs of 3 dB or greater for adequate performance.

Condition R5 is normally simple to satisfy because for most applications the microphones will not change position with respect to the user's mouth very often or rapidly. In those applications where it may happen (such as hands-free conferencing systems) it can be satisfied by configuring Mic2 so that $H_2(z)\approx 0$.

Satisfying conditions R2, R3, and R4 are more difficult but are possible given the right combination of $V_1$ and $V_2$. Methods are examined below that have proven to be effective in satisfying the above, resulting in excellent noise suppression performance and minimal speech removal and distortion in an embodiment.

The DOMA, in various embodiments, can be used with the Pathfinder system as the adaptive filter system or noise removal. The Pathfinder system, available from AliphCom, San Francisco, Calif., is described in detail in other patents and patent applications referenced herein. Alternatively, any adaptive filter or noise removal algorithm can be used with the DOMA in one or more various alternative embodiments or configurations.

When the DOMA is used with the Pathfinder system, the Pathfinder system generally provides adaptive noise cancellation by combining the two microphone signals (e.g., Mic1, Mic2) by filtering and summing in the time domain. The adaptive filter generally uses the signal received from a first microphone of the DOMA to remove noise from the speech received from at least one other microphone of the DOMA, which relies on a slowly varying linear transfer function between the two microphones for sources of noise. Following processing of the two channels of the DOMA, an output signal is generated in which the noise content is attenuated with respect to the speech content, as described in detail below.

Figure 23:
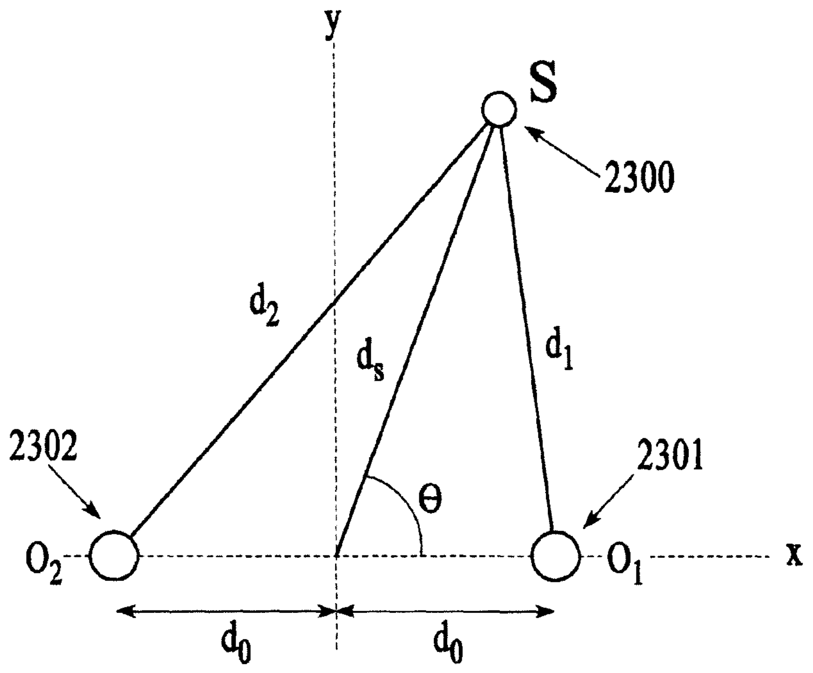
FIG. 23 is a generalized two-microphone array (DOMA) including an array and speech source S configuration, under an embodiment.
Figure 24:
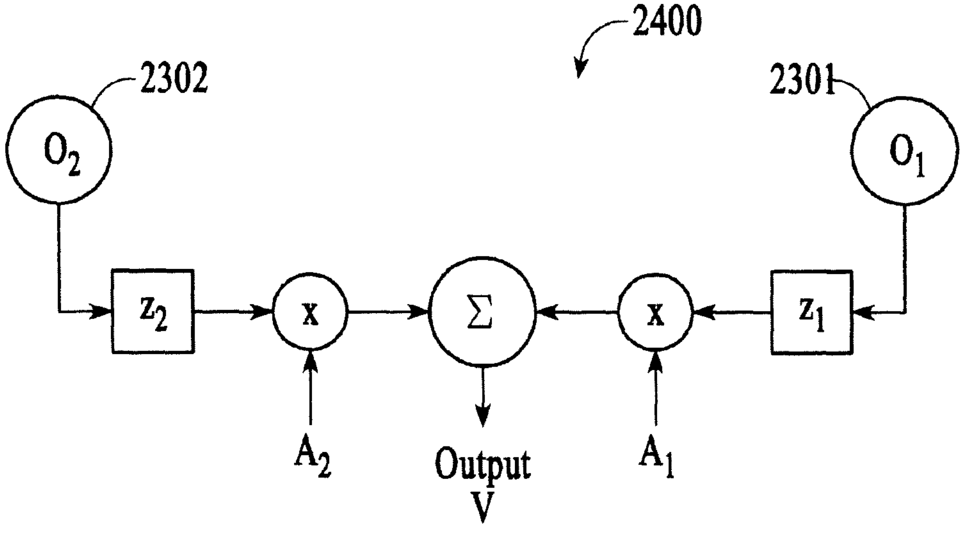
FIG. 24 is a system for generation or producing a first order gradient microphone V using two omnidirectional elements $O_1$ and $O_2$ under an embodiment.

FIG. 23 is a generalized two-microphone array (DOMA) including an array 2301/2302 and speech source S configuration, under an embodiment. FIG. 24 is a system 2400 for generating or producing a first order gradient microphone V using two omnidirectional elements $O_1$ and $O_2$, under an embodiment. The array of an embodiment includes two physical microphones 2301 and 2302 (e.g., omnidirectional microphones) placed a distance 2 $d_0$ apart and a speech source 2300 is located a distance $d_s$ away at an angle of $\theta$. This array is axially symmetric (at least in free space), so no other angle is needed. The output from each microphone 2301 and 2302 can be delayed ($z_1$ and $z_2$), multiplied by a gain ($A_1$ and $A_2$), and then summed with the other as demonstrated in FIG. 24. The output of the array is or forms at least one virtual microphone, as described in detail below. This operation can be over any frequency range desired. By varying the magnitude and sign of the delays and gains, a wide variety of virtual microphones (VMs), also referred to herein as virtual directional microphones, can be realized. There are other methods known to those skilled in the art for constructing VMs but this is a common one and will be used in the enablement below.

Figure 25:
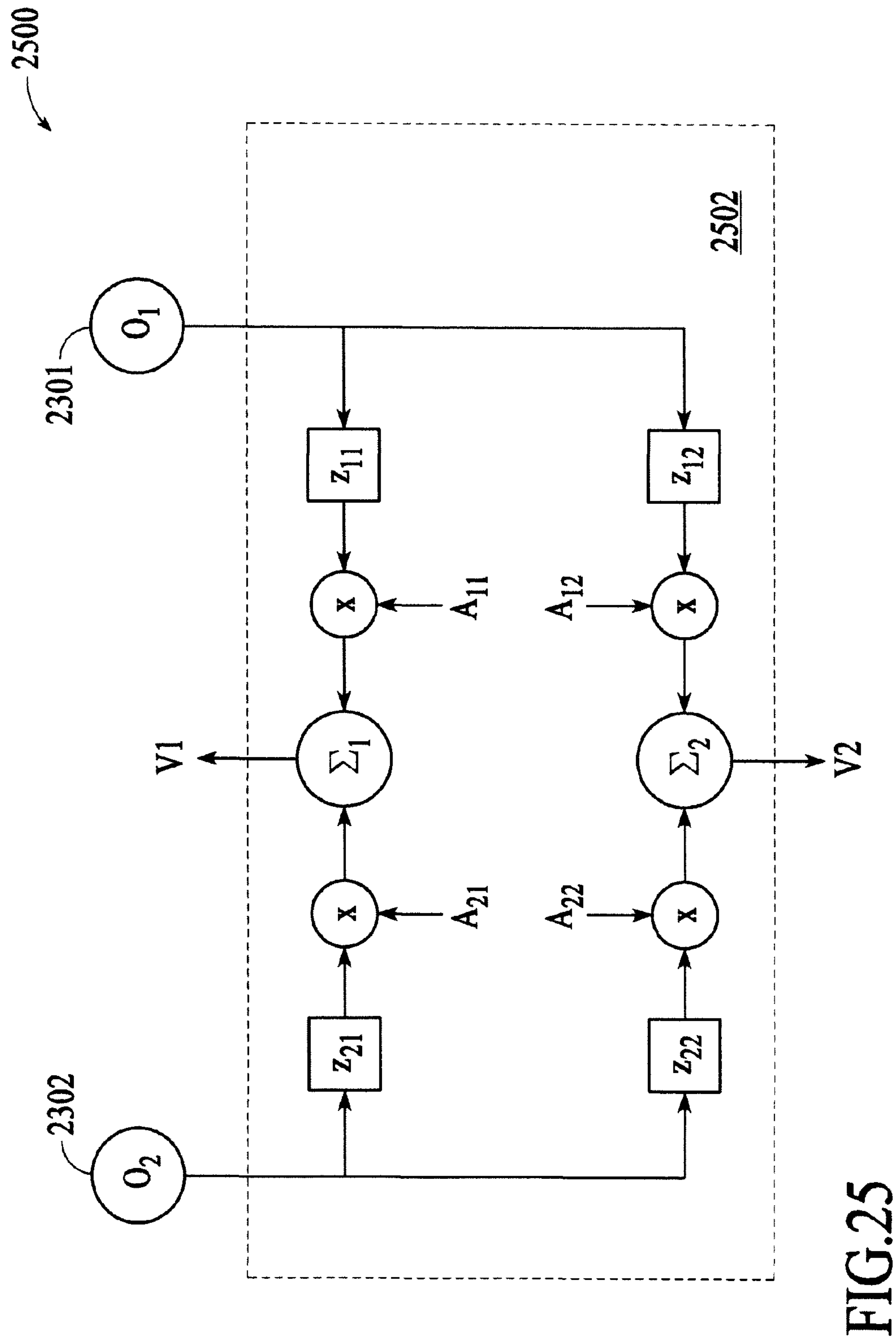
FIG. 25 is a block diagram for a DOMA including two physical microphones configured to form two virtual microphones $V_1$ and $V_2$, under an embodiment.

As an example, FIG. 25 is a block diagram for a DOMA 2500 including two physical microphones configured to form two virtual microphones $V_1$ and $V_2$, under an embodiment. The DOMA includes two first order gradient microphones $V_1$ and $V_2$ formed using the outputs of two microphones or elements $O_1$ and $O_2$ (2301 and 2302), under an embodiment. The DOMA of an embodiment includes two physical microphones 2301 and 2302 that are omnidirectional microphones, as described above with reference to FIGS. 23 and 24. The output from each microphone is coupled to a processing component 2502, or circuitry, and the processing component outputs signals representing or corresponding to the virtual microphones $V_1$ and $V_2$.

In this example system 2500, the output of physical microphone 2301 is coupled to processing component 2502 that includes a first processing path that includes application of a first delay $z_{11}$ and a first gain $A_{11}$ and a second processing path that includes application of a second delay $z_{12}$ and a second gain $A_{12}$. The output of physical microphone 2302 is coupled to a third processing path of the processing component 2502 that includes application of a third delay $z_{21}$ and a third gain $A_{21}$ and a fourth processing path that includes application of a fourth delay $z_{22}$ and a fourth gain $A_{22}$. The output of the first and third processing paths is summed to form virtual microphone $V_1$, and the output of the second and fourth processing paths is summed to form virtual microphone $V_2$.

Figure 26:
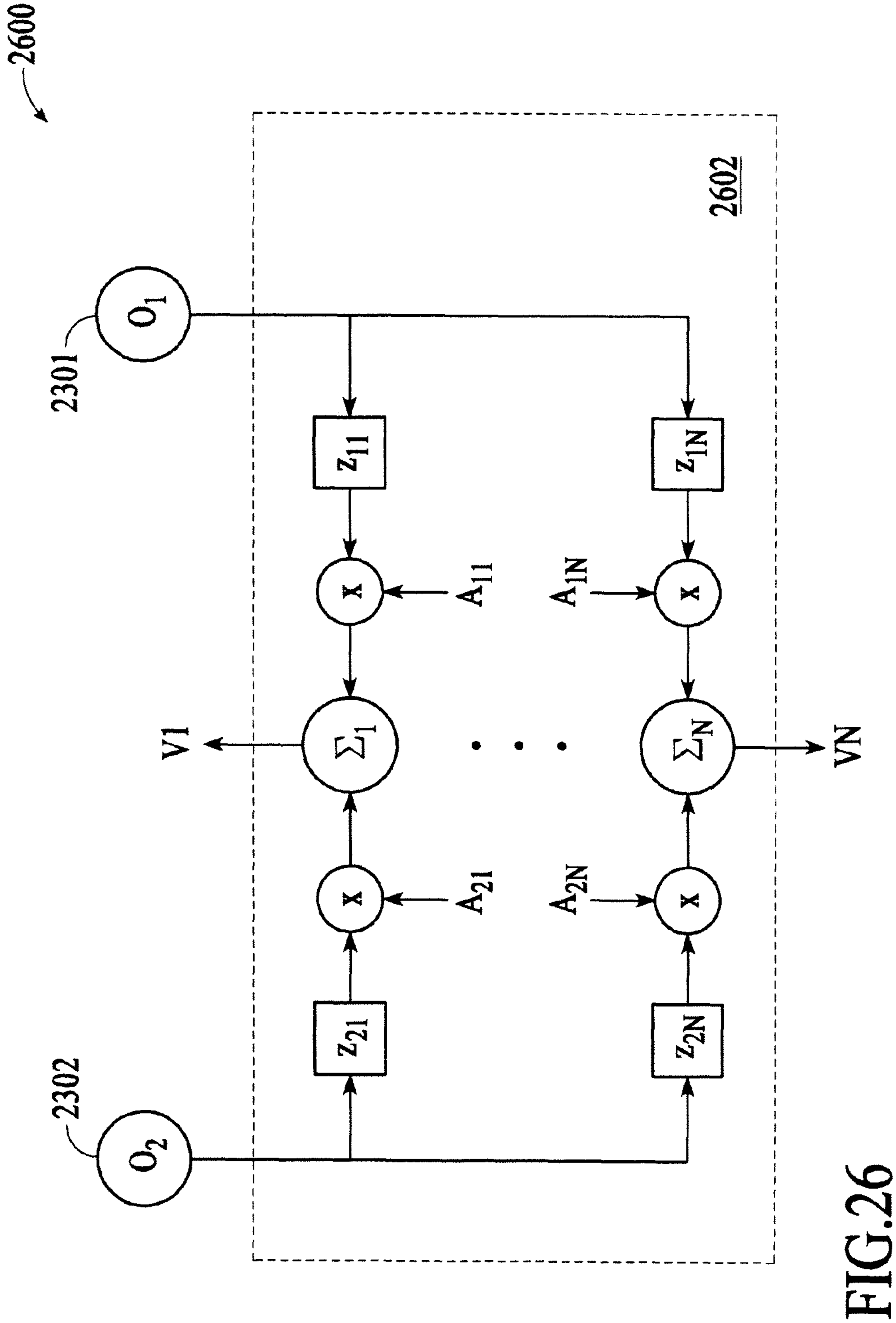
FIG. 26 is a block diagram for a DOMA including two physical microphones configured to form N virtual microphones $V_1$ through $V_N$, where N is any number greater than one, under an embodiment.

As described in detail below, varying the magnitude and sign of the delays and gains of the processing paths leads to a wide variety of virtual microphones (VMs), also referred to herein as virtual directional microphones, can be realized. While the processing component 2502 described in this example includes four processing paths generating two virtual microphones or microphone signals, the embodiment is not so limited. For example, FIG. 26 is a block diagram for a DOMA 2600 including two physical microphones configured to form N virtual microphones $V_1$ through $V_N$, where N is any number greater than one, under an embodiment. Thus, the DOMA can include a processing component 2602 having any number of processing paths as appropriate to form a number N of virtual microphones.

The DOMA of an embodiment can be coupled or connected to one or more remote devices. In a system configuration, the DOMA outputs signals to the remote devices. The remote devices include, but are not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Furthermore, the DOMA of an embodiment can be a component or subsystem integrated with a host device. In this system configuration, the DOMA outputs signals to components or subsystems of the host device. The host device includes, but is not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Figure 27:
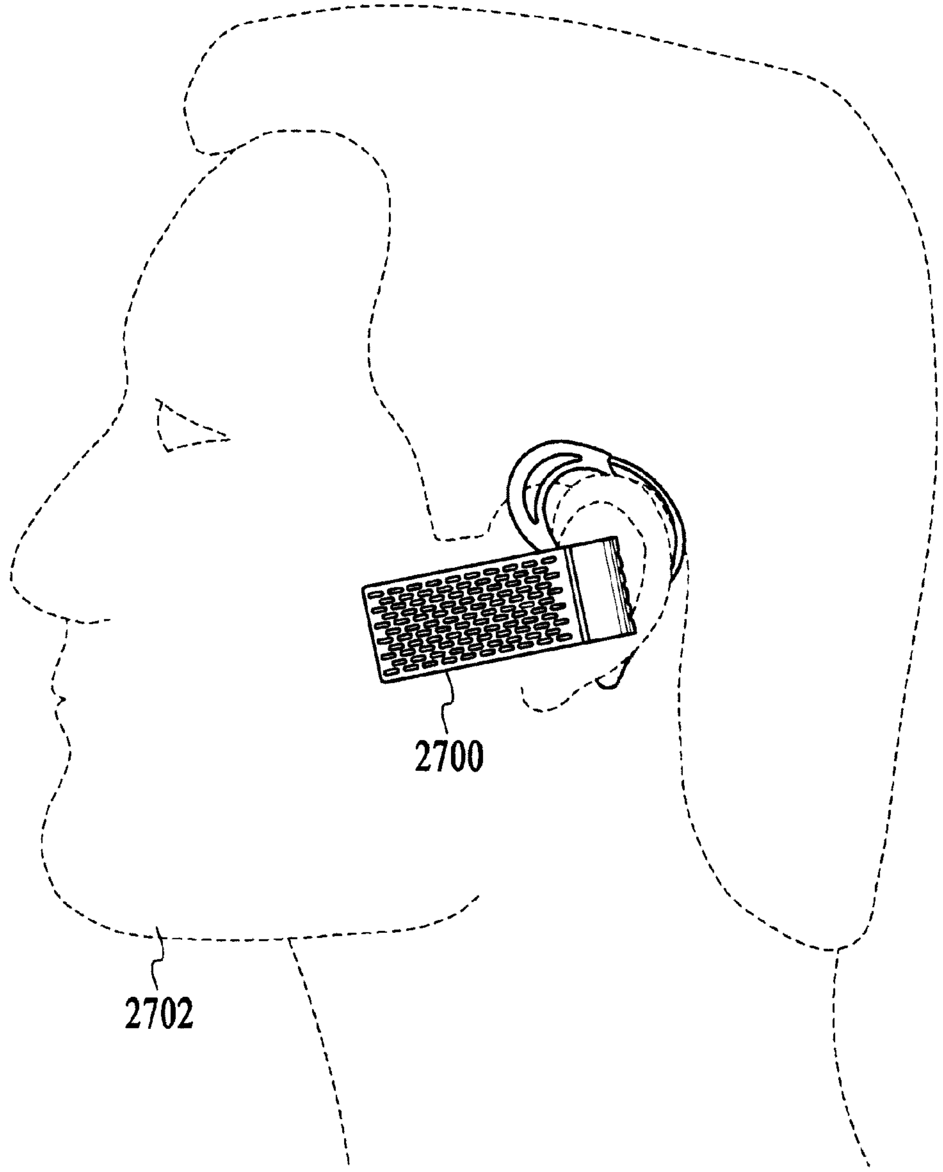
FIG. 27 is an example of a headset or head-worn device that includes the DOMA, as described herein, under an embodiment.

As an example, FIG. 27 is an example of a headset or head-worn device 2700 that includes the DOMA, as described herein, under an embodiment. The headset 2700 of an embodiment includes a housing having two areas or receptacles (not shown) that receive and hold two microphones (e.g., $O_1$ and $O_2$). The headset 2700 is generally a device that can be worn by a speaker 2702, for example, a headset or earpiece that positions or holds the microphones in the vicinity of the speaker's mouth. The headset 2700 of an embodiment places a first physical microphone (e.g., physical microphone $O_1$) in a vicinity of a speaker's lips. A second physical microphone (e.g., physical microphone $O_2$) is placed a distance behind the first physical microphone. The distance of an embodiment is in a range of a few centimeters behind the first physical microphone or as described herein (e.g., described with reference to FIGS.

22-26). The DOMA is symmetric and is used in the same configuration or manner as a single close-talk microphone, but is not so limited.

Figure 28:
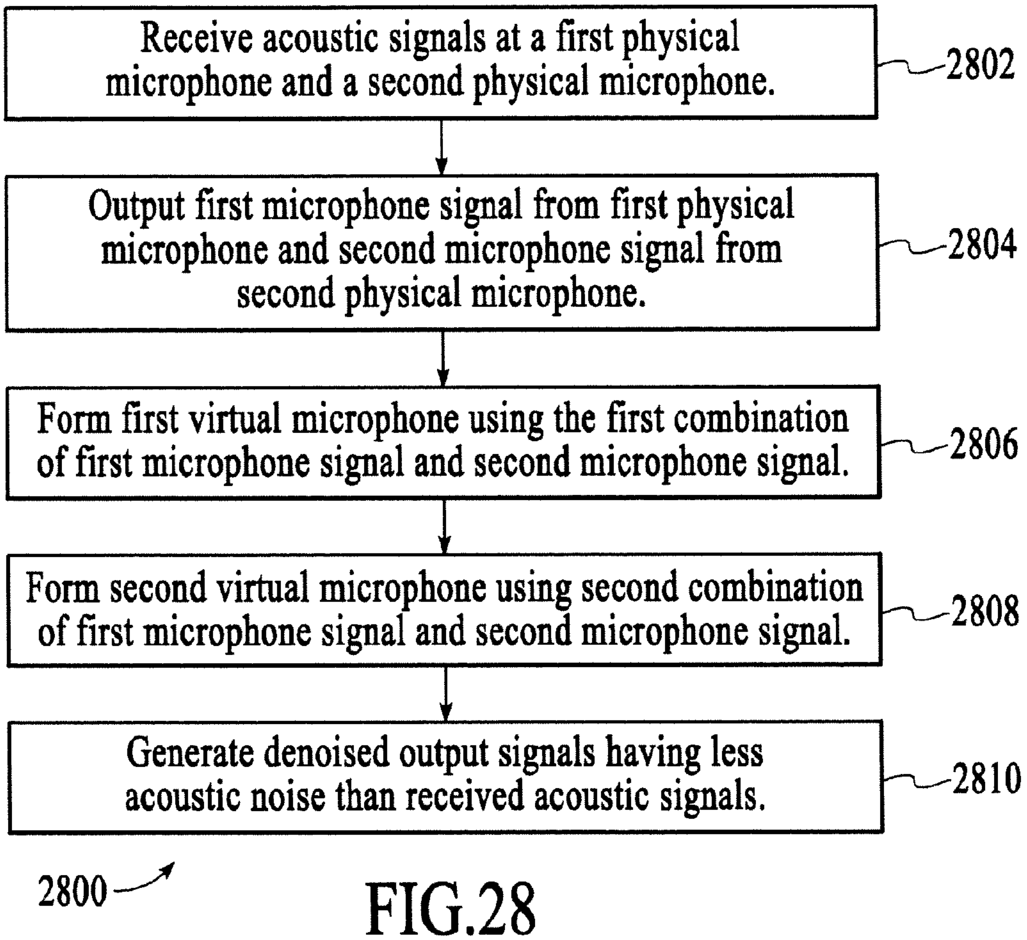
FIG. 28 is a flow diagram for denoising acoustic signals using the DOMA, under an embodiment.

FIG. 28 is a flow diagram for denoising 2800 acoustic signals using the DOMA, under an embodiment. The denoising 2800 begins by receiving 2802 acoustic signals at a first physical microphone and a second physical microphone. In response to the acoustic signals, a first microphone signal is output from the first physical microphone and a second microphone signal is output from the second physical microphone 2804. A first virtual microphone is formed 2806 by generating a first combination of the first microphone signal and the second microphone signal. A second virtual microphone is formed 2808 by generating a second combination of the first microphone signal and the second microphone signal, and the second combination is different from the first combination. The first virtual microphone and the second virtual microphone are distinct virtual directional microphones with substantially similar responses to noise and substantially dissimilar responses to speech. The denoising 2800 generates 2810 output signals by combining signals from the first virtual microphone and the second virtual microphone, and the output signals include less acoustic noise than the acoustic signals.

Figure 29:
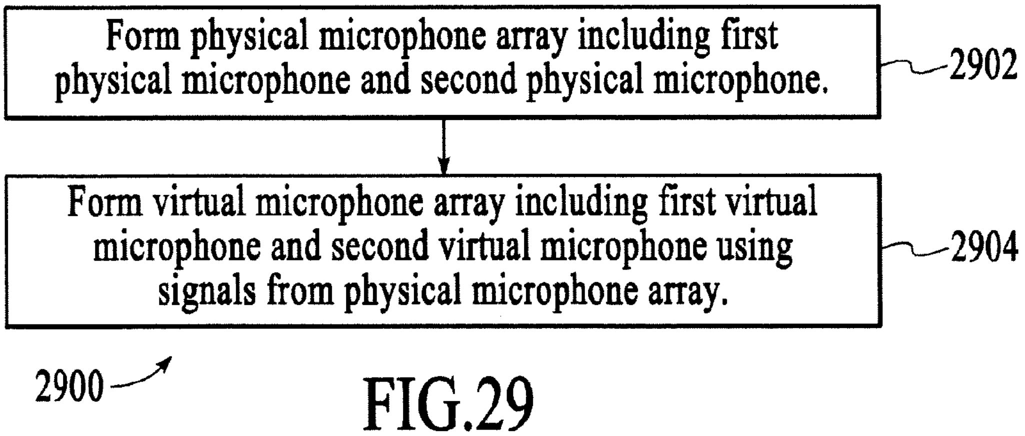
FIG. 29 is a flow diagram for forming the DOMA, under an embodiment.

FIG. 29 is a flow diagram for forming 2900 the DOMA, under an embodiment. Formation 2900 of the DOMA includes forming 2902 a physical microphone array including a first physical microphone and a second physical microphone. The first physical microphone outputs a first microphone signal and the second physical microphone outputs a second microphone signal. A virtual microphone array is formed 2904 comprising a first virtual microphone and a second virtual microphone. The first virtual microphone comprises a first combination of the first microphone signal and the second microphone signal. The second virtual microphone comprises a second combination of the first microphone signal and the second microphone signal, and the second combination is different from the first combination. The virtual microphone array including a single null oriented in a direction toward a source of speech of a human speaker.

The construction of VMs for the adaptive noise suppression system of an embodiment includes substantially similar noise response in $V_1$ and $V_2$. Substantially similar noise response as used herein means that $H_1(z)$ is simple to model and will not change much during speech, satisfying conditions R2 and R4 described above and allowing strong denoising and minimized bleedthrough.

The construction of VMs for the adaptive noise suppression system of an embodiment includes relatively small speech response for $V_2$. The relatively small speech response for $V_2$ means that $H_2(z)\approx 0$, which will satisfy conditions R3 and R5 described above.

The construction of VMs for the adaptive noise suppression system of an embodiment further includes sufficient speech response for $V_1$ so that the cleaned speech will have significantly higher SNR than the original speech captured by $O_1$.

The description that follows assumes that the responses of the omnidirectional microphones $O_1$ and $O_2$ to an identical acoustic source have been normalized so that they have exactly the same response (amplitude and phase) to that source. This can be accomplished using standard microphone array methods (such as frequency-based calibration) well known to those versed in the art.

Referring to the condition that construction of VMs for the adaptive noise suppression system of an embodiment includes relatively small speech response for $V_2$, it is seen that for discrete systems $V_2(z)$ can be represented as:

$$V_2(z) = O_2(z) - z^{-\gamma}\beta O_1(z)$$

where $$\beta = \frac{d_1}{d_2}\gamma = \frac{d_2 - d_1}{c}\cdot f_s \text{ (samples)}$$

$$d_1 = \sqrt{d_s^2 - 2d_s\cos(\theta) + d_0^2}$$

$$d_2 = \sqrt{d_s^2 - 2d_s\cos(6) + d_0^2}$$

The distances $d_1$ and $d_2$ are the distance from $O_1$ and $O_2$ to the speech source (see FIG. 23), respectively, and $\gamma$ is their difference divided by c, the speed of sound, and multiplied by the sampling frequency $f_s$. Thus $\gamma$ is in samples, but need not be an integer. For non-integer $\gamma$, fractional-delay filters (well known to those versed in the art) may be used.

It is important to note that the $\beta$ above is not the conventional $\beta$ used to denote the mixing of VMs in adaptive beamforming; it is a physical variable of the system that depends on the intra-microphone distance $d_0$ (which is fixed) and the distance d, and angle $\theta$, which can vary. As shown below, for properly calibrated microphones, it is not necessary for the system to be programmed with the exact $\beta$ of the array. Errors of approximately 10-15% in the actual $\beta$ (i.e. the $\beta$ used by the algorithm is not the $\beta$ of the physical array) have been used with very little degradation in quality. The algorithmic value of $\beta$ may be calculated and set for a particular user or may be calculated adaptively during speech production when little or no noise is present. However, adaptation during use is not required for nominal performance.

Figure 30:
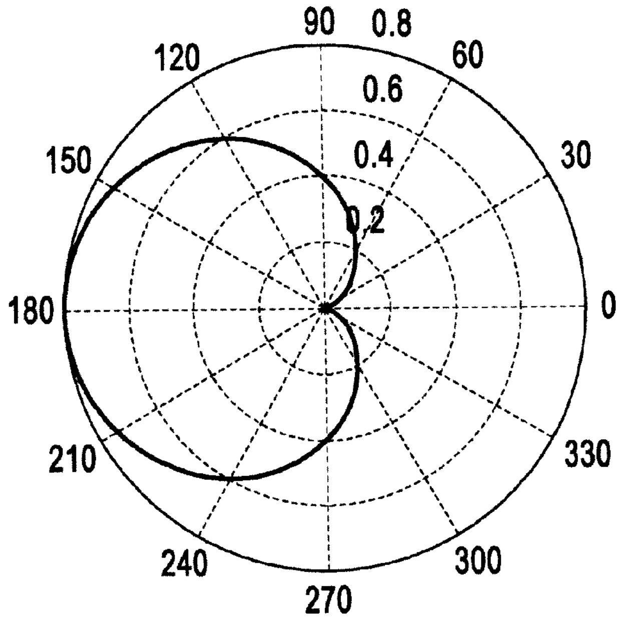
FIG. 30 is a plot of linear response of virtual microphone $V_2$ with β=0.8 to a 1 kHz speech source at a distance of 0.1 m, under an embodiment.
Figure 31:
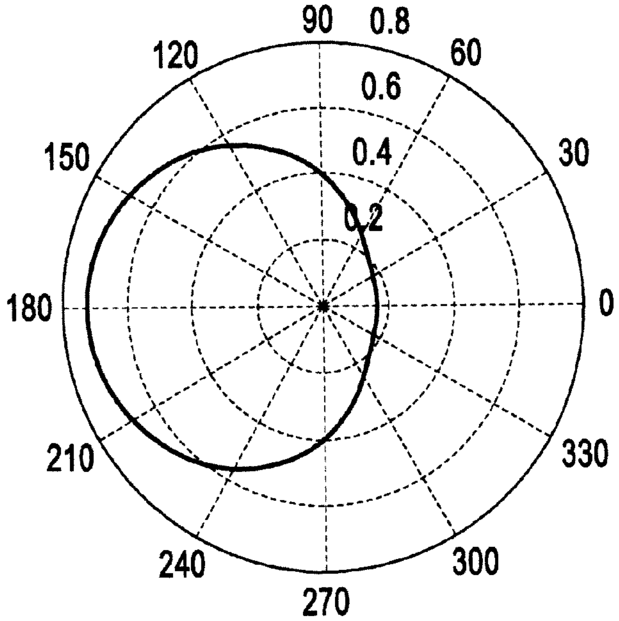
FIG. 31 is a plot of linear response of virtual microphone $V_2$ with β=0.8 to a kHz noise source at a distance of 0.1 m, under an embodiment.

FIG. 30 is a plot of linear response of virtual microphone $V_2$ with $\beta$=0.8 to a 1 kHz speech source at a distance of 0.1 m, under an embodiment. The null in the linear response of virtual microphone $V_2$ to speech is located at 0 degrees, where the speech is typically expected to be located. FIG. 31 is a plot of linear response of virtual microphone $V_2$ with $\beta$=0.8 to a 1 kHz noise source at a distance of 1.0 m, under an embodiment. The linear response of $V_2$ to noise is devoid of or includes no null, meaning all noise sources are detected.

The above formulation for $V_2(z)$ has a null at the speech location and will therefore exhibit minimal response to the speech. This is shown in FIG. 30 for an array with $d_0$=10.7 mm and a speech source on the axis of the array ($\theta$=0) at 10 cm ($\beta$=0.8). Note that the speech null at zero degrees is not present for noise in the far field for the same microphone, as shown in FIG. 31 with a noise source distance of approximately 1 meter. This insures that noise in front of the user will be detected so that it can be removed. This differs from conventional systems that can have difficulty removing noise in the direction of the mouth of the user.

The $V_1(z)$ can be formulated using the general form for $V_1(z)$:

$$V_1(z)=\alpha_A O_1(z)\cdot z^{-d_A}-\alpha_B O_2(z)\cdot z^{-d_B}$$

Since $$V_2(z)=O_2(z)-z^{\gamma}\beta O_1(z)$$

and, since for noise in the forward direction $$O_{2N}(z)=O_{1N}(z)\cdot z^{-\gamma},$$

then $$V_{2N}(z)=O_{1N}(z)\cdot z^{-\gamma}-z^{-\gamma}\beta O_{1N}(z)$$

$$V_{2N}(z)=(1-\beta)(O_{1N}(z)\cdot z^{-\gamma})$$

If this is then set equal to $V_1(z)$ above, the result is $$V_{1N}(z)=\alpha_A O_{1N}(z)\cdot z^{-d_A}-\alpha_B O_{1N}(z)\cdot z^{-\gamma}\cdot z^{-d_B}=(1-\beta)(O_{1N}(z)\cdot z^{-\gamma})$$

thus we may set $$d_A=\gamma$$

$$d_B=0$$

$$\alpha_A=1$$

$$\alpha_A=\beta$$

to get $$V_1(z)=O_1(z)\cdot z^{-\gamma}\beta O_2(z)$$

The definitions for $V_1$ and $V_2$ above mean that for noise $H_1(z)$ is:

$$H_1(z)=\frac{V_1(z)}{V_2(z)}=\frac{-\beta O_2(z)+O_1(z)\cdot z^{-\gamma}}{O_2(z)-z^{-\gamma}\beta O_1(z)}$$

which, if the amplitude noise responses are about the same, has the form of an all pass filter. This has the advantage of being easily and accurately modeled, especially in magnitude response, satisfying R2. This formulation assures that the noise response will be as similar as possible and that the speech response will be proportional to $(1-\beta^2)$. Since $\beta$ is the ratio of the distances from $O_1$ and $O_2$ to the speech source, it is affected by the size of the array and the distance from the array to the speech source.

Figure 32:
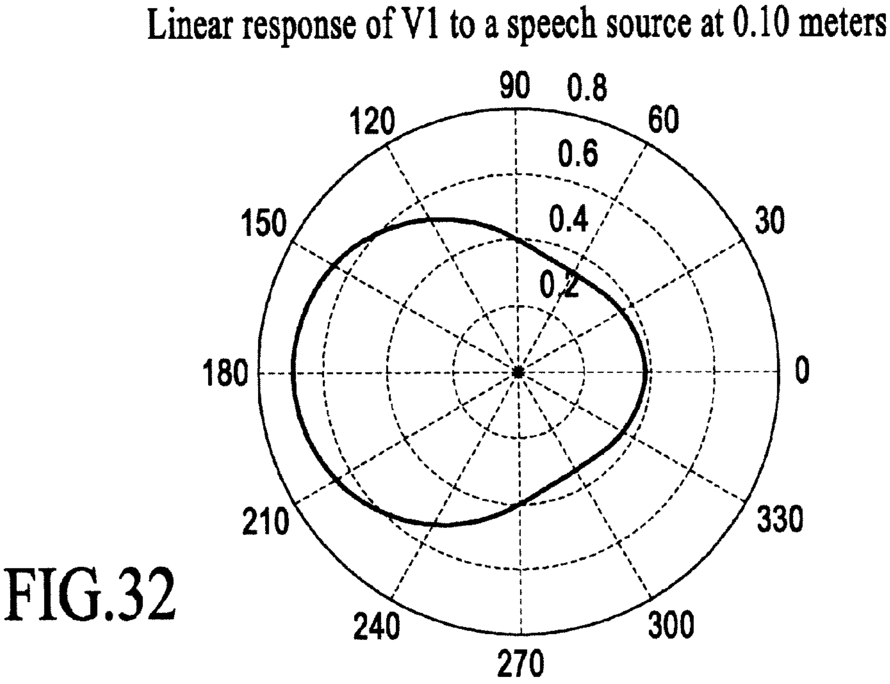
FIG. 32 is a plot of linear response of virtual microphone $V_1$ with β=0.8 to a 1 kHz speech source at a distance of 0.1 m, under an embodiment.

FIG. 32 is a plot of linear response of virtual microphone $V_1$ with $\beta=0.8$ to a 1 kHz speech source at a distance of 0.1 m, under an embodiment. The linear response of virtual microphone $V_1$ to speech is devoid of or includes no null and the response for speech is greater than that shown in FIG. 25.

Figure 33:
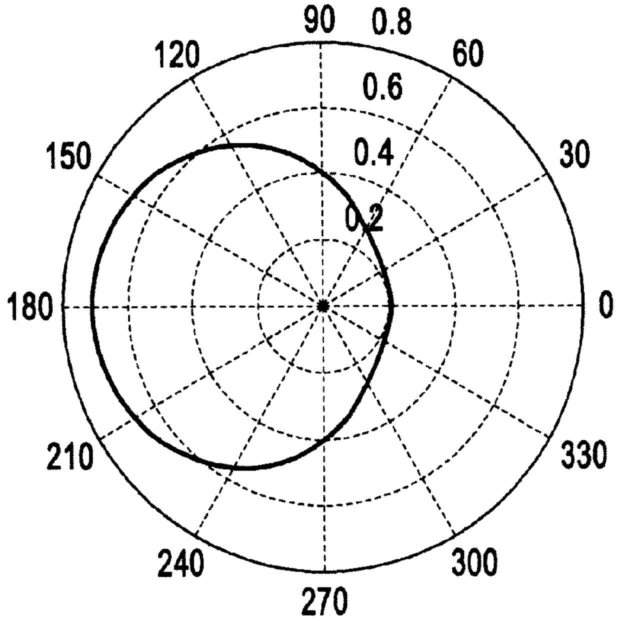
FIG. 33 is a plot of linear response of virtual microphone $V_1$ with β=0.8 to a 1 kHz noise source at a distance of 0.1 m, under an embodiment.

FIG. 33 is a plot of linear response of virtual microphone $V_1$ with $\beta=0.8$ to a 1 kHz noise source at a distance of 1.0 m, under an embodiment. The linear response of virtual microphone $V_1$ to noise is devoid of or includes no null and the response is very similar to $V_2$ shown in FIG. 26.

Figure 34:
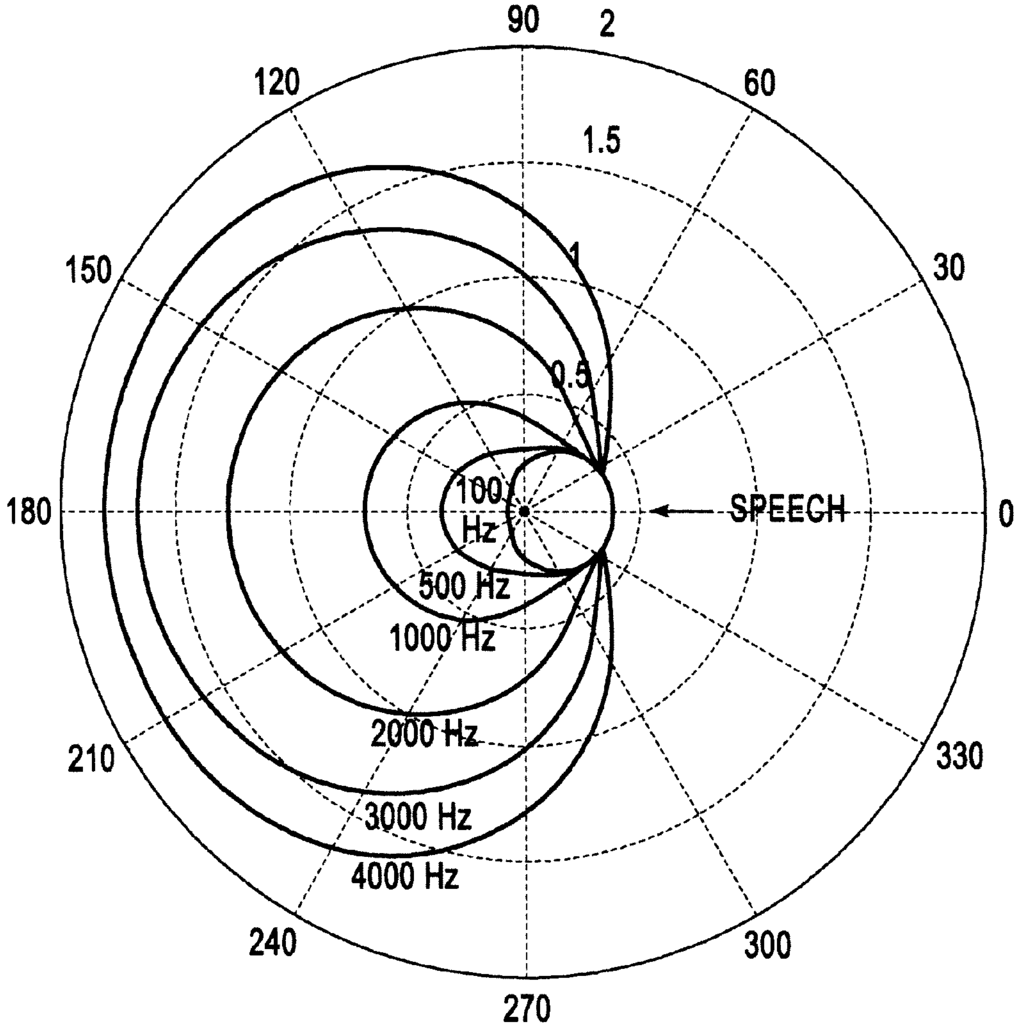
FIG. 34 is a plot of linear response of virtual microphone $V_1$ with β=0.8 to a speech source at a distance of 0.1 m for frequencies of 100, 500, 1000, 2000, 3000, and 4000 Hz, under an embodiment.
Figure 35:
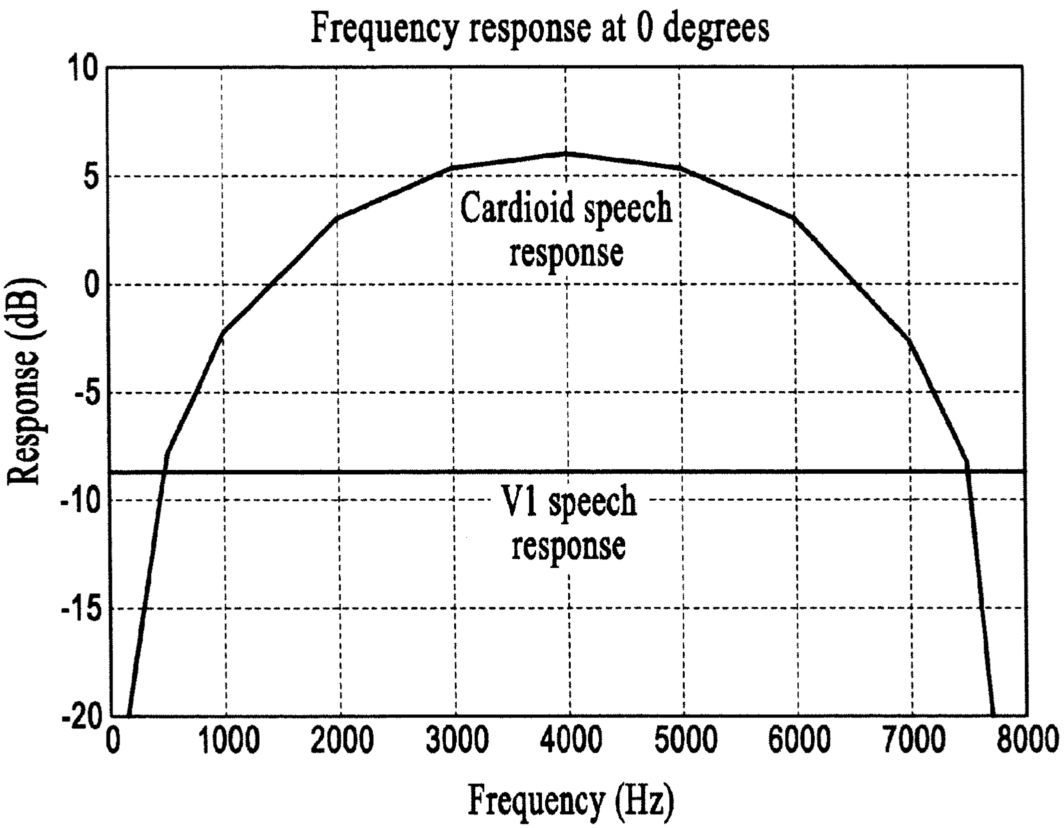
FIG. 35 is a plot showing comparison of frequency responses for speech for the array of an embodiment and for a conventional cardioid microphone, under an embodiment.

FIG. 34 is a plot of linear response of virtual microphone $V_1$ with $\beta=0.8$ to a speech source at a distance of 0.1 m for frequencies of 100, 500, 1000, 2000, 3000, and 4000 Hz, under an embodiment. FIG. 35 is a plot showing comparison of frequency responses for speech for the array of an embodiment and for a conventional cardioid microphone.

The response of $V_1$ to speech is shown in FIG. 32, and the response to noise in FIG. 33. Note the difference in speech response compared to $V_2$ shown in FIG. 30 and the similarity of noise response shown in FIG. 31. Also note that the orientation of the speech response for V.sub.1 shown in FIG. 32 is completely opposite the orientation of conventional systems, where the main lobe of response is normally oriented toward the speech source. The orientation of an embodiment, in which the main lobe of the speech response of $V_1$ is oriented away from the speech source, means that the speech sensitivity of $V_1$ is lower than a normal directional microphone but is flat for all frequencies within approximately +−30 degrees of the axis of the array, as shown in FIG. 34. This flatness of response for speech means that no shaping post filter is needed to restore omnidirectional frequency response. This does come at a price—as shown in FIG. 35, which shows the speech response of $V_1$ with $\beta=0.8$ and the speech response of a cardioid microphone. The speech response of $V_1$ is approximately 0 to ~13 dB less than a normal directional microphone between approximately 500 and 7500 Hz and approximately 0 to 10+dB greater than a directional microphone below approximately 500 Hz and above 7500 Hz for a sampling frequency of approximately 16000 Hz. However, the superior noise suppression made possible using this system more than compensates for the initially poorer SNR.

It should be noted that FIGS. 30-33 assume the speech is located at approximately 0 degrees and approximately 10 cm, $\beta=0.8$, and the noise at all angles is located approximately 1.0 meter away from the midpoint of the array. Generally, the noise distance is not required to be 1 m or more, but the denoising is the best for those distances. For distances less than approximately 1 m, denoising will not be as effective due to the greater dissimilarity in the noise responses of $V_1$ and $V_2$. This has not proven to be an impediment in practical use—in fact, it can be seen as a feature. Any "noise" source that is ~10 cm away from the earpiece is likely to be desired to be captured and transmitted.

The speech null of $V_2$ means that the VAD signal is no longer a critical component. The VAD's purpose was to ensure that the system would not train on speech and then subsequently remove it, resulting in speech distortion. If, however, $V_2$ contains no speech, the adaptive system cannot train on the speech and cannot remove it. As a result, the system can denoise all the time without fear of devoicing, and the resulting clean audio can then be used to generate a VAD signal for use in subsequent single-channel noise suppression algorithms such as spectral subtraction. In addition, constraints on the absolute value of $H_1(z)$ (i.e. restricting it to absolute values less than two) can keep the system from fully training on speech even if it is detected. In reality, though, speech can be present due to a mis-located $V_2$ null and/or echoes or other phenomena, and a VAD sensor or other acoustic-only VAD is recommended to minimize speech distortion.

Depending on the application, $\beta$ and $\gamma$ may be fixed in the noise suppression algorithm or they can be estimated when the algorithm indicates that speech production is taking place in the presence of little or no noise. In either case, there may be an error in the estimate of the actual $\beta$ and $\gamma$ of the system. The following description examines these errors and their effect on the performance of the system. As above, "good performance" of the system indicates that there is sufficient denoising and minimal devoicing.

The effect of an incorrect $\beta$ and $\gamma$ on the response of $V_1$ and $V_2$ can be seen by examining the definitions above:

$$V_1(z)=O_1(z)\cdot z^{-\gamma T}-\beta_T O_2(z)$$

$$V_2(z)=O_2(z)\cdot z^{-\gamma T}\beta_T O_1(z)$$

where $\beta_T$ and $\gamma_T$ denote the theoretical estimates of $\beta$ and $\gamma$ used in the noise suppression algorithm. In reality, the speech response of $O_2$ is $$O_{2S}(z)=\beta_R O_{1S}(z)\cdot z^{-\gamma R}$$

where $\beta_R$ and $\gamma_R$ denote the real $\beta$ and $\gamma$ of the physical system. The differences between the theoretical and actual values of $\beta$ and $\gamma$ can be due to mis-location of the speech source (it is not where it is assumed to be) and/or a change in air temperature (which changes the speed of sound). Inserting the actual response of $O_2$ for speech into the above equations for $V_1$ and $V_2$ yields $$V_{1S}(z)=O_{1S}(z)[z^{-\gamma T}-\beta_T\beta_R z^{-\gamma R}]$$

$V_{2S}(z)=O_{1S}(z)[\beta_R z^{-\gamma R}-\beta_T z^{-\gamma T}]$

If the difference in phase is represented by $V_R=Y_T+Y_D$

And the difference in amplitude as $\beta_R=B\beta_T$ then $V_{1S}(z)=O_{1S}(z)z^{-\gamma T}[1-B\beta_T^{2}z^{-\gamma D}]$ $V_{2S}(z)=\beta_T O_{1S}(z)z^{-\gamma T}[Bz^{-\gamma D}-1]$. Eq. 5

Figure 36:
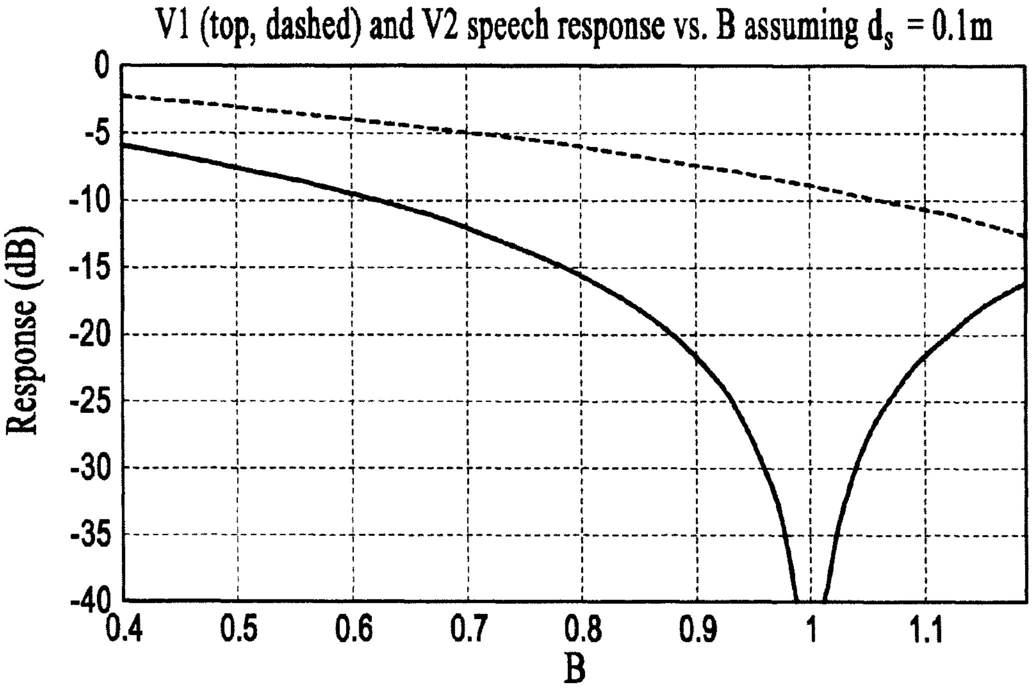
FIG. 36 is a plot showing speech response for $V_1$ (top, dashed) and $V_2$ (bottom, solid) versus B with $d_s$ assumed to be 0.1 m, under an embodiment.
Figure 37:
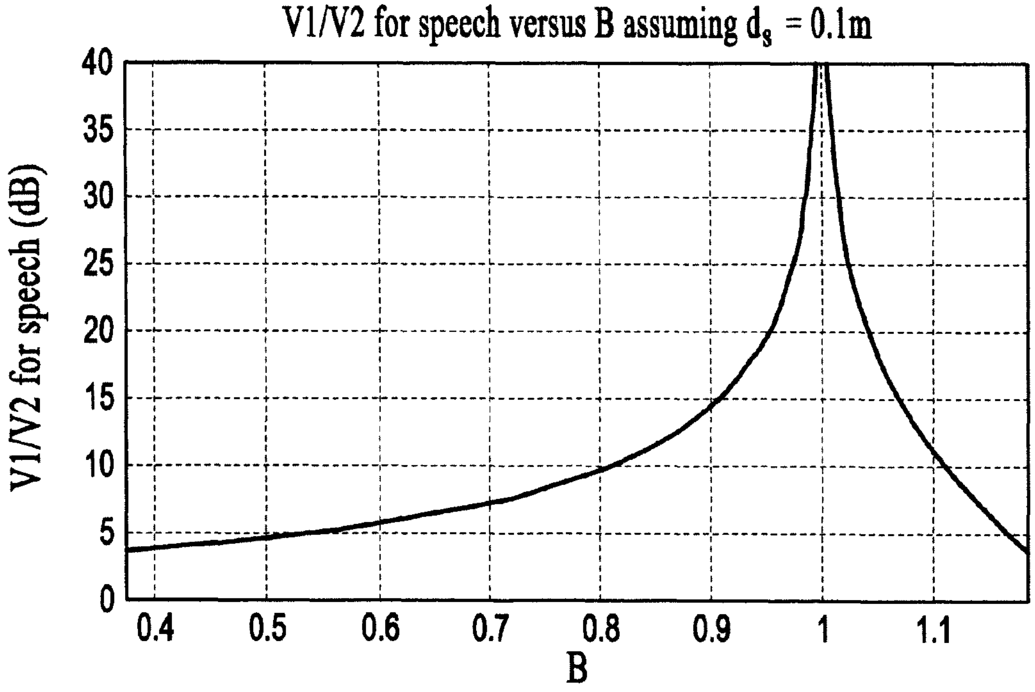
FIG. 37 is a plot showing a ratio of $V_1/V_2$ speech responses shown in FIG. 31 versus B, under an embodiment.
Figure 38:
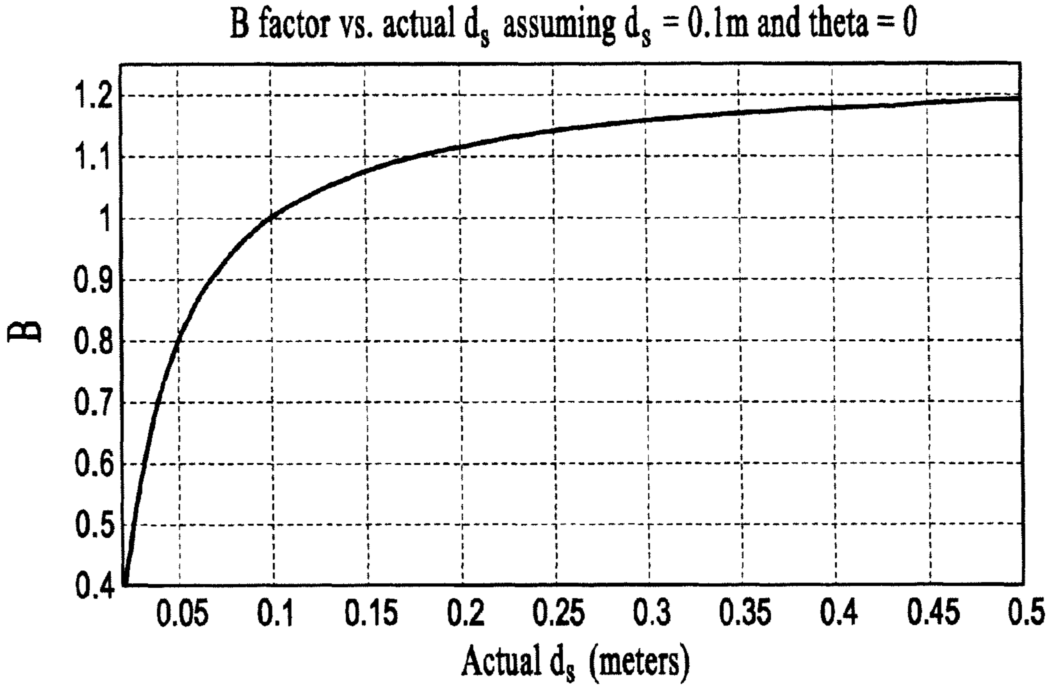
FIG. 38 is a plot of B versus actual $d_s$=10 cm assuming that $d_s$=10 cm and theta=0, under an embodiment.
Figure 39:
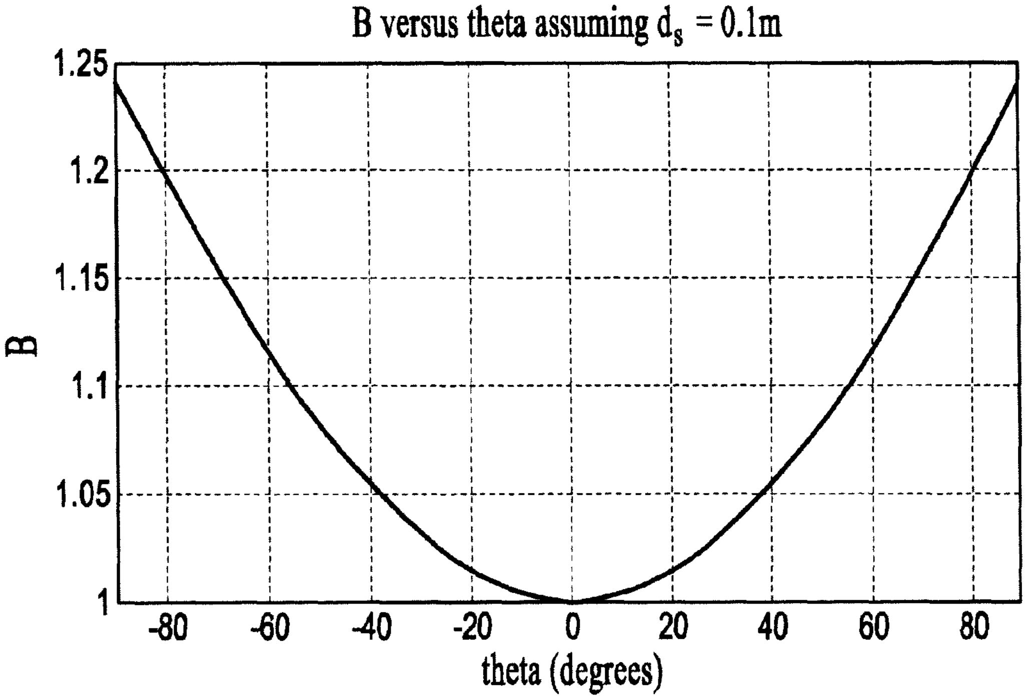
FIG. 39 is a plot of B versus theta with $d_s$=10 cm and assuming $d_s$=10 cm, under an embodiment.

The speech cancellation in $V_2$ (which directly affects the degree of devoicing) and the speech response of $V_1$ will be dependent on both B and D. An examination of the case where D=0 follows. FIG. 36 is a plot showing speech response for $V_1$ (top, dashed) and $V_2$ (bottom, solid) versus B with $d_s$ assumed to be 0.1 m, under an embodiment. This plot shows the spatial null in $V_2$ to be relatively broad. FIG. 37 is a plot showing a ratio of $V_1/V_2$ speech responses shown in FIG. 31 versus B, under an embodiment. The ratio of $V_1/V_2$ is above 10 dB for all 0.8<B<1.1, and this means that the physical β of the system need not be exactly modeled for good performance. FIG. 38 is a plot of B versus actual $d_s$ assuming that $d_s$=10 cm and θ=0, under an embodiment. FIG. 39 is a plot of B versus theta with $d_s$=10 cm and assuming $d_s$=10 cm, under an embodiment.

In FIG. 36, the speech response for $V_1$ (upper, dashed) and $V_2$ (lower, solid) compared to $O_1$ is shown versus B when $d_s$ is thought to be approximately 10 cm and θ=0. When B=1, the speech is absent from $V_2$. In FIG. 37, the ratio of the speech responses in FIG. 31 is shown. When 0.8<B<1.1, the $V_1/V_2$ ratio is above approximately 10 dB—enough for good performance. Clearly, if D=0, B can vary significantly without adversely affecting the performance of the system. Again, this assumes that calibration of the microphones so that both their amplitude and phase response is the same for an identical source has been performed.

The B factor can be non-unity for a variety of reasons. Either the distance to the speech source or the relative orientation of the array axis and the speech source or both can be different than expected. If both distance and angle mismatches are included for B, then $$B=\frac{\beta_R}{\beta_T}\frac{\sqrt{d_{SR}^2-2d_{SR}d_0\cos(\theta_R)+d_0^2}}{\sqrt{d_{SR}^2+2d_{SR}d_0\cos(\theta_R)+d_0^2}}\cdot\frac{\sqrt{d_{ST}^2+2d_{ST}d_0\cos(\theta_T)+d_0^2}}{\sqrt{d_{ST}^2-2d_{ST}d_0\cos(\theta_T)+d_0^2}}$$

where again the T subscripts indicate the theorized values and R the actual values. In FIG. 38, the factor B is plotted with respect to the actual $d_s$ with the assumption that $d_s$=10 cm and θ=0. So, if the speech source in on-axis of the array, the actual distance can vary from approximately 5 cm to 18 cm without significantly affecting performance—a significant amount. Similarly, FIG. 39 shows what happens if the speech source is located at a distance of approximately 10 cm but not on the axis of the array. In this case, the angle can vary up to approximately +–55 degrees and still result in a B less than 1.1, assuring good performance. This is a significant amount of allowable angular deviation. If there is both angular and distance errors, the equation above may be used to determine if the deviations will result in adequate performance. Of course, if the value for $\beta_T$ is allowed to update during speech, essentially tracking the speech source, then B can be kept near unity for almost all configurations.

An examination follows of the case where B is unity but D is nonzero. This can happen if the speech source is not where it is thought to be or if the speed of sound is different from what it is believed to be. From Equation 5 above, it can be sees that the factor that weakens the speech null in $V_2$ for speech is $N(z)=Bz^{-\gamma D}-1$ or in continuous s domain $N(s)=Be^{-Ds}-1$.

Figure 40:
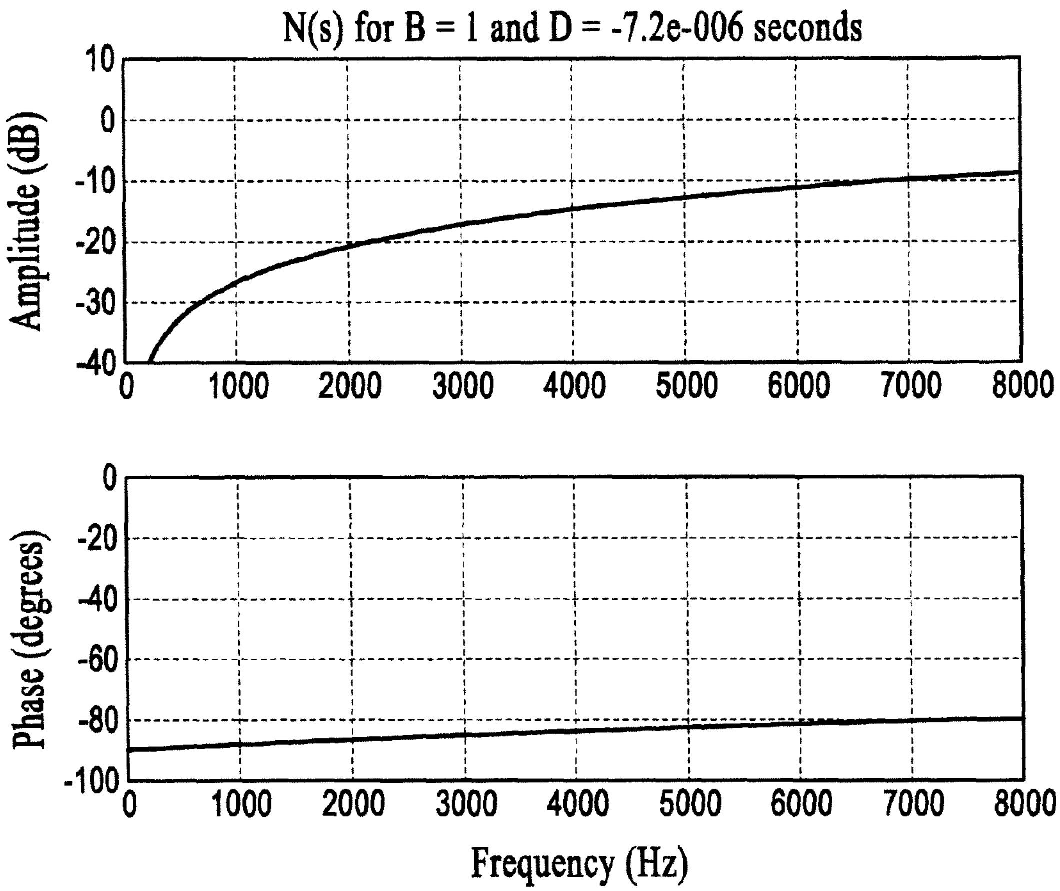
FIG. 40 is a plot of amplitude (top) and phase (bottom) response of N(s) with B=1 and D=−7.2 μsec, under an embodiment.

Since γ is the time difference between arrival of speech at $V_1$ compared to $V_2$, it can be errors in estimation of the angular location of the speech source with respect to the axis of the array and/or by temperature changes. Examining the temperature sensitivity, the speed of sound varies with temperature as $c=331.3+(0.606T)\ m/s$ where T is degrees Celsius. As the temperature decreases, the speed of sound also decreases. Setting 20° C. as a design temperature and a maximum expected temperature range to –40° C. to +60° C. (–40° F. to 140° F.). The design speed of sound at 20° C. is 343 m/s and the slowest speed of sound will be 307 m/s at –40° C. with the fastest speed of sound 362 m/s at 60° C. Set the array length (2 d.sub.0) to be 21 mm. For speech sources on the axis of the array, the difference in travel time for the largest change in the speed of sound is $$\nabla t_{MAX}=\frac{d}{c_1}-\frac{d}{c_2}=0.021m\left(\frac{1}{343\text{ m/s}}-\frac{1}{307\text{ m/s}}\right)=-7.2\times10^{-6}\text{sec}$$

or approximately 7 microseconds. The response for N(s) given B=1 and D=7.2 μsec is shown in FIG. 40. FIG. 40 is a plot of amplitude (top) and phase (bottom) response of N(s) with B=1 and D=–7.2 μsec, under an embodiment. The resulting phase difference clearly affects high frequencies more than low. The amplitude response is less than approximately −10 dB for all frequencies less than 7 kHz and is only about –9 dB at 8 kHz. Therefore, assuming B=1, this system would likely perform well at frequencies up to approximately 8 kHz. This means that a properly compensated system would work well even up to 8 kHz in an exceptionally wide (e.g., –40° C. to 80° C.) temperature range. Note that the phase mismatch due to the delay estimation error causes N(s) to be much larger at high frequencies compared to low.

Figure 41:
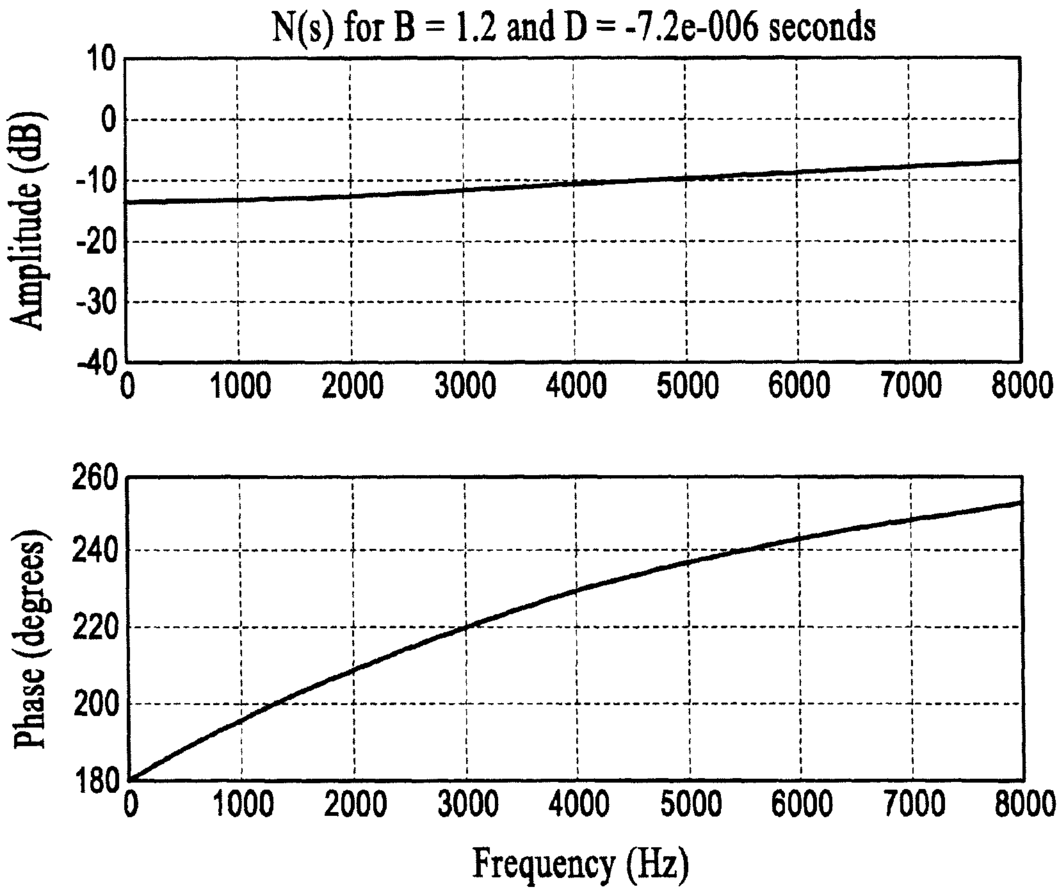
FIG. 41 is a plot of amplitude (top) and phase (bottom) response of N(s) with B=1.2 and D=−7.2 μsec, under an embodiment.

If B is not unity, the robustness of the system is reduced since the effect from non-unity B is cumulative with that of non-zero D. FIG. 41 shows the amplitude and phase response for B=1.2 and D=7.2 μsec. FIG. 41 is a plot of amplitude (top) and phase (bottom) response of N(s) with B=1.2 and D=–7.2 μsec, under an embodiment. Non-unity B affects the entire frequency range. Now N(s) is below approximately −10 dB only for frequencies less than approximately 5 kHz and the response at low frequencies is much larger. Such a system would still perform well below 5 kHz and would only suffer from slightly elevated devoicing for frequencies above 5 kHz. For ultimate performance, a temperature sensor may be integrated into the system to allow the algorithm to adjust $\gamma_T$ as the temperature varies.

Another way in which D can be non-zero is when the speech source is not where it is believed to be—specifically, the angle from the axis of the array to the speech source is incorrect. The distance to the source may be incorrect as well, but that introduces an error in B, not D.

Referring to FIG. 23, it can be seen that for two speech sources (each with their own $d_s$ and θ) that the time difference between the arrival of the speech at $O_1$ and the arrival at $O_2$ is $$\Delta t = \frac{1}{c}(d_{12} - d_{11} - d_{22} + d_{21})$$

where $$d_{11} = \sqrt{d_{S1}^2 - 2d_{S1}d_0\cos(\theta_1) + d_0^2}$$

$$d_{12} = \sqrt{d_{S1}^2 + 2d_{S1}d_0\cos(\theta_1) + d_0^2}$$

$$d_{21} = \sqrt{d_{S2}^2 - 2d_{S2}d_0\cos(\theta_2) + d_0^2}$$

$$d_{22} = \sqrt{d_{S2}^2 + 2d_{S2}d_0\cos(\theta_2) + d_0^2}$$

Figure 42:
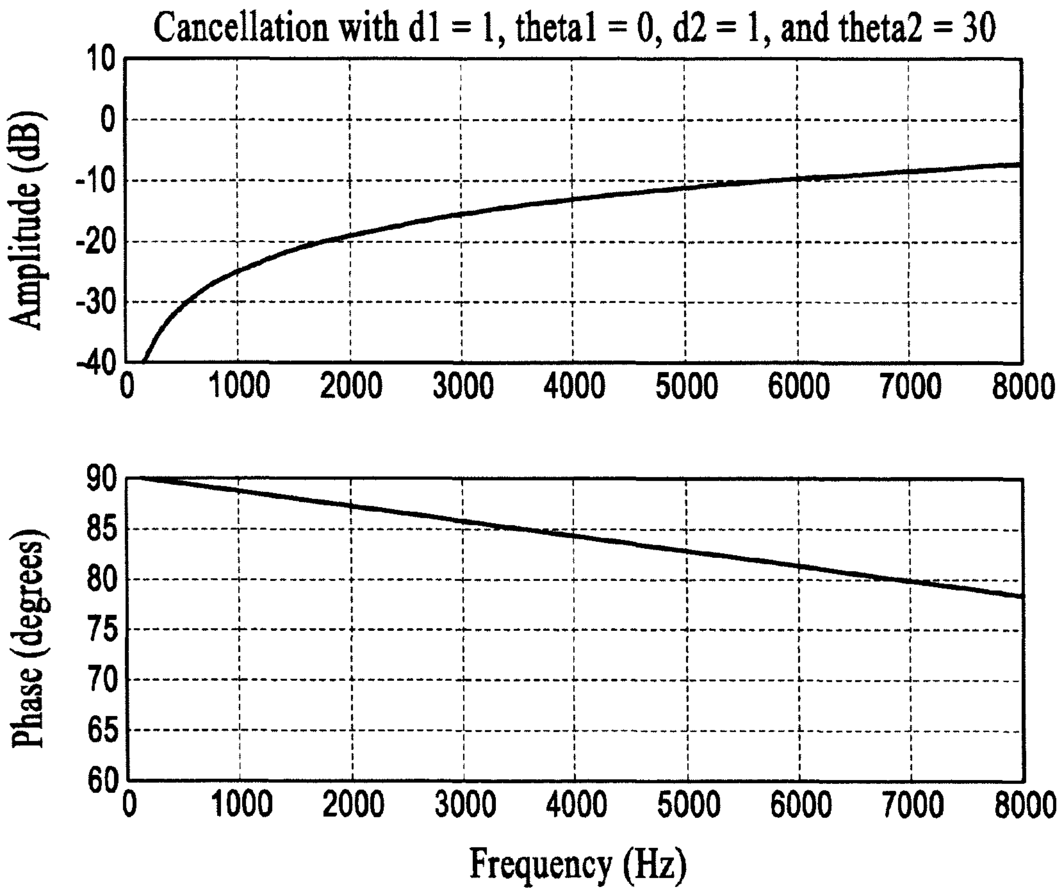
FIG. 42 is a plot of amplitude (top) and phase (bottom) response of the effect on the speech cancellation in $V_2$ due to a mistake in the location of the speech source with q1=0 degrees and q2=30 degrees, under an embodiment.
Figure 43:
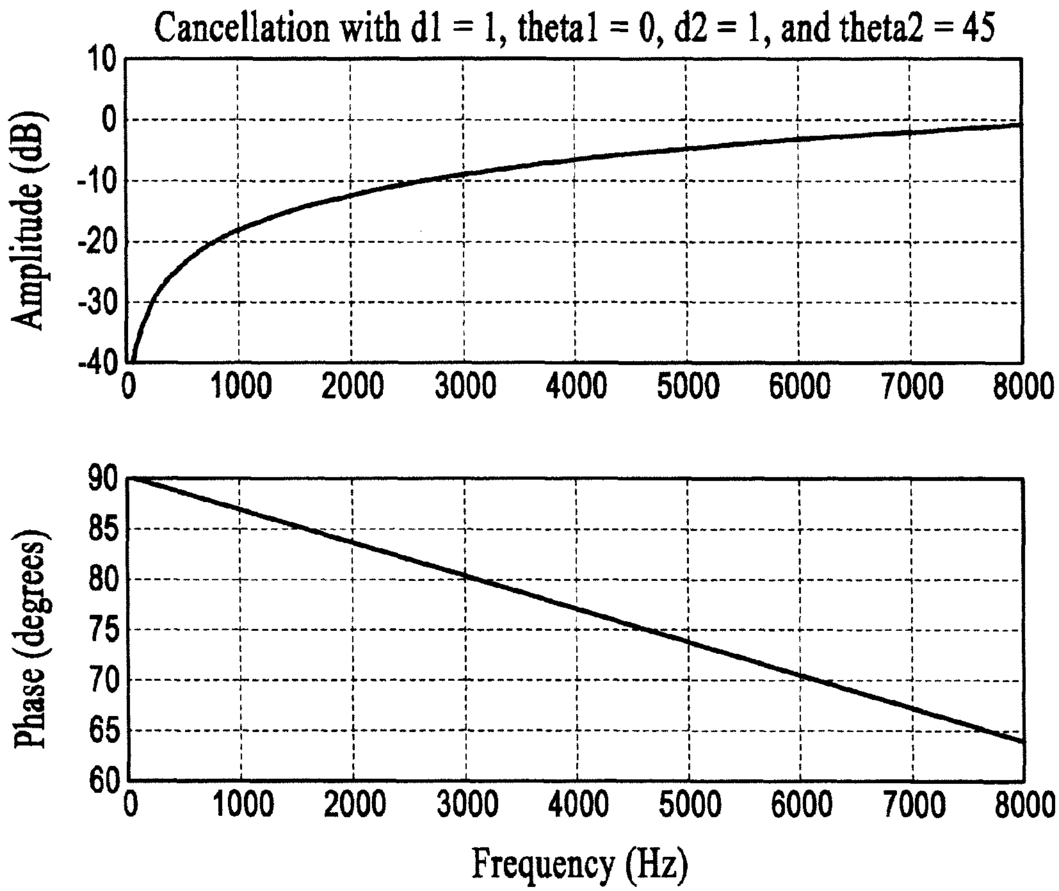
FIG. 43 is a plot of amplitude (top) and phase (bottom) response of the effect on the speech cancellation in $V_2$ due to a mistake in the location of the speech source with q1=0 degrees and q2=45 degrees, under an embodiment.

The $V_2$ speech cancellation response for $\theta_1$=0 degrees and $\theta_2$=30 degrees and assuming that B=1 is shown in FIG. 42. FIG. 42 is a plot of amplitude (top) and phase (bottom) response of the effect on the speech cancellation in $V_2$ due to a mistake in the location of the speech source with q1=0 degrees and q2=30 degrees, under an embodiment. Note that the cancellation is still below −10 dB for frequencies below 6 kHz. The cancellation is still below approximately −10 dB for frequencies below approximately 6 kHz, so an error of this type will not significantly affect the performance of the system. However, if $\theta_2$ is increased to approximately 45 degrees, as shown in FIG. 43, the cancellation is below approximately −10 dB only for frequencies below approximately 2.8 kHz. FIG. 43 is a plot of amplitude (top) and phase (bottom) response of the effect on the speech cancellation in $V_2$ due to a mistake in the location of the speech source with q1=0 degrees and q2=45 degrees, under an embodiment. Now the cancellation is below −10 dB only for frequencies below about 2.8 kHz and a reduction in performance is expected. The poor $V_2$ speech cancellation above approximately 4 kHz may result in significant devoicing for those frequencies.

The description above has assumed that the microphones $O_1$ and $O_2$ were calibrated so that their response to a source located the same distance away was identical for both amplitude and phase. This is not always feasible, so a more practical calibration procedure is presented below. It is not as accurate, but is much simpler to implement. Begin by defining a filter .alpha.(z) such that:

$$O_{1S}(z)=\alpha(z)O_{2C}(z)$$

where the "C" subscript indicates the use of a known calibration source. The simplest one to use is the speech of the user. Then $$O_{1S}(z)=\alpha(z)O_{2C}(z)$$

The microphone definitions are now:

$$V_1(z)=O_1(z)\cdot z^{-\gamma}-\beta(z)\alpha(z)O_2(z)$$

$$V_2(z)=\alpha(z)O_2(z)-z^{-\gamma}\beta(z)O_1(z)$$

The β of the system should be fixed and as close to the real value as possible. In practice, the system is not sensitive to changes in β and errors of approximately +−5% are easily tolerated. During times when the user is producing speech but there is little or no noise, the system can train α(z) to remove as much speech as possible. This is accomplished by:

1. Construct an adaptive system as shown in FIG. 22 with $\beta O_{1S}(z)z^{-\gamma}$ in the "MIC1" position, $O_{2S}(z)$ in the "MIC2" position, and α(z) in the $H_1(z)$ position.
2. During speech, adapt α(z) to minimize the residual of the system.
3. Construct $V_1(z)$ and $V_2(z)$ as above.

A simple adaptive filter can be used for α(z) so that only the relationship between the microphones is well modeled. The system of an embodiment trains only when speech is being produced by the user. A sensor like the SSM is invaluable in determining when speech is being produced in the absence of noise. If the speech source is fixed in position and will not vary significantly during use (such as when the array is on an earpiece), the adaptation should be infrequent and slow to update in order to minimize any errors introduced by noise present during training.

The above formulation works very well because the noise (far-field) responses of $V_1$ and $V_2$ are very similar while the speech (near-field) responses are very different. However, the formulations for $V_1$ and $V_2$ can be varied and still result in good performance of the system as a whole. If the definitions for $V_1$ and $V_2$ are taken from above and new variables B1 and B2 are inserted, the result is:

$$V_1(z)=O_1(z)\cdot z^{-\gamma T}-B_1\beta_T O_2(z)$$

$$V_2(z)=O_2(z)-z^{-\gamma T}B_2\beta_T O_1(z)$$

where B1 and B2 are both positive numbers or zero. If B1 and B2 are set equal to unity, the optimal system results as described above. If B1 is allowed to vary from unity, the response of $V_1$ is affected. An examination of the case where B2 is left at 1 and B1 is decreased follows. As B1 drops to approximately zero, $V_1$ becomes less and less directional, until it becomes a simple omnidirectional microphone when B1=0. Since B2=1, a speech null remains in $V_2$, so very different speech responses remain for $V_1$ and $V_2$. However, the noise responses are much less similar, so denoising will not be as effective. Practically, though, the system still performs well. B1 can also be increased from unity and once again the system will still denoise well, just not as well as with B1=1.

If B2 is allowed to vary, the speech null in $V_2$ is affected. As long as the speech null is still sufficiently deep, the system will still perform well. Practically values down to approximately B2=0.6 have shown sufficient performance, but it is recommended to set B2 close to unity for optimal performance.

Similarly, variables ε and Δ may be introduced so that:

$$V_1(z)=(\varepsilon-\beta)O_{2N}(z)+(1+\Delta)O_{1N}(z)z^{-\gamma}$$

$$V_2(z)=(1+\Delta)O_{2N}(z)+(\varepsilon-\beta)O_{1N}(z)z^{-\gamma}$$

This formulation also allows the virtual microphone responses to be varied but retains the all-pass characteristic of $H_1(z)$.

Figure 44:
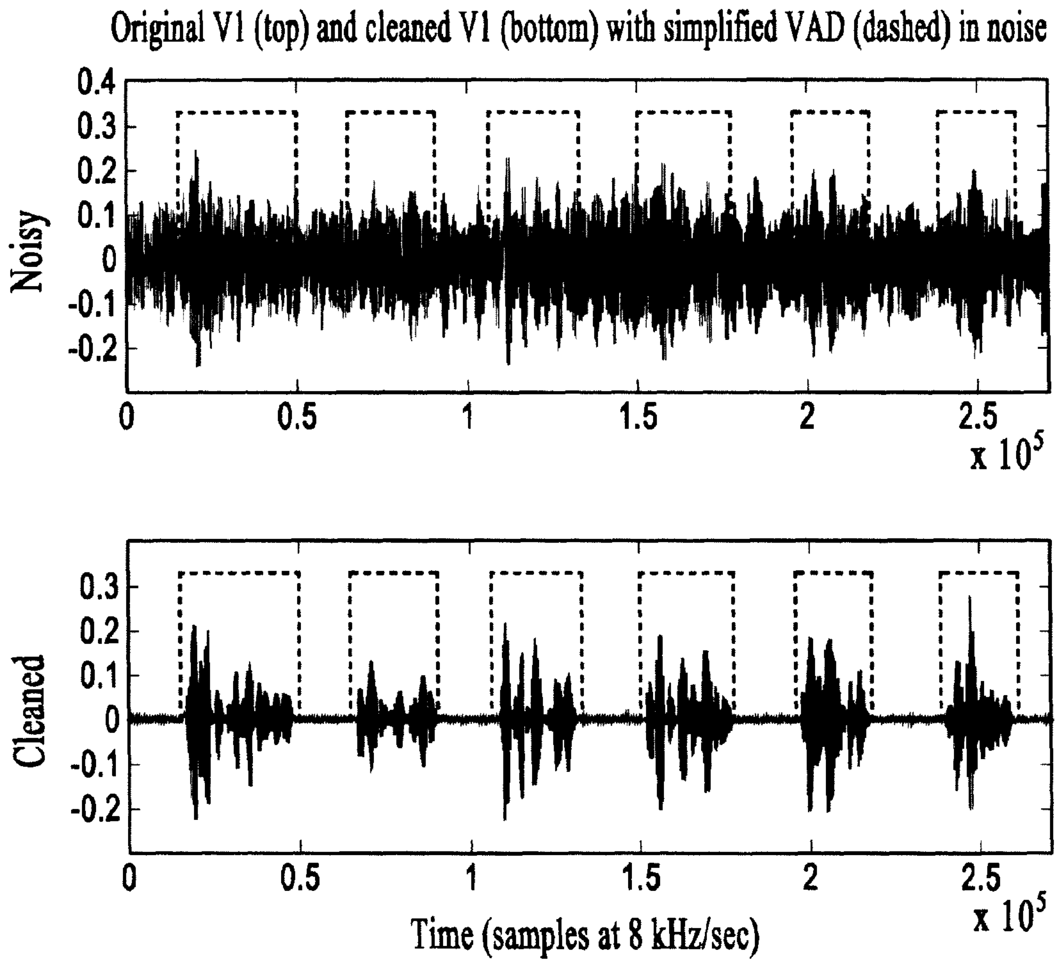
FIG. 44 shows experimental results for 2 $d_0$=19 mm array using a linear β of 0.83 and B1=B2=1 on a Bruel and Kjaer Head and Torso Simulator (HATS) in a very loud (~85 dBA) music/speech noise environment.

In conclusion, the system is flexible enough to operate well at a variety of B1 values, but B2 values should be close to unity to limit devoicing for best performance. Experimental results for a 2 $d_0$=19 mm array using a linear β of 0.83 and B1=B2=1 on a Bruel and Kjaer Head and Torso Simulator (HATS) in very loud (~85 dBA) music/speech noise environment are shown in FIG. 44. The alternate microphone calibration technique discussed above was used to calibrate the microphones. The noise has been reduced by about 25 dB and the speech hardly affected, with no noticeable distortion. Clearly the technique significantly increases the SNR of the original speech, far outperforming conventional noise suppression techniques.

Embodiments described herein include a method comprising: forming a first virtual microphone by combining a first signal of a first physical microphone and a second signal of a second physical microphone; forming a filter that describes a relationship for speech between the first physical microphone and the second physical microphone; forming a second virtual microphone by applying the filter to the first signal to generate a first intermediate signal, and summing the first intermediate signal and the second signal; generating an energy ratio of energies of the first virtual microphone and the second virtual microphone; and detecting acoustic voice activity of a speaker when the energy ratio is greater than a threshold value.

The first virtual microphone and the second virtual microphone of an embodiment are distinct virtual directional microphones.

The first virtual microphone and the second virtual microphone of an embodiment have approximately similar responses to noise.

The first virtual microphone and the second virtual microphone of an embodiment have approximately dissimilar responses to speech.

The method of an embodiment comprises applying a calibration to at least one of the first signal and the second signal.

The calibration of an embodiment compensates a second response of the second physical microphone so that the second response is equivalent to a first response of the first physical microphone.

The method of an embodiment comprises applying a delay to the first intermediate signal.

The delay of an embodiment is proportional to a time difference between arrival of the speech at the second physical microphone and arrival of the speech at the first physical microphone.

The forming of the first virtual microphone of an embodiment comprises applying the filter to the second signal.

The forming of the first virtual microphone of an embodiment comprises applying the calibration to the second signal.

The forming of the first virtual microphone of an embodiment comprises applying the delay to the first signal.

The forming of the first virtual microphone by the combining of an embodiment comprises subtracting the second signal from the first signal.

The filter of an embodiment is an adaptive filter.

The method of an embodiment comprises adapting the filter to minimize a second virtual microphone output when only speech is being received by the first physical microphone and the second physical microphone.

The adapting of an embodiment comprises applying a least-mean squares process.

The method of an embodiment comprises generating coefficients of the filter during a period when only speech is being received by the first physical microphone and the second physical microphone.

The forming of the filter of an embodiment comprises generating a first quantity by applying a calibration to the second signal. The forming of the filter of an embodiment comprises generating a second quantity by applying the delay to the first signal. The forming of the filter of an embodiment comprises forming the filter as a ratio of the first quantity to the second quantity.

The generating of the energy ratio of an embodiment comprises generating the energy ratio for a frequency band.

The generating of the energy ratio of an embodiment comprises generating the energy ratio for a frequency subband.

The frequency subband of an embodiment includes frequencies higher than approximately 200 Hertz (Hz).

The frequency subband of an embodiment includes frequencies in a range from approximately 250 Hz to 1250 Hz.

The frequency subband of an embodiment includes frequencies in a range from approximately 200 Hz to 3000 Hz.

The filter of an embodiment is a static filter.

The forming of the filter of an embodiment comprises determining a first distance as distance between the first physical microphone and a mouth of the speaker. The forming of the filter of an embodiment comprises determining a second distance as distance between the second physical microphone and the mouth. The forming of the filter of an embodiment comprises forming a ratio of the first distance to the second distance.

The method of an embodiment comprises generating a vector of the energy ratio versus time.

The first and second physical microphones of an embodiment are omnidirectional microphones.

The method of an embodiment comprises positioning the first physical microphone and the second physical microphone along an axis and separating the first physical microphone and the second physical microphone by a first distance.

A midpoint of the axis of an embodiment is a second distance from a mouth of the speaker, wherein the mouth is located in a direction defined by an angle relative to the midpoint.

Embodiments described herein include a method comprising: forming a first virtual microphone; forming a filter by generating a first quantity by applying a calibration to a second signal of a second physical microphone, generating a second quantity by applying the delay to a first signal of a first physical microphone, and forming the filter as a ratio of the first quantity to the second quantity; forming a second virtual microphone by applying the filter to the first signal to generate a first intermediate signal, and summing the first intermediate signal and the second signal; and generating a ratio of energies of the first virtual microphone and the second virtual microphone and detecting acoustic voice activity using the ratio.

The first virtual microphone and the second virtual microphone of an embodiment have approximately similar responses to noise and approximately dissimilar responses to speech.

The method of an embodiment comprises applying a calibration to at least one of the first signal and the second signal, wherein the calibration compensates a second response of the second physical microphone so that the second response is equivalent to a first response of the first physical microphone.

The method of an embodiment comprises applying a delay to the first intermediate signal, wherein the delay is proportional to a time difference between arrival of the speech at the second physical microphone and arrival of the speech at the first physical microphone.

The forming of the first virtual microphone of an embodiment comprises applying the filter to the second signal.

The forming of the first virtual microphone of an embodiment comprises applying the calibration to the second signal.

The forming of the first virtual microphone of an embodiment comprises applying the delay to the first signal.

The forming of the first virtual microphone by the combining of an embodiment comprises subtracting the second signal from the first signal.

The filter of an embodiment is an adaptive filter.

The method of an embodiment comprises adapting the filter to minimize a second virtual microphone output when only speech is being received by the first physical microphone and the second physical microphone.

The adapting of an embodiment comprises applying a least-mean squares process.

The method of an embodiment comprises generating coefficients of the filter during a period when only speech is being received by the first physical microphone and the second physical microphone.

The generating of the ratio of an embodiment comprises generating the ratio for a frequency band.

The generating of the ratio of an embodiment comprises generating the ratio for a frequency subband.

The method of an embodiment comprises generating a vector of the ratio versus time.

Embodiments described herein include a method comprising: forming a first virtual microphone by generating a first combination of a first signal and a second signal, wherein the first signal is received from a first physical microphone and the second signal is received from a second physical microphone; forming a filter by generating a first quantity by applying a calibration to at least one of the first signal and the second signal, generating a second quantity by applying a delay to the first signal, and forming the filter as a ratio of the first quantity to the second quantity; and forming a second virtual microphone by applying the filter to the first signal to generate a first intermediate signal and summing the first intermediate signal and the second signal; and determining a presence of acoustic voice activity of a speaker when an energy ratio of energies of the first virtual microphone and the second virtual microphone is greater than a threshold value.

Embodiments described herein include an acoustic voice activity detection system comprising: a first virtual microphone comprising a first combination of a first signal and a second signal, wherein the first signal is received from a first physical microphone and the second signal is received from a second physical microphone; a filter, wherein the filter is formed by generating a first quantity by applying a calibration to at least one of the first signal and the second signal, generating a second quantity by applying a delay to the first signal, and forming the filter as a ratio of the first quantity to the second quantity; and a second virtual microphone formed by applying the filter to the first signal to generate a first intermediate signal and summing the first intermediate signal and the second signal, wherein acoustic voice activity of a speaker is determined to be present when an energy ratio of energies of the first virtual microphone and the second virtual microphone is greater than a threshold value.

The first virtual microphone and the second virtual microphone of an embodiment have approximately similar responses to noise and approximately dissimilar responses to speech.

A calibration is applied to the second signal of an embodiment, wherein the calibration compensates a second response of the second physical microphone so that the second response is equivalent to a first response of the first physical microphone.

The delay is applied to the first intermediate signal of an embodiment, wherein the delay is proportional to a time difference between arrival of the speech at the second physical microphone and arrival of the speech at the first physical microphone.

The first virtual microphone of an embodiment is formed by applying the filter to the second signal.

The first virtual microphone of an embodiment is formed by applying the calibration to the second signal.

The first virtual microphone of an embodiment is formed by applying the delay to the first signal.

The first virtual microphone of an embodiment is formed by subtracting the second signal from the first signal.

The filter of an embodiment is an adaptive filter.

The filter of an embodiment is adapted to minimize a second virtual microphone output when only speech is being received by the first physical microphone and the second physical microphone.

Coefficients of the filter of an embodiment are generated during a period when only speech is being received by the first physical microphone and the second physical microphone.

The energy ratio of an embodiment comprises an energy ratio for a frequency band.

The energy ratio of an embodiment comprises an energy ratio for a frequency subband.

Embodiments described herein include a device comprising: a first physical microphone generating a first signal; a second physical microphone generating a second signal; and a processing component coupled to the first physical microphone and the second physical microphone, the processing component forming a first virtual microphone, the processing component forming a filter that describes a relationship for speech between the first physical microphone and the second physical microphone, the processing component forming a second virtual microphone by applying the filter to the first signal to generate a first intermediate signal, and summing the first intermediate signal and the second signal, the processing component detecting acoustic voice activity of a speaker when an energy ratio of energies of the first virtual microphone and the second virtual microphone is greater than a threshold value.

The device of an embodiment comprises applying a calibration to at least one of the first signal and the second signal.

The calibration of an embodiment compensates a second response of the second physical microphone so that the second response is equivalent to a first response of the first physical microphone.

The device of an embodiment comprises applying a delay to the first intermediate signal.

The delay of an embodiment is proportional to a time difference between arrival of the speech at the second physical microphone and arrival of the speech at the first physical microphone.

The forming of the first virtual microphone of an embodiment comprises applying the filter to the second signal.

The forming of the first virtual microphone of an embodiment comprises applying the calibration to the second signal.

The forming of the first virtual microphone of an embodiment comprises applying the delay to the first signal.

The forming of the first virtual microphone by the combining of an embodiment comprises subtracting the second signal from the first signal.

The filter of an embodiment is an adaptive filter.

The device of an embodiment comprises adapting the filter to minimize a second virtual microphone output when only speech is being received by the first physical microphone and the second physical microphone.

The adapting of an embodiment comprises applying a least-mean squares process.

The device of an embodiment comprises generating coefficients of the filter during a period when only speech is being received by the first physical microphone and the second physical microphone.

The forming of the filter of an embodiment comprises generating a first quantity by applying a calibration to the second signal. The forming of the filter of an embodiment comprises generating a second quantity by applying the delay to the first signal. The forming of the filter of an embodiment comprises forming the filter as a ratio of the first quantity to the second quantity.

The generating of the energy ratio of an embodiment comprises generating the energy ratio for a frequency band.

The generating of the energy ratio of an embodiment comprises generating the energy ratio for a frequency subband.

The frequency subband of an embodiment includes frequencies higher than approximately 200 Hertz (Hz).

The frequency subband of an embodiment includes frequencies in a range from approximately 250 Hz to 1250 Hz.

The frequency subband of an embodiment includes frequencies in a range from approximately 200 Hz to 3000 Hz.

The filter of an embodiment is a static filter.

The forming of the filter of an embodiment comprises determining a first distance as distance between the first physical microphone and a mouth of the speaker. The forming of the filter of an embodiment comprises determining a second distance as distance between the second physical microphone and the mouth. The forming of the filter of an embodiment comprises forming a ratio of the first distance to the second distance.

The device of an embodiment comprises generating a vector of the energy ratio versus time.

The first virtual microphone and the second virtual microphone of an embodiment are distinct virtual directional microphones.

The first virtual microphone and the second virtual microphone of an embodiment have approximately similar responses to noise.

The first virtual microphone and the second virtual microphone of an embodiment have approximately dissimilar responses to speech.

The first and second physical microphones of an embodiment are omnidirectional microphones.

The device of an embodiment comprises positioning the first physical microphone and the second physical microphone along an axis and separating the first physical microphone and the second physical microphone by a first distance.

A midpoint of the axis of an embodiment is a second distance from a mouth of the speaker, wherein the mouth is located in a direction defined by an angle relative to the midpoint.

Embodiments described herein include a device comprising: a headset including at least one loudspeaker, wherein the headset attaches to a region of a human head; a microphone array connected to the headset, the microphone array including a first physical microphone outputting a first signal and a second physical microphone outputting a second signal; and a processing component coupled to the first physical microphone and the second physical microphone, the processing component forming a first virtual microphone, the processing component forming a filter that describes a relationship for speech between the first physical microphone and the second physical microphone, the processing component forming a second virtual microphone by applying the filter to the first signal to generate a first intermediate signal, and summing the first intermediate signal and the second signal, the processing component detecting acoustic voice activity of a speaker when an energy ratio of energies of the first virtual microphone and the second virtual microphone is greater than a threshold value.

The AVAD can be a component of a single system, multiple systems, and/or geographically separate systems. The AVAD can also be a subcomponent or subsystem of a single system, multiple systems, and/or geographically separate systems. The AVAD can be coupled to one or more other components (not shown) of a host system or a system coupled to the host system.

One or more components of the AVAD and/or a corresponding system or application to which the AVAD is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

Aspects of the AVAD and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the AVAD and corresponding systems and methods include: microcontrollers with memory (such as electronically erasable programmable read only memory (EEPROM)), embedded microprocessors, firmware, software, etc. Furthermore, aspects of the AVAD and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the AVAD and corresponding systems and methods is not intended to be exhaustive or to limit the systems and methods to the precise forms disclosed. While specific embodiments of, and examples for, the AVAD and corresponding systems and methods are described herein for illustrative purposes, various equivalent modifications are possible within the scope of the systems and methods, as those skilled in the relevant art will recognize. The teachings of the AVAD and corresponding systems and methods provided herein can be applied to other systems and methods, not only for the systems and methods described above.

The elements and acts of the various embodiments described above can be combined to provide further embodiments. These and other changes can be made to the AVAD and corresponding systems and methods in light of the above detailed description.

In general, in the following claims, the terms used should not be construed to limit the AVAD and corresponding systems and methods to the specific embodiments disclosed in the specification and the claims, but should be construed to include all systems that operate under the claims. Accordingly, the AVAD and corresponding systems and methods is not limited by the disclosure, but instead the scope is to be determined entirely by the claims.

While certain aspects of the AVAD and corresponding systems and methods are presented below in certain claim forms, the inventors contemplate the various aspects of the AVAD and corresponding systems and methods in any number of claim forms. Accordingly, the inventors reserve the right to add additional claims after filing the application to pursue such additional claim forms for other aspects of the AVAD and corresponding systems and methods.

What is claimed:

1. An acoustic voice activity detection system comprising:

a first virtual microphone comprising a first combination of a first signal and a second signal, wherein the first signal is received from a first physical microphone and the second signal is received from a second physical microphone;

a second virtual microphone comprising a second combination of the first signal and the second signal, the first and second virtual microphones having substantially identical responses to noise; and an adaptive filter configured to reduce speech response of the second virtual microphone relative to the first virtual microphone, wherein a magnitude of the adaptive filter is limited to predetermined expected speech values to preclude the adaptive filter from accidental training on noise when noise is present during training of the adaptive filter; and wherein acoustic voice activity of a speaker is determined to be present when an energy ratio (R) of energies of the first virtual microphone and the second virtual microphone is greater than a threshold value.

2. The system of claim 1, wherein the magnitude of the adaptive filter is limited to between approximately 0.82 and approximately 0.88 to preclude the adaptive filter from accidental training on noise when noise is present during training of the adaptive filter.

3. The system of claim 1, wherein the threshold value is approximately two.

4. The system of claim 1, wherein training of the adaptive filter only occurs when a current value of R is larger than a smoothed history of R values.

5. The system of claim 1, wherein generating of the energy ratio comprises generating the energy ratio for frequencies in a range from approximately 250 Hz to 1250 Hz.

6. The system of claim 1, wherein generating of the energy ratio comprises generating the energy ratio for frequencies in a range from approximately 20 Hz to 3000 Hz.

* * * * *